United States Patent
Dion et al.

(10) Patent No.: US 10,681,574 B2
(45) Date of Patent: Jun. 9, 2020

(54) VIDEO QUALITY MONITORING

(71) Applicant: IneoQuest Technologies, Inc., Westwood, MA (US)

(72) Inventors: Gino Louis Dion, Quispamsis (CA); Stuart W. Newton, Oxford (GB); Calvin W. Harrison, Franklin, MA (US); James T. Welch, Wake Forest, NC (US)

(73) Assignee: IneoQuest Technologies, Inc., Westwood, MA (US)

( * ) Notice: Subject to any disclaimer, the term of this patent is extended or adjusted under 35 U.S.C. 154(b) by 0 days.

(21) Appl. No.: 16/185,366

(22) Filed: Nov. 9, 2018

(65) Prior Publication Data
US 2019/0075477 A1 Mar. 7, 2019

Related U.S. Application Data

(63) Continuation of application No. 14/814,705, filed on Jul. 31, 2015, now abandoned.

(Continued)

(51) Int. Cl.
H04N 21/442 (2011.01)
H04N 21/4425 (2011.01)
(Continued)

(52) U.S. Cl.
CPC ........ *H04W 24/08* (2013.01); *H04N 7/17318* (2013.01); *H04N 21/2387* (2013.01);
(Continued)

(58) Field of Classification Search
CPC ............ H04L 12/1407; H04L 61/2007; B60L 53/305; H04W 76/10; H04W 28/0231; H04Q 7/20
See application file for complete search history.

(56) References Cited

U.S. PATENT DOCUMENTS

| 5,138,615 A | 8/1992 | Lamport et al. |
| 5,835,500 A | 11/1998 | Schiller et al. |

(Continued)

FOREIGN PATENT DOCUMENTS

| EP | 2480001 A2 | 7/2012 |
| WO | 2007128097 A1 | 11/2007 |
| WO | 2016019227 A1 | 2/2016 |

OTHER PUBLICATIONS 15827003.3, "European Application Serial No. 15827003.3, Extended European Search Report dated Mar. 12, 2018", IneoQuest Technologies, Inc, 8 pages.
18188775.3, "EP Application Serial No. 18188775.3, European Search Report dated Dec. 6, 2018", Ineoquest Technologies, Inc., 7 pages.

(Continued)

*Primary Examiner* — Iqbal Zaidi
(74) *Attorney, Agent, or Firm* — GTC Law Group PC & Affiliates

(57) ABSTRACT

Methods for monitoring quality metrics of a video session transmitted over a mobile video delivery network facility are disclosed. A method for monitoring quality of a video system that uses traffic transmitted over a mobile video delivery network facility may include tapping, by a video quality probe, into a mobile network traffic stream transmitted over the mobile video delivery network facility, filtering, by the video quality probe, the tapped mobile network traffic stream to identify an individual video session; and determining, by the video quality probe, a video quality parameter corresponding to the identified individual video session.

14 Claims, 35 Drawing Sheets

Related U.S. Application Data

(60) Provisional application No. 62/031,893, filed on Aug. 1, 2014.

(51) Int. Cl.

| | | |
|---|---|---|
| *H04N 21/472* | (2011.01) | |
| *H04N 21/6373* | (2011.01) | |
| *H04N 21/643* | (2011.01) | |
| *H04N 21/647* | (2011.01) | |
| *H04N 21/81* | (2011.01) | |
| *H04N 21/24* | (2011.01) | |
| *H04N 21/436* | (2011.01) | |
| *H04N 21/433* | (2011.01) | |
| *H04N 21/234* | (2011.01) | |
| *H04W 24/08* | (2009.01) | |
| *H04N 21/61* | (2011.01) | |
| *H04N 7/173* | (2011.01) | |
| *H04N 21/2387* | (2011.01) | |

(52) U.S. Cl.
CPC ... *H04N 21/23424* (2013.01); *H04N 21/2402* (2013.01); *H04N 21/2404* (2013.01); *H04N 21/4331* (2013.01); *H04N 21/43615* (2013.01); *H04N 21/4425* (2013.01); *H04N 21/44209* (2013.01); *H04N 21/44222* (2013.01); *H04N 21/44227* (2013.01); *H04N 21/47202* (2013.01); *H04N 21/6125* (2013.01); *H04N 21/6131* (2013.01); *H04N 21/6373* (2013.01); *H04N 21/6473* (2013.01); *H04N 21/64322* (2013.01); *H04N 21/64738* (2013.01); *H04N 21/812* (2013.01)

(56) References Cited

U.S. PATENT DOCUMENTS

| | | | |
|---|---|---|---|
| 5,881,222 A | 3/1999 | Berry et al. | |
| 5,963,551 A | 10/1999 | Minko | |
| 5,983,278 A | 11/1999 | Chong et al. | |
| 6,412,004 B1 | 6/2002 | Chen et al. | |
| 6,421,350 B1 | 7/2002 | Szurkowski et al. | |
| 6,480,977 B1 | 11/2002 | Apisdorf et al. | |
| 6,609,226 B1 | 8/2003 | Figueira et al. | |
| 6,728,213 B1 | 4/2004 | Tzeng et al. | |
| 6,738,813 B1 | 5/2004 | Reichman | |
| 6,765,904 B1 | 7/2004 | Viswanathan et al. | |
| 6,801,938 B1 | 10/2004 | Bookman et al. | |
| 6,803,964 B1 | 10/2004 | Koval et al. | |
| 6,807,156 B1 | 10/2004 | Veres et al. | |
| 6,928,055 B2 | 8/2005 | Ni et al. | |
| 6,944,585 B1 | 9/2005 | Pawson et al. | |
| 6,981,180 B1 | 12/2005 | Bailey et al. | |
| 7,010,598 B2 | 3/2006 | Sitaraman et al. | |
| 7,065,052 B1 | 6/2006 | McBride et al. | |
| 7,099,281 B1 | 8/2006 | Conway et al. | |
| 7,114,174 B1 | 9/2006 | Brooks et al. | |
| 7,203,869 B2 | 4/2007 | Gwak et al. | |
| 7,242,681 B1 | 7/2007 | Van Bokkelen et al. | |
| 7,296,284 B1 | 11/2007 | Price et al. | |
| 7,313,593 B1 | 12/2007 | Pulito et al. | |
| 7,321,565 B2 | 1/2008 | Todd et al. | |
| 7,376,132 B2 | 5/2008 | Conway et al. | |
| 7,444,418 B2 | 10/2008 | Chou et al. | |
| 7,543,051 B2 | 6/2009 | Greifeneder et al. | |
| 7,548,948 B2 | 6/2009 | Klemets et al. | |
| 7,555,006 B2 | 6/2009 | Wolfe et al. | |
| 7,610,405 B1 | 10/2009 | Moberg et al. | |
| 7,614,075 B2 | 11/2009 | McDowell et al. | |
| 7,617,516 B2 | 11/2009 | Huslak et al. | |
| 7,624,412 B2 | 11/2009 | McEvilly et al. | |
| 7,627,878 B2 | 12/2009 | Pouliot et al. | |
| 7,720,023 B2 | 5/2010 | Bais et al. | |
| 7,814,513 B2 | 10/2010 | Sarukkai et al. | |
| 7,945,688 B1 | 5/2011 | Lango et al. | |
| 8,019,896 B2 | 9/2011 | Todd et al. | |
| 8,031,623 B2 | 10/2011 | Beeson et al. | |
| 8,159,960 B2 | 4/2012 | Cooppan | |
| 8,239,888 B2 | 8/2012 | Todd et al. | |
| 8,331,618 B1 | 12/2012 | Yung et al. | |
| 8,587,630 B1 | 11/2013 | Krinsky et al. | |
| 8,588,069 B2 | 11/2013 | Todd et al. | |
| 8,625,455 B2 | 1/2014 | Todd et al. | |
| 8,838,772 B2 | 9/2014 | Beeson et al. | |
| 8,943,530 B2 | 1/2015 | Todd et al. | |
| 9,083,770 B1 | 7/2015 | Dröse et al. | |
| 9,197,684 B2 | 11/2015 | Birch et al. | |
| 9,232,241 B2 | 1/2016 | Todd | |
| 9,253,512 B2 | 2/2016 | Todd | |
| 9,367,614 B2 | 6/2016 | Todd et al. | |
| 9,590,816 B2 | 3/2017 | Beeson et al. | |
| 2001/0047487 A1 | 11/2001 | Linnakangas et al. | |
| 2002/0016839 A1 | 2/2002 | Smith et al. | |
| 2002/0112060 A1 | 8/2002 | Kato et al. | |
| 2002/0136203 A1 | 9/2002 | Liva et al. | |
| 2002/0144263 A1 | 10/2002 | Eldering et al. | |
| 2003/0007568 A1 | 1/2003 | Hamery et al. | |
| 2003/0009589 A1 | 1/2003 | Apostolopoulos et al. | |
| 2003/0033403 A1 | 2/2003 | Rhodes et al. | |
| 2003/0043755 A1 | 3/2003 | Mitchell et al. | |
| 2003/0046403 A1 | 3/2003 | Schmidt | |
| 2003/0088878 A1 | 5/2003 | Rogers et al. | |
| 2003/0202536 A1 | 10/2003 | Foster et al. | |
| 2003/0221013 A1 | 11/2003 | Lockwood et al. | |
| 2003/0226089 A1 | 12/2003 | Rasmussen et al. | |
| 2004/0017796 A1 | 1/2004 | Lemieux et al. | |
| 2004/0032916 A1 | 2/2004 | Takashima et al. | |
| 2004/0117427 A1 | 6/2004 | Allen et al. | |
| 2004/0136327 A1 | 7/2004 | Sitaraman et al. | |
| 2004/0210936 A1 | 10/2004 | Rao et al. | |
| 2004/0240447 A1 | 12/2004 | Dorbolo et al. | |
| 2005/0047333 A1 | 3/2005 | Todd et al. | |
| 2005/0071876 A1 | 3/2005 | Van et al. | |
| 2005/0080900 A1 | 4/2005 | Culbertson et al. | |
| 2006/0005099 A1 | 1/2006 | Strasman et al. | |
| 2006/0018266 A1 | 1/2006 | Seo et al. | |
| 2006/0029067 A1 | 2/2006 | Conway | |
| 2006/0072593 A1 | 4/2006 | Grippo et al. | |
| 2006/0085553 A1 | 4/2006 | Rachwalski et al. | |
| 2006/0088035 A1 | 4/2006 | Beeson et al. | |
| 2006/0136578 A1 | 6/2006 | Covell et al. | |
| 2006/0140116 A1 | 6/2006 | Alicherry et al. | |
| 2006/0150055 A1 | 7/2006 | Quinard et al. | |
| 2006/0153174 A1 | 7/2006 | Towns-Von Stauber et al. | |
| 2006/0184670 A1 | 8/2006 | Beeson et al. | |
| 2007/0186234 A1 | 8/2007 | Cormack et al. | |
| 2007/0199061 A1 | 8/2007 | Byres et al. | |
| 2007/0204196 A1 | 8/2007 | Watson et al. | |
| 2007/0237185 A1 | 10/2007 | Pereira et al. | |
| 2008/0052404 A1 | 2/2008 | Leighton et al. | |
| 2008/0060013 A1 | 3/2008 | Sarukkai et al. | |
| 2008/0069002 A1 | 3/2008 | Savoor et al. | |
| 2008/0089239 A1 | 4/2008 | Todd et al. | |
| 2008/0127253 A1 | 5/2008 | Zhang et al. | |
| 2008/0198785 A1 | 8/2008 | Huang et al. | |
| 2009/0080335 A1 | 3/2009 | Siminoff et al. | |
| 2009/0094286 A1 | 4/2009 | Lee et al. | |
| 2009/0097413 A1 | 4/2009 | Todd et al. | |
| 2009/0282438 A1 | 11/2009 | White et al. | |
| 2009/0300688 A1 | 12/2009 | Karaoguz et al. | |
| 2010/0043020 A1 | 2/2010 | Basso et al. | |
| 2011/0029639 A1 | 2/2011 | Todd et al. | |
| 2011/0030022 A1 | 2/2011 | Todd et al. | |
| 2011/0102600 A1 | 5/2011 | Todd et al. | |
| 2012/0014254 A1 | 1/2012 | Todd et al. | |
| 2012/0154515 A1 | 6/2012 | Todd et al. | |
| 2012/0154602 A1 | 6/2012 | Todd et al. | |
| 2012/0159560 A1 | 6/2012 | Todd et al. | |
| 2012/0159561 A1 | 6/2012 | Todd et al. | |
| 2012/0278829 A1 | 11/2012 | Todd et al. | |
| 2012/0320222 A1 | 12/2012 | Nakamichi et al. | |
| 2013/0111052 A1* | 5/2013 | Albal | H04N 21/23439 709/231 |

(56) References Cited

U.S. PATENT DOCUMENTS

| | | |
|---|---|---|
| 2013/0286868 A1 | 10/2013 | Oyman et al. |
| 2014/0137145 A1 | 5/2014 | Todd et al. |
| 2014/0215026 A1 | 7/2014 | Beeson et al. |
| 2015/0106831 A1 | 4/2015 | Todd |
| 2015/0181262 A1 | 6/2015 | Todd et al. |
| 2015/0341812 A1 | 11/2015 | Dion et al. |
| 2019/0082338 A1 | 3/2019 | Dion et al. |
| 2019/0082339 A1 | 3/2019 | Dion et al. |

OTHER PUBLICATIONS

Cho, et al., "Fast Reconfiguring Deep Packet Filter for 1+ Gigabit Network", University of California, available online at <http://www.isi.edu/~youngcho/pub/fccm05.pdf>, Sep. 2003, Sep. 2003, 10 pages.

Hartanto, "Cumulative Inter-ADU Jitter Concept and Its Applications", Dept. of Information Engineering, The Chinese University of Hong Kong, Shatin, NT, Hong Kong; Dept. of Electrical and Electronic Engineering, University of Canterbury, Christchurch, New Zealand, 2001, pp. 531-534.

Hummel, et al., "High-Speed Packet Filtering Utilizing Stream Processors", Wake Forest University, available online at <http://csweb.cs.wfu.edu/~fulp/Papers/spie09f.pdf>, Oct. 2003, Oct. 2003, 8 pages.

PCT/US2015/043087, "International Application Serial No. PCT/US2015/043087, International Preliminary Report on Patentability and Written Opinion dated Feb. 16, 2017", IneoQuest Technologies, Inc., 10 Pages.

PCT/US2015/043087, "International Application Serial No. PCT/US2015/043087, International Search Report and Written Opinion dated Nov. 24, 2015", Ineoquest Technologies, Inc., 19 Pages.

\* cited by examiner

VIDEO QUALITY MONITORING

CROSS-REFERENCE TO RELATED APPLICATIONS

This application is a continuation of U.S. patent application Ser. No. 14/814,705, filed on Jul. 31, 2015.

U.S. patent application Ser. No. 14/814,705 claims the benefit of U.S. Provisional Appl. 62/031,893 filed on Aug. 1, 2014.

All the above applications are incorporated herein by reference in their entirety.

RELATED APPLICATIONS

This application also cross-references to the following commonly-owned U.S. patent applications and hereby incorporates by reference each of these applications in its entirety: U.S. patent application Ser. No. 14/579,423, filed on Dec. 22, 2014, now U.S. Pat. No. 9,232,241; U.S. patent application Ser. No. 13/540,084, filed Jul. 2, 2012 now U.S. Pat. No. 8,943,530; U.S. patent application Ser. No. 12/608,764, filed Oct. 29, 2009, now U.S. Pat. No. 8,239,888; U.S. patent application Ser. No. 14/096,422, filed on Dec. 4, 2013; U.S. patent application Ser. No. 11/582,072, filed on Oct. 17, 2006, now U.S. Pat. No. 8,625,455; U.S. patent application Ser. No. 13/184,163, filed on Jul. 15, 2011, now U.S. Pat. No. 9,590,816; U.S. patent application Ser. No. 12/336,210, filed Dec. 16, 2008, now U.S. Pat. No. 8,588,069; U.S. patent application Ser. No. 11/396,753, filed on Apr. 3, 2006, now U.S. Pat. No. 8,838,772; U.S. patent application Ser. No. 10/604,997, filed on Aug. 29, 2003, now U.S. Pat. No. 7,321,565; U.S. Ser. No. 11/257,183, filed on Oct. 24, 2005, now U.S. Pat. No. 8,031,623; U.S. patent application Ser. No. 12/619,240, filed Nov. 16, 2009, now U.S. Pat. No. 9,367,614; U.S. Provisional Appl. 60/621,824, filed Oct. 25, 2004; and U.S. Prov. Appl. 61/229,851, filed on Jul. 30, 2009.

BACKGROUND

The present disclosure relates generally to the field of video quality monitoring, and in particular streaming media using Internet Protocol (IP) and General Packet Radio System Tunneling Protocol (GTP) or any similar current or future standards. More specifically, the present disclosure is related to monitoring and/or enhancing the video quality, such as for streaming media as seen by an end user on a mobile device 118.

Streaming media is an increasingly popular method for providing, and consuming, media products including various video and audio products, such as video on demand, Internet & television, streaming radio, and the like. However, data transport requirements for these applications exhibit high sensitivity to data loss and delivery time distortion and there are many factors that may impact the quality of the streaming media performance that can negatively impact the quality of service (QOS) and, thus, the subjective end user experience, quality of experience (QoE). A commonly experienced problem is a delay or freeze-frame experienced during consumption of the streaming media product, in which all media data downloaded to the client has been played, and the client is waiting for the next piece of media data. Such freezes, or hangs, give rise to user frustration and dissatisfaction.

In the interest of maintaining user satisfaction, and therefore user volume, streaming media providers are constantly working towards improving media distribution systems. However, given the complexity of streaming media distribution systems, it may often be difficult for a streaming media provider to determine what portions of the streaming media system are resulting in the greatest number of problems. As such, much resource allocation toward improving media distribution systems may often be expended relatively blindly. One root problem may be tied to the inability of media distribution providers to accurately assess the performance of their media distribution systems and identify the greatest weaknesses of the media distribution system.

As more users interact with streaming media on mobile devices 118 such as smart phones, pad computers, tablets, smart glasses, such as Google Glass, smart watches, and the like, the media distribution system expands to include the mobile telecommunications system where the distribution system used to deliver the streaming media may change as the users move geographically. The distribution system may move between cell towers, micro-cells, and the like and be influenced by the reception capability of the user's device.

There are various schemes to implement quality of service (QOS) on such networks to address the requirements of streaming media, especially when intermixed with conventional, time-insensitive, guaranteed delivery protocol stack data traffic. Furthermore, for efficiency reasons, the streaming media transport often uses a non-guaranteed delivery upper layer protocol stack such as UDP/IP making recovery of data in the presence of packet loss difficult. Regardless of whether QOS-enabled or non-QOS-enabled networks are employed, it is necessary to monitor the behavior of packet loss, delivery time distortion, and other real-time parameters of the network to assure satisfactory quality streaming media delivery. However, these schemes generally look at quality of service, QoS, only with respect to the delivery of individual data packets. Increasingly, videos are being transmitted as individual segments, where the delivery of the entire segment has more impact on video quality of experience than the delivery of individual packets.

Management Information Bases (MIBs) may include definitions for a number of network parameters such as packet loss, inter-arrival times, errors, percentage of network utilization, etc., whose purpose is to indicate to a network manager the general operating conditions of the network. Such traditional forms of monitoring network behavior cannot easily indicate the effects that network performance has on a single or a group of individual streaming media streams. Data gathering from MIBs operating across a range of network layers combined with a highly skilled and experienced practitioner would be required to simply determine the jitter imposed on a single MPEG video stream, for instance, and would only be possible by post-processing data gathered while the network was in operation. Determining the cause of a fault in a streaming media stream may be possible through such analysis but lacks the real-time indication of a network fault that is required to maintain high-quality networks such as for video or audio delivery. It also does not address the need to monitor large numbers of streams in real-time such as streams of Video-on-Demand (VoD) networks using less technically skilled operations personnel, as would be necessary to enable implementation of continuous cost-effective quality control procedures for widely deployed networks such as for VoD.

Histograms are often used to present the arrival time behavior of packets on a network, but such histograms may only represent the aggregate behavior of packets arriving at the measurement node due to the need to combine MIB data from a range of network layers to extract sufficient information to track a particular stream's performance. Traditional histograms define the jitter between any two packets. Streaming media requires more in-depth knowledge, such as the time variation across many packets referred to as the "network jitter growth". This network jitter growth affects the streaming media quality as experienced by the user due to intermediate buffer overflow/underflow between the media source and its destination.

Network jitter growth of a media stream due to traffic congestion may also be an indicator of an impending fault condition and determining its presence as it begins to occur may be used to avoid transport failures, rather than simply to react to faults after they occur. Conventional post-processed MIB analysis is inadequate for these purposes as described above.

The concept of regulating stream flow in a network based on the leaky bucket paradigm describes a methodology that might be used to prevent intermediate buffer overflow and packet jitter by regulating the outflow of data based on a set of parameters configured to optimize a particular flow. This does not address the need to analyze and continuously monitor multiple streams as is required during the installation and operation of networks carrying streaming media, especially for those enterprises whose revenue is derived from the high quality delivery of streaming media, such as broadcast and cable television entities.

A common scheme used to effectively monitor multiple video streams is to decode each stream's MPEG content (for the video example) and display the streams on a large group of television screens. Monitoring personnel then watch the screens looking for any anomalous indications and take appropriate corrective action. This is a subjective and error prone process, as there is a possibility that a transient fault might be missed. This is also a reactive process, as corrective action may only be taken after a fault has occurred. Furthermore, this is also a relatively expensive process in terms of both equipment and personnel costs. It also provides little or no indications of the root cause of the fault, thus adding to the time required for implementing corrective action. This approach also does not easily scale to modern video delivery systems based upon emerging, cost-effective high-bandwidth, networks intended to transport thousands of independent video streams simultaneously. In addition, this approach cannot pinpoint the location of the fault. To do so, the personnel and equipment must be replicated at multiple points in the distribution network, greatly increasing the cost. For this to be effective, the personnel must monitor the same stream at exactly the same time for comparison.

Many types of network delivery impairments are transient in nature affecting a limited number of packets during a period of momentary traffic congestion, for example. Such impairments or impairment patterns may be missed using traditional monitoring personnel watching video monitors. By not recognizing possible repeating impairment patterns, faults may exist for much longer periods because after the fault has passed, there is no residual trace information available for analysis. The longer a fault persists, the worse the customer satisfaction levels, and the greater the potential for lost revenues.

Streaming Video-over-IP is a technology that allows the end user to watch video content over an IP network. Examples of Video-over-IP include Video on Demand (VoD), and IPTV (Internet Protocol Television). A Video-over-IP network may include a service provider network including one or more remote video servers a core network (e.g., Internet), and a local hub/edge switch, such as a cable television (CATV) hub or Digital Subscriber Line Access Multiplexers (DSLAMs). This network is then coupled to customer premises equipment (CPE) such as a set top box (STB) and television (often including various other home networking equipment), via a Network Interface Device (NID) typically located at a consumer's home. In addition to delivering streaming media to the consumer's home, the Video-over-IP technology allows the consumer to control the stream through the STB, enabling features such as channel changes (by selecting the particular stream(s) to be delivered), fast forward, pause, and rewind.

A disadvantage of conventional streaming media is that the quality of the IP stream may be degraded as it travels over the network before arriving at the end point (e.g., a consumer's television). Service providers may place monitors at various points along the network to measure the quality of the video stream being provides using one of a variety of quality of service (QOS) metrics. In this manner, service providers may relatively easily measure QOS at points between a remote video server and a customer premise equipment to isolate network problems occurring therein. However, the QOS of ultimate concern is that experienced by the consumer at the video destination or end point, such as the consumer's television.

When responding to a customer complaint of poor video quality, a service provider may initially check the network for QOS issues. In the event an acceptable QOS is detected at hub, service providers generally have no choice but to send a service technician to the consumer's premises to attempt to isolate the problem within the CPE. As many QOS problems are transient, a service technician may be required to make repeated visits to a consumer's home, at various times of day, in order to locate and properly diagnose the problem(s). It has been estimated that in many instances, the total cost to a service provider of sending a service technician to a consumer's home is at least $1,000.00 per visit. The service provider's inability to remotely monitor the quality of service from outside the consumer's home thus tends to be responsible for relatively high customer service costs.

As increasing amounts of audio visual (AV) content is distributed over-the-air to consumer's mobile devices using cellular networks, another layer of complexity is added to the tracking of video QOS on consumer devices. The identification of points of QOS degradation across a media delivery system that spans multiple modalities becomes complex.

Audio visual (AV) content is typically distributed from one or more central locations to local markets over relatively complex networks spanning large geographical areas. This AV content is typically supported by advertisements. However, while the AV content is typically generated for wide distribution, e.g., to national or international markets, advertisements are often intended for comparatively narrow distribution, such as for regional or local audiences. Advertisements are thus often spliced into the AV content at the regional or local level. To accommodate this splicing, the originator of the AV content, e.g., the television network, typically supplies the content with embedded markers, such as those commonly referred to as "avails" and/or SCTE-35 advertisement cue signals. Local content providers, such as network affiliate television stations and/or cable television (CATV) operators may use these avails to properly insert these local advertisements. A typical hour of AV content, for example, may be provided with four avails each corresponding to a 30 second time slot, or two avails each corresponding to a one minute time slot. These time slots are thus available for insertion of local advertisements.

Automated equipment is typically used to detect the avails and to splice in the local advertising content to minimize errors. However, errors may occur due to many factors, including bottlenecks or other traffic issues within the content distribution network, by errors in placement or detection of the avails, or simply by poor quality of the advertisements being supplied to the local insertion point. Local advertisements may thus be spliced in too early or too late, at audio levels that may be too high or too low, or in generally poor condition. This may result in the advertisements overrunning portions of the program, the advertisements being cut off, and/or the advertisements simply being of generally poor quality. These errors are not only problematic from a quality of experience (QoE), the viewer's subjective experience of watching the video which may be represented by a variety of performance metrics, but may also result in substantial refunds being due to advertisers who typically pay sizable fees for the airing of each 30 or 60 second advertisement.

A related problem pertains to verification of correct advertisement insertion. In this regard, it is often difficult for a local television station or CATV company to refute refund claims by advertisers who complain that their advertisements were improperly inserted, or were otherwise of poor quality at particular locations within the distribution network. Even in the event the quality of the program and advertisement are monitored by the television station or CATV company at the central insertion location, there is no guarantee that the quality of the content was satisfactory as experienced by the end user.

In an information-based society, the rate at which information is received and disseminated may prove crucial with respect to the value of that information. The value of this information may be even more greatly impacted in sectors in which the decisions being made that are associated with the data are highly dependent upon the freshness of such information.

For example, advertisers have limited advertising budgets and choose which television/radio stations to advertise on based upon the ratings of that particular television/radio station. Unfortunately, the information provided to the advertisers that is used to make such advertising determinations may be stale. For example, rating information is typically presented in ratings books, which are often only compiled and released every three months. Accordingly, this may result in decisions being made based upon aged data that may have since changed considerably.

Accordingly, a need exists for monitoring QOS for video content on consumer devices and, when a degradation in QOS is observed, identifying where the degradation occurred across a media distribution system having a plurality of transport modalities, video processing modules and computer systems.

SUMMARY

In one aspect of the present disclosure, methods, systems and devices for monitoring the quality of traffic transmitted over a mobile network, such as video traffic, is disclosed. Embodiments include tapping into a mobile network traffic stream, organizing the tapped network traffic information into a collection associated with at least one individual video session associated with a single user and determining a video quality parameter for the at least one individual video session based at least in part on the collected information.

The video quality parameter may be at least one of packet jitter growth, packet loss, instantaneous flow rate balance (IFRB), delay between packets, a jitter statistic, a total time required to receive all packets needed to fully assemble a segment, a statistic of errors in key frames, Hypertext Transfer Protocol (HTTP) transport issues and errors (such as but not limited to 400 and 500 range HTTP responses), and Domain Name System (DNS) resolution performance and failures. Embodiments may further include aggregating context information for the at least one individual video session, wherein context information may include at least one of the cell tower, smart node, serving gateway node, user, subscriber level, device type, unique device identifier such Mobile Equipment Identifier (MEID), International Mobile Equipment Identity (IMEI), International Mobile Subscriber Identity (IMSI) and the like, application, and/or content provider involved in a situation of delivery of video traffic and transmitting aggregated context information and at least one video quality parameter, such as to a server, such as a video quality server.

The present disclosure describes a method for monitoring video quality transmitted over a mobile video delivery network facility, the method according to one disclosed non-limiting embodiment of the present disclosure can include tapping into a mobile network traffic stream on the mobile video delivery network facility; organizing traffic from the tapped mobile network traffic stream into at least one individual video session; determining a video quality parameter for the at least one individual video session wherein the video quality parameter is at least one of packet jitter growth, packet loss, instantaneous flow rate balance (IFRB), delay between packets, a jitter statistic, a total time required to receive all packets needed to fully assemble a segment, a statistic of errors in key frames, a measure of HTTP transport quality and a measure of DNS resolution performance; aggregating context information for the at least one individual video session wherein the context information includes at least one of a cell tower, smart node, serving gateway node, user, subscriber level, device type, application, and content provider; and transmitting the aggregated context information and at least one video quality parameter to a video quality server.

A further embodiment of any of the foregoing embodiments of the present disclosure may include, wherein the mobile network traffic stream includes General Packet Radio System Tunneling Protocol (GTP) header information.

A further embodiment of any of the foregoing embodiments of the present disclosure may include, wherein the individual video session is associated with at least one of a unique device and a unique mobile account.

A further embodiment of any of the foregoing embodiments of the present disclosure may include, wherein the individual video session is associated with a unique user.

The present disclosure describes a method for monitoring video quality transmitted over a mobile video delivery network facility the method according to one disclosed non-limiting embodiment of the present disclosure can include tapping into a mobile video delivery network facility traffic stream in at least two locations; organizing traffic from the tapped mobile video delivery network traffic stream into at least one individual common video session identified at each location; determining a video quality parameter associated with each location for the at least one individual common video session wherein the video quality parameter is at least one of packet jitter growth, packet loss, instantaneous flow rate balance (IFRB), delay between packets, a jitter statistic, a total time required to receive all packets needed to fully assemble a segment, a statistic of errors in key frames, a measure of HTTP transport quality and a measure of DNS resolution performance; aggregating context information for the at least one individual video session wherein the context information includes at least one of a cell tower, smart node, serving gateway node, user, subscriber level, device type, application, and content provider; and transmitting the aggregated context information and at least one video quality parameter to a video quality server.

A further embodiment of any of the foregoing embodiments of the present disclosure may include, wherein at least one of the locations is in at least one of an LTE mobile core between an S5/S8 interface and an S11 interface and the LTE mobile core between an S1 interface and the S5/S8 interface.

A further embodiment of any of the foregoing embodiments of the present disclosure may include, wherein at least one of the locations is outside of the LTE mobile core.

A further embodiment of any of the foregoing embodiments of the present disclosure may include, wherein at least one of the locations is on a mobile viewing device.

A further embodiment of any of the foregoing embodiments of the present disclosure may include, wherein one of the locations in the LTE mobile core is a virtual probe.

The present disclosure describes a method for monitoring video quality transmitted over a mobile video delivery network facility the method according to one disclosed non-limiting embodiment of the present disclosure can include, tapping into a mobile video delivery network traffic stream in at least two locations wherein at least one of the locations is a passive monitor and at least one of the locations is an active monitor; organizing traffic from the tapped mobile video delivery network traffic stream into at least one individual common video session identified at each location; determining a video quality parameter associated with each location for the at least one individual common video session wherein the video quality parameter is at least one of packet jitter growth, packet loss, instantaneous flow rate balance (IFRB), delay between packets, a jitter statistic, a total time required to receive all packets needed to fully assemble a segment, a statistic of errors in key frames, a measure of HTTP transport quality and a measure of DNS resolution performance; aggregating context information for the at least one individual video session wherein the context information includes at least one of a cell tower, smart node, serving gateway node, user, subscriber level, device type, application, and content provider; and transmitting the aggregated context information and at least one video quality parameter to a video quality server.

A further embodiment of any of the foregoing embodiments of the present disclosure may include, wherein one of the locations is a virtual probe in the LTE mobile core.

The present disclosure describes a method for monitoring video quality transmitted over a mobile video delivery network facility the method according to one disclosed non-limiting embodiment of the present disclosure can include, tapping into a mobile video delivery network traffic stream in at least two locations wherein at least one of the locations is a mobile device using an SDK; organizing traffic from the tapped mobile video delivery network traffic stream into at least one individual common video session identified at each location; determining a video quality parameter associated with each location for the at least one individual common video session wherein the video quality parameter is at least one of packet jitter growth, media delivery quality, packet loss, instantaneous flow rate balance (IFRB), delay between packets, a jitter statistic, a total time required to receive all packets needed to fully assemble a segment, a statistic of errors in key frames, a measure of HTTP transport quality and a measure of DNS resolution performance; aggregating context information for the at least one individual video session wherein the context information includes location and at least one of a cell tower, user, subscriber level, device type, application, and content provider; and transmitting at least location and one media delivery quality metric to a video quality server.

A further embodiment of any of the foregoing embodiments of the present disclosure may include, wherein the video quality server is one of a physical server and a virtual server.

The present disclosure describes a method for monitoring video quality transmitted over a mobile video delivery network the method according to one disclosed non-limiting embodiment of the present disclosure can include, tapping into a mobile video delivery network traffic stream in at least two locations; organizing traffic from the tapped mobile video delivery network traffic stream into at least one individual common video session identified at each location; determining a video quality parameter associated with each location for the at least one individual common video session wherein the video quality parameter is at least one of packet jitter growth, media delivery quality, packet loss, instantaneous flow rate balance (IFRB), delay between packets, a jitter statistic, a total time required to receive all packets needed to fully assemble a segment, a statistic of errors in key frames, a measure of HTTP transport quality and a measure of DNS resolution performance; aggregating user information parameters for the at least one individual video session wherein the user information parameters include location of user, subscriber level, device type, application, user interactions with application; user interactions with device and content provider; and transmitting at least one video quality parameter and one user information parameter to a video quality server.

The present disclosure describes a method for monitoring quality of a video session that uses video traffic transmitted over a mobile video delivery network facility the method according to one disclosed non-limiting embodiment of the present disclosure can include, monitoring a first mobile video delivery network facility that handles at least a portion of the video traffic for the video session for information about the video traffic, wherein the first mobile video delivery network facility is located in an LTE mobile core monitoring a second mobile video delivery network facility that handles at least a portion of the video traffic for the video session for information about the video traffic, wherein the second mobile video delivery network facility is located external to an LTE mobile core; and associating the information collected from the two mobile video delivery network facilities about the video traffic with a common video session; and determining a video quality parameter relating to the quality of the video session based on the collected information about the video traffic.

A further embodiment of any of the foregoing embodiments of the present disclosure may include, wherein the LTE mobile core consists of a packet data network gateway, a serving node gateway, a base station and at least one of a control plane and a user/data plane and wherein a location of the LTE mobile core is at least one of an S5/S8 interface, an S11 interface and an S1 interface.

A further embodiment of any of the foregoing embodiments of the present disclosure may include, wherein the second mobile video delivery network facility is one of the group of a stream ingestion location, cache distribution network, head-end, edge distribution location and Adaptive Bit Rate Sources (ABR).

A further embodiment of any of the foregoing embodiments of the present disclosure may include, wherein the second mobile video delivery network facility is a viewing device.

A further embodiment of any of the foregoing embodiments of the present disclosure may include, wherein the viewing device is at least one of a mobile phone, a laptop computer, a tablet and a television.

The present disclosure describes a method for monitoring quality of a video session that uses traffic transmitted over a core mobile video delivery network facility the method according to one disclosed non-limiting embodiment of the present disclosure can include, tapping into at least one device within the core mobile video delivery network facility using a virtual probe that is disposed within the at least one device, wherein the virtual probe reports at least one of information about operation of the device and performance of the core mobile video delivery network facility to a host system that collects information about the performance of the core mobile video delivery network facility.

A further embodiment of any of the foregoing embodiments of the present disclosure may include, wherein the device is a small cell hardware device.

A further embodiment of any of the foregoing embodiments of the present disclosure may include, wherein the probe performs active media stream monitoring.

A further embodiment of any of the foregoing embodiments of the present disclosure may include, wherein the probe performs passive monitoring.

A further embodiment of any of the foregoing embodiments of the present disclosure may include, wherein the probe performs both active media stream monitoring and passive monitoring.

A further embodiment of any of the foregoing embodiments of the present disclosure may include, wherein reporting the performance of the delivery network includes reporting on at least one of quality of the video stream through the device and quality of the network traffic through the device.

The present disclosure describes a method for monitoring quality of a video session that uses traffic transmitted over a mobile video delivery network facility the method according to one disclosed non-limiting embodiment of the present disclosure can include, monitoring the mobile video delivery network facility that handles at least a portion of video traffic for the video session for information about the video traffic at a location of the mobile video delivery network facility; monitoring at least one user mobile device that plays video delivered by the mobile video delivery network facility using a software development kit (SDK) that reports at least one media delivery quality metric; and delivering information concerning the monitored device and facility from a location of the mobile video delivery network facility and from the SDK to a collection application.

A further embodiment of any of the foregoing embodiments of the present disclosure may include, wherein the collection application is a virtualized application.

A further embodiment of any of the foregoing embodiments of the present disclosure may include, wherein the collection application is deployed on a dedicated server.

A further embodiment of any of the foregoing embodiments of the present disclosure may include, wherein the collection application is used to measure an impact of a state of the monitored user mobile device on the quality of the video played on the mobile device.

The present disclosure describes a method for monitoring quality of a video session that uses video traffic transmitted over a mobile video delivery network facility the method according to one disclosed non-limiting embodiment of the present disclosure can include, monitoring a first mobile delivery network facility that handles at least a portion of the video traffic for a session for information about the video traffic for at least one operational metric; monitoring a second mobile video delivery network facility that handles at least a portion of the video traffic for the session for information about the video traffic for at least one behavioral metric; and reporting the at least one operational metric and the at least one behavioral metric to a collection application.

A further embodiment of any of the foregoing embodiments of the present disclosure may include, wherein the collection application is a virtualized application.

A further embodiment of any of the foregoing embodiments of the present disclosure may include, wherein the collection application is deployed on a dedicated server.

A further embodiment of any of the foregoing embodiments of the present disclosure may include, wherein the collection application is used to measure an impact of a state of a monitored location of the mobile video delivery network facility on the quality of the video session played on a mobile device.

A further embodiment of any of the foregoing embodiments of the present disclosure may include, wherein the at least one operational metric is selected from the group consisting of is at least one of packet jitter growth, media delivery quality, packet loss, instantaneous flow rate balance (IFRB), delay between packets, a jitter statistic, a total time required to receive all packets needed to fully assemble a segment, statistics of errors in key frames, a measure of HTTP transport quality and a measure of DNS resolution performance.

A further embodiment of any of the foregoing embodiments of the present disclosure may include, wherein the at least one behavioral metric is selected from the group consisting of TCP video access time exceeded, TCP video access failure, buffer fill time exceeded, buffer full condition not met, download rate, video terminated by server, video terminated by network, video sessions counted, video startup time exceeded, video startup time failure, service access time exceeded, service access failure, DNS lookup time exceeded, DNS lookup failures, user-communicated video quality, user selected early session termination, and user selected trick modes.

The present disclosure describes a method for monitoring quality of a video session that uses traffic transmitted over a mobile video delivery network facility the method according to one disclosed non-limiting embodiment of the present disclosure can include, monitoring a server that is a source of video traffic for a video session delivered over a mobile video delivery network facility using a passive monitor; monitoring the server that is the source of video traffic using an active monitor that pulls media segments from the server using the mobile video delivery network facility; reporting information from the passive monitor and the active monitor to a remote collection and computing system; and at the remote collection and computing system, correlating response times from the active monitor and the passive monitor to determine performance of at least one of a mobile video delivery network facility and a content delivery network (CDN) facility with respect to at least one metric.

A further embodiment of any of the foregoing embodiments of the present disclosure may include, wherein the remote collection and computing system is a virtualized system.

A further embodiment of any of the foregoing embodiments of the present disclosure may include, wherein the remote collection and computing system is a dedicated system.

A further embodiment of any of the foregoing embodiments of the present disclosure may include, wherein the at least one metric is selected from the group consisting of caching performance and network response time, a media delivery composite metric, a measure of quality of experience, a measure of real-time capacity of a cell tower to deliver video traffic, a quality-of-service tag, and an indicator of prioritization applied to the viewing device.

The present disclosure describes a method for monitoring quality of a video session that uses traffic transmitted over a mobile video delivery network facility the method according to one disclosed non-limiting embodiment of the present disclosure can include, monitoring at least one device within the mobile video delivery network facility using a transparent proxy server that is disposed within the at least one device, wherein the transparent proxy server reports at least one of information about operation of the device and performance of the mobile video delivery network facility to a host system that collects information about the performance of the mobile video delivery network facility.

BRIEF DESCRIPTION OF THE DRAWINGS

The above and other features and advantages of this disclosure will be more readily apparent from a reading of the following detailed description of various aspects of the disclosure taken in conjunction with the accompanying drawings, in which.

DETAILED DESCRIPTION

Figure 1:
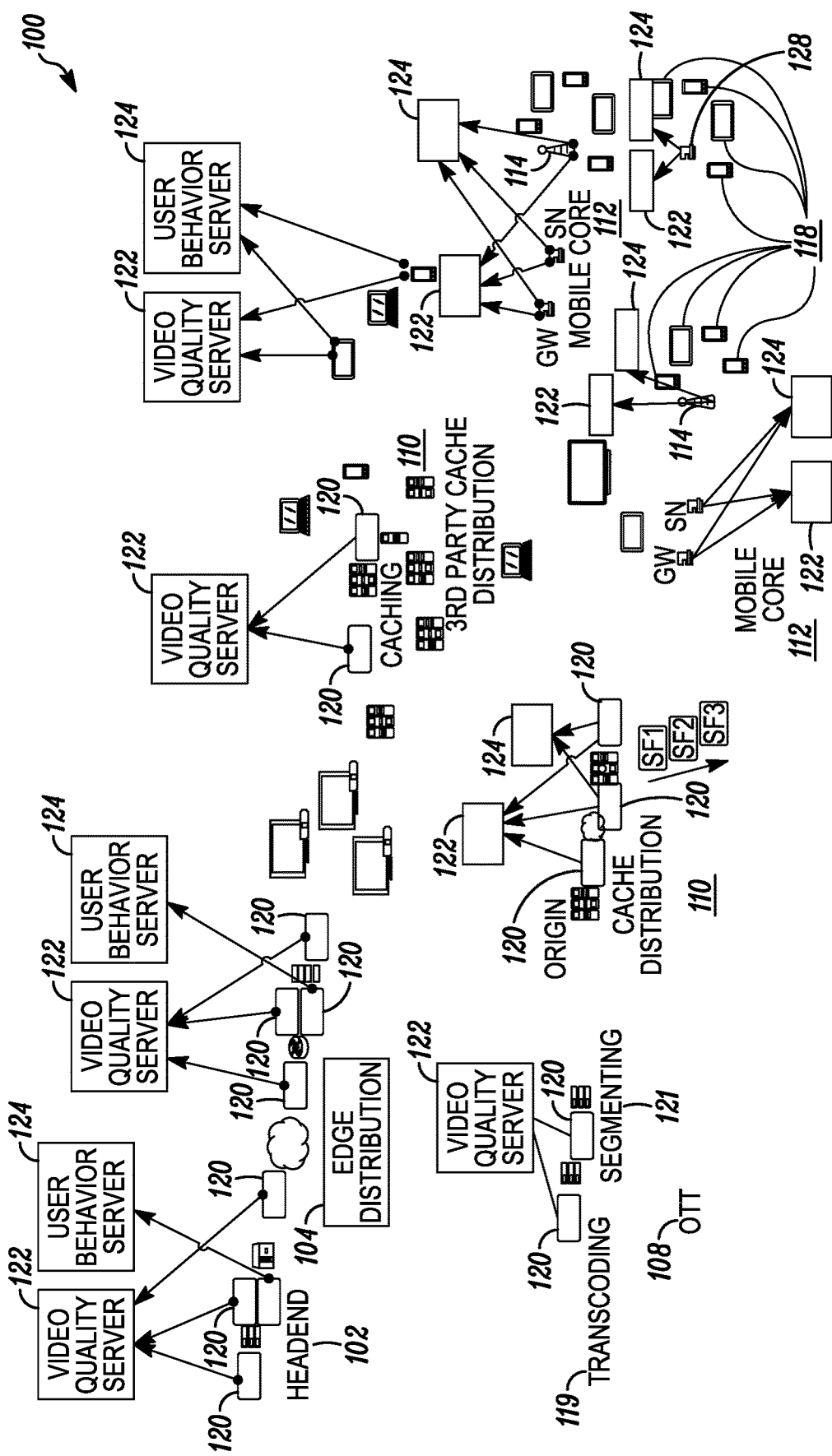
FIG. 1 is a diagrammatic view of a media distribution system.

A media distribution system 100 (FIG. 1) such as a video delivery network facility, mobile video delivery network facility, and the like, generally includes a number of elements between an original video source, such as a head end 102 and an end user, such as an end user of a mobile device 118 (e.g., a smartphone). These elements may include one or more video origination sources (head ends 102); edge distribution sites 104 to support linear video distribution such as the head end of a cable distribution network; elements for multi-screen and over-the-top (OTT) distribution, such as elements 108 for transcoding 119 and segmenting 121 and elements for cache distribution 110. The media distribution system 100 may have an over-the-air broadcast facility, an internet distribution facility, or other network distribution design, enabling reception by smart phones, tablets, laptops, and smart TVs using networks with time varying bandwidth capabilities, which leverage Adaptive Bit Rate (ABR) sources 108, where the signal may be divided into segments 121 and transcoded 119 to support a plurality of frame rates and resolutions. The system 100 may have private or third party cache distribution centers 110 where the processed video may be staged closer to the end consumer to ease network congestion by limiting requests for video data from being sent further back up the media distribution system 100. As the use of mobile devices 118 such as smart phones, pad computers and tablet computers increases, the media distribution system 100 may comprise mobile cores 112, which may receive incoming video segments from cache distribution centers 110, edge distribution sites 104, and the like, and transmit the video segments using one or more of cellular towers 114, smart cells 128 (such as femto-cells, pico-cells, relay repeaters, and the like), and the like. References herein to smart cells 128 imply one or more of femto-cells, pico-cells, relay repeaters, and the like. The video segments may be transmitted using technology such as 3G, 4G, and the like and wireless communication standards such as Long-Term Evolution (LTE), and the like. The system may comprise a mobile core with components such as a Mobile Management Entity (MME) as the key control node for access to the LTE network, Serving Gateways (SGW), Packet Data Network Gateways (PGW), protocols such as the interface between the SGW and the PGW (S5/S8 interface), the interface between the MME and the Serving Gateway (S11 interface), the control interface between the MME and the transmitter (S1 interface), components to provide Radio Access Network (RAN) and the like. The transmitted video segments may be received by mobile devices 118 such as smart phones, pad computers, smart tablets, laptop computers, and the like, and displayed to the end user.

Figure 2:
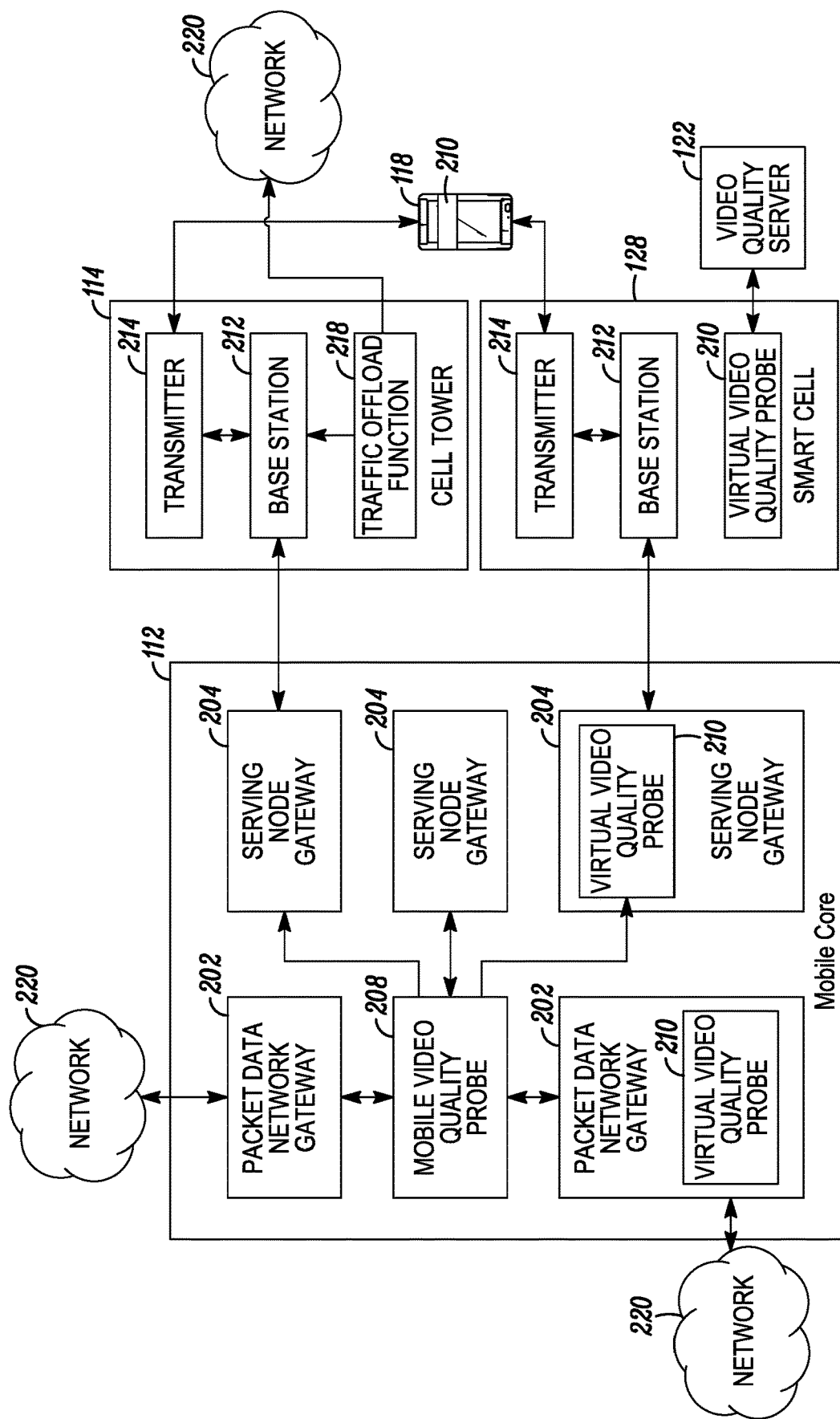
FIG. 2 is a diagrammatic view of a mobile core within a media distribution system.

Referring to FIG. 2, the mobile core 112 may include a packet data network gateway 202 which interfaces with common public and private networks 220 such as the Internet, world wide web, private networks, and the like supporting standards such as TCP/IP. The packet data network gateway 202 may receive video data packets from cache distribution networks 110, edge distribution sites 104, and the like where a plurality of video data packets may be assembled to form a single video segment. The packet data network gateway 202 may further encapsulate the video data packets in one or more additional suites of protocols, such as the General Packet Radio System Tunneling Protocol (GTP), and the like, to support switching of video data packet delivery among different serving gateways 204 as mobile devices 118 move in and out of range of different cell towers 114, smart cells 128, and the like.

Cell towers 114, smart cells 128, and the like generally include a base station 212, which communicates with the mobile core 112 through a serving node gateway 204, and a transmitter (e.g. a cell tower 214, a smart cell 128, small cell nodes such as a femto-cell, and the like) for broadcasting the mobile communications. In some embodiments, a cell tower 114 or smart cell 128 may also include a traffic offload function 218. The traffic offload function 218 may be used to relieve the load on the mobile core 112 network by providing an alternate means to communicate with content providers such as cache distribution sites 110, edge distribution sites 104, video quality servers 122, user behavior servers 124, application servers, and the like through interfaces with common public and private networks 220 such as the Internet, world wide web, private networks, and the like supporting standards such as TCP/IP. The traffic offload function 218 may be implemented on a separate computing device or as a virtual device on the computing device used for the base station 212.

Video quality probes 120 may be positioned at a plurality of locations within the media distribution system 100 such as a head end 102, edge distribution locations 104, ABR sites 108 such as after transcoding and segmenting, cache distribution sites 110, and the like. Video quality probes 120 may be positioned in one or more locations within the mobile core 112 such as between the external network and the packet data network gateway 202, between the packet data network gateway 202 and one or more serving gateways 204 at the S5/S8 interface, between a serving gateway 204 and a cell tower 214 or smart cell 128, and the like. Video quality probes 120 positioned in the mobile core 112 may be referred to as mobile video quality probes 208. Mobile video quality probes 208 may be positioned to monitor traffic at a base station 212. A video quality probe 120 may be positioned to monitor video traffic being handled by the traffic offload function 218.

Video quality probes 120 may be passive and monitor the traffic on the network. Video quality probes 120 may be active and request (pull) media segments of the source servers utilizing a mobile delivery network. By correlating response times from the active monitor with response times from a passive monitor, the cache distribution network and the delivery network may be evaluated for caching performance, network response times, media delivery composite, Quality of Experience metrics, real-time capacity of a cell tower to deliver video traffic, Quality-of-Service tagging, prioritization applied to the viewing device and the like. If a source server is repeatedly receiving requests for the same requested data for example, it may be inferred that the cache distribution network is not properly caching the content. One advantage is that the monitored cache distribution network does not require embedded instrumentation to derive performance.

For locations across the mobile core and radio access networks (RAN), a mobile video quality probe 208 may be a virtual video quality probe 210 running on computer hardware associated with other components of the media distribution system 100 such as the packet data network gateway 202, serving gateway 204, cell tower 114, smart cell 128, final display device such as a mobile device 118, and the like or elsewhere in an offsite data cloud. For locations handling large volumes of data, a mobile video quality probe 208 may be a physical network interface device connected to one or more computing elements.

Mobile video quality probes 208 or virtual video quality probes 210, positioned within the mobile core or the radio access network, may strip the information in the GTP packets associated with a given video stream to gather additional information to associate with the video stream such as subscriber ID, cell tower, smart cell, account, supplemental gateway, and the like.

In the discussion herein it should be understood that references to video quality probes 208 are also representative of mobile video quality probes 208 and virtual video quality probes 210.

Video quality may be monitored at various locations in the media distribution system 100. In embodiments, video quality may be monitored at two or more locations and changes in video quality between locations may facilitate identifying one or more locations of video quality degradation within a media distribution system 100. Video quality may be monitored using video quality probes 120 and the data related to video quality measurements transmitted to one or more video quality servers 122. Additionally, user behavior may be measured and behavioral metrics and data transmitted to user behavior servers 124. Video quality servers 122, and user behavior servers 124 may exist on common computer hardware, be virtual servers on other devices, may be distributed in the cloud and the like. User behavior data may be correlated with video quality data at an individual session level to provide enhanced insight into the impact of video quality on user behavior such as switching between applications, switching between video sources for content (e.g. Netflix™ vs. Hulu™) video content, discontinuing video viewing and the like.

In embodiments, video quality may be tracked, at a video session level of awareness, at each point in the system 100 (e.g., by cell node, by cell tower, by cache, by viewing device, by unique device identifier such Mobile Equipment Identity (MEI), International Mobile Equipment Identity (IMEI) and the like, by unique subscriber ID such as International Mobile Subscriber Identity (IMSI) and the like, etc.), and various video quality parameters that impact the end user experience calculated and stored. These parameters may provide insight not just into the packet speed in a given part of a network, but also to a range of other factors that impact the end user's experience of a video session. To achieve this result, packets may be associated with a unique video session, a unique viewing device, a unique user and, in certain optional embodiments, deep packet inspection may be used to determine information, such as the nature of the content that is being delivered. Fields of a packet may be used to classify the type of traffic, which allows generation of parameters and metrics that are relevant to the quality of experience an end user will experience with respect to that particular type of traffic. In contrast to conventional approaches that focus just on the speed at which packets flow through an element of the media distribution system 100, the methods and systems disclosed herein allow determination, at an individual session level, of metrics representative of actual end user quality for a given type of experience. These metrics in turn allow various analytics relating to the overall experience of users, and what policies, network elements (or absence of elements), and the like are leading to sub-optimal end user experiences. Video quality data and user behavior data may be correlated at the individual session level.

Among other things, tracking end-to-end quality at the session level allows pinpointing of problems, such as where in the network a policy may be resulting in a negative experience, where equipment failures may be leading to problems, and where new equipment, if deployed, might improve a user's experience. Such analytics may be applied at the level of groups of sessions, such as determining that all users with iPads in a given area are typically experiencing buffering delays for a given type of video (e.g., HD) from a given supplier (e.g., Netflix™) in a given area.

Analytics relating to content of packets are particularly beneficial in mobile delivery networks, where video is often sent in many small files that are sent independently to the client mobile device 118 (e.g. smartphone). Metrics described herein identify and quantify various factors throughout the end-to-end system that contribute to potential delay of arrival of related files. Understanding the content of files (as opposed to just counting packet speed) becomes important, because it is not only the speed of arrival of packets, but the relationship of the packets to each other, within the context of the entire session that is important in determining quality of experience. Thus, not just inter-packet delay, but the relationship in timing of all packets in a session to the other packets in that session, determines session quality.

In embodiments the methods and systems disclosed herein take information from deep packet inspection that indicates the routing of packets (e.g., which cell towers 114, smart cells 128 or the like have been used). This allows analysis of the impact of routes (and the equipment on those routes) on end user video session quality. User session metrics and alarms may include one or more of TCP video access time exceeded, TCP video access failure, buffer fill time exceeded, buffer full condition not met, download rate, video terminated by server, video terminated by network, video sessions counted, video startup time exceeded, video startup time failure, service access time exceeded, service access failure, DNS lookup time exceeded, DNS lookup failures, user device ID, user identification and the like.

In embodiments, the methods and systems disclosed herein may deploy deep packet inspection engines at a plurality of locations within the media distribution system 100 allowing determination as to where in the overall distribution chain a problem may have arisen. For example, a problem may arise at the caching server 110, rather than at the mobile core 112. Thus, the methods and systems disclosed herein allow comparison of operational characteristics, relevant to the level of video session quality for the end user, based on deep packet inspection information from multiple, distinct networks (e.g., using DPI data from the mobile core, DPI data from the source/origin network from which the video was originally delivered, and DPI data from a mobile device on which the video is being viewed). In addition, such data may be combined with other information, such as behavioral metrics and analytics data (e.g., indications that users abandoned particular content soon after the start of streaming a particular type of video session), to inform what changes in equipment, policy, or the like will provide the greatest overall improvement to end user experiences. In embodiments, use of DPI data from distinct networks allows comparison of video delivery networks (e.g., comparing Limelight™ and Akamai™ networks for delivery of a particular video session). This in turn allows a provider (e.g., Netflix™) to observe sub-optimal video quality for the end user (e.g., buffering) on one network/application and immediately switch the user to a network/application that has a better experience. Thus, methods and systems disclosed herein enable intelligent switching of a delivery network and/or application for video delivery, based on measures of user experience at the session level, including based on deep packet inspection across multiple network types and multiple types of video delivery equipment.

In embodiments, a DPI engine may be deployed on the client device itself, taking TCP/HTTP statistics from the device itself (as opposed to or in addition to taking data from an application). The DPI engine may be serially in line for packet delivery, allowing corrupt manifest detection. DPI inspection from a client, such as a mobile device 118, may augment information from the caching server, mobile core, or other locations to provide end-to-end pinpointing of problems in policy, equipment, or the like.

Many streaming media systems, such as VoD, broadcast television control centers, satellite-based video distribution operations, and the like utilize packetized data networks for their low-cost and omnipresence in modern data systems. The present disclosure monitors these existing network conduits by sampling the data contained therein with minimal alteration of its characteristics.

Figure 3A:
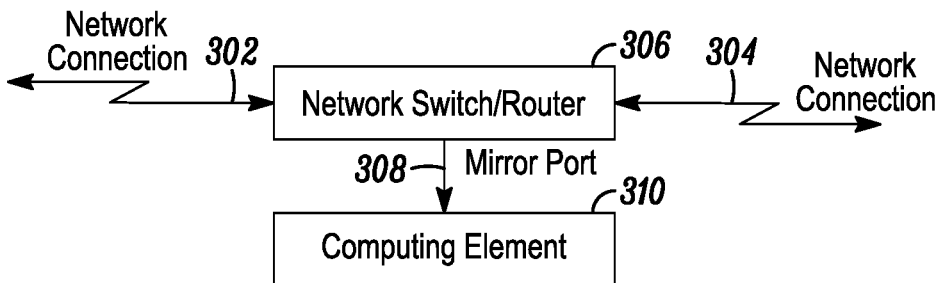
FIGS. 3A-3C are diagrammatic views of methods of tapping an existing network traffic flow via the present disclosure's computer element.
Figure 3B:
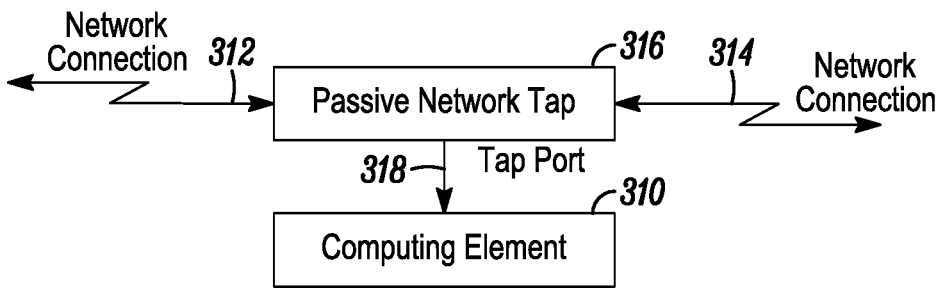
Figure 3C:
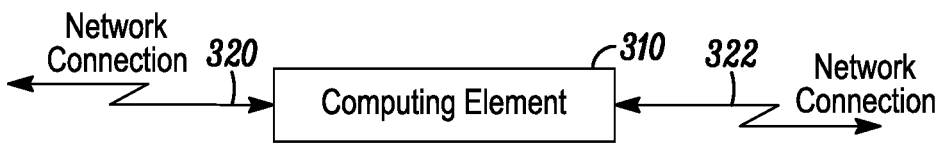

The video quality probes 120 generally include a way to tap into the network traffic flow of the media distribution system 100 with only minimum impact on the throughput of the network traffic flow. FIGS. 3A-3C illustrate several methods of physically tapping an existing network traffic flow to direct network traffic or a copy thereof to the video quality probe 120, also referenced herein as a computing element 310. FIG. 3A illustrates a setup wherein an ordinary network switch or router 306, which, while performing packet switching or routing on the traffic from its many ports, such as 302 and 304, also provides for a "mirror" or "monitor" port 308. Mirror port 308 makes all data from a desired port available to the present disclosure's video quality probe 120 or computing element 310.

Alternatively, as shown in FIG. 3B, a passive network tap 316 diverts a portion of the network traffic flow energy from one network port 312 to the other network port 314 and transmits that portion via a tap port 318 to the present disclosure's video quality probe 120 or computing element 310. FIG. 3C illustrates yet another method to tap the existing network flow via inserting the present disclosure's video quality probe 120 or computing element 310 directly in-line with the network link to be observed via network ports 320 and 322. In some embodiments the video quality probe 120 may be a virtual video quality probe 210. A virtual video quality probe 210 may use tap into the network using a transparent proxy server which transfers network traffic between two applications such as between a video display application and a network communication module while also mirroring or forwarding a copy of the network traffic to a video quality probe 120 208 210. Network taps may be located at a plurality of locations across the media distribution system 100 such as in the mobile core 112 (e.g. at a cell tower, at a smart cell, between gateway servers, and the like), at Content Distribution Networks (CDNs), at edge distribution sites 104, at the head end 102 of the mobile distribution system, and the like.

In the examples of FIGS. 3A-3B, the video quality probes 120 and computing elements 310 used in each case are identical. In the example of FIG. 3C, the video quality probe 120 or computing element 310 also actively forwards all traffic from network connection 110 to network connection 111 and vice versa, while simultaneously providing all traffic to the equivalent internal functionality of the video quality probes 120 or computing elements designated 310.

On mobile devices 118 it is preferable that the examination of the video data packets is done in such a way that there is minimal direct interaction with, or impact on, the functionality of the video player, operating system, and such. Mobile video quality probes 208 and virtual video quality probes 210 may be deployed using a transparent proxy server, which may reduce the need for customization of the video quality probe 120 for different environments. A transparent proxy server may be used to both relay packets between the device's player application and the network interface while providing access to the media stream of interest to the mobile video quality probe 208 for the evaluation of the video packet and transaction timing, video quality metrics, and the like. The transparent proxy server may also collect information on the native video player and the device's operating system. Because the transparent proxy server interacts with the network interface rather than the network it need not be adapted for the specifics of the network type (Wi-Fi, cellular, et.) and has very little impact on overall performance as measured by metrics such as CPU usage, battery usage, and the like.

Figure 4:
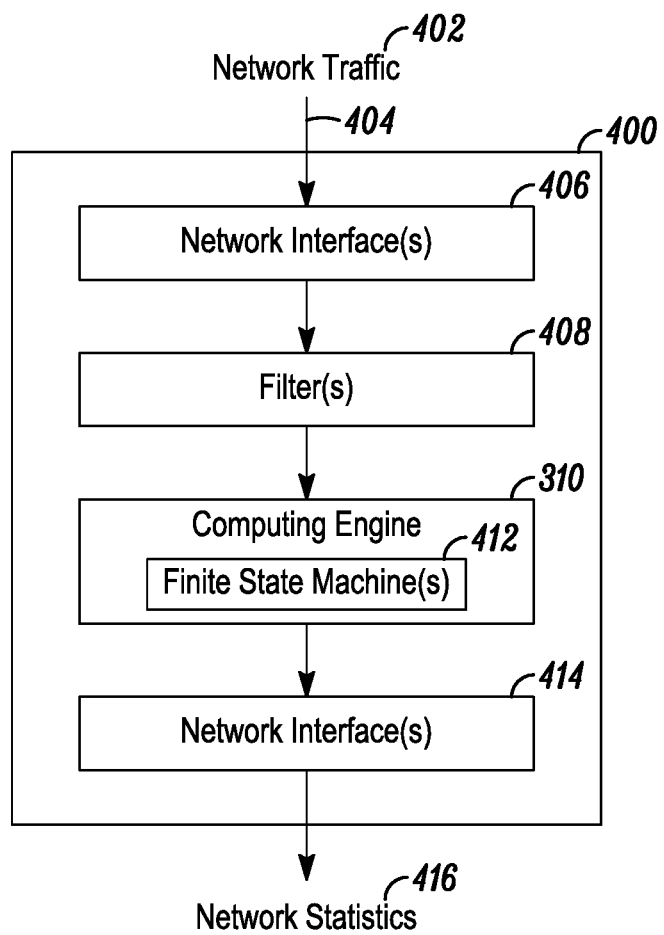
FIG. 4 is a diagrammatic view of one embodiment of the present disclosure's video quality probe.

FIG. 4 illustrates one embodiment of the present disclosure's video quality probe 120 that analyzes traffic across the media distribution system 100. Video quality probe 120 comprises at least one network interface 406 to receive network traffic, one or more filters 408 to filter the received network traffic, at least one computing engine 310 to compute network statistics associated with the filtered network traffic via one or more finite state machines 412, and at least one network interface 414 to accept control instructions and transmit the computed statistics to a data consumer such as a video quality server 122. Network interface 406 interfaces with the network link to be monitored via network connections 404. Network link protocols that support such packet-based transmission include, but are not limited to, 802.3 (Ethernet), 802.4, 802.5, USB, ATM, SONET, 802.11, Fibre-channel, Firewire or 1394, Infiniband, Bluetooth, 802.11, 802.15, 802.16, 802.17, ZigBee, General Packet Radio System Tunneling Protocol (GTP), cellular technologies such as 3G, 4G, LTE and the like, S5/S8 and S11 interfaces within the mobile core, or a native streaming video interface such as DVB-ASI.

The streaming media traffic of interest, which may consist of many individual streams of traffic, is filtered (via one or more filters 408) from the general incoming network traffic 402 and processed by the finite state machines 412 of computing engine 310 to reduce its measured transmission characteristics to a set of statistics or critical parameters known as an "Index". The Index and other network statistics 416 may be communicated to a logging system via one or more network interfaces 414 with alarm values set for convenient human monitoring such as at the video quality server 122. For example, warnings may be forwarded to a data consumer when the computed statistics exceeds a predetermined threshold or rate-of-change. It should be noted that one computing engine may be used to track several streams of interest. Similarly, one or more computing engines may be used to track several streams of interest. Hence, the number of computing engines or the number of streams to be tracked should not be used to limit the scope of the present disclosure.

In one preferred embodiment, the Index, known as the Media Delivery Index (MDI) consists of two parts: the Delay Factor (DF) and the Media Loss Rate (MLR). This embodiment is especially valuable for constant bit rate MPEG-2 Transport Streams carried over a network such as a packetized network. The DF represents the Instantaneous Flow Rate Balance (IFRB) and is derived in the computing element. The MLR represents the number of lost or corrupted media packets and is readily derived from tracking the Continuity Counter (CC) for the MPEG-2 transport stream application or from a sequence counter or the like for protocols, such as RTP, which support the same. The MDI (DF:MLR) then represents the two key factors which describe the dynamic behavior of streaming media over packetized networks: packet jitter growth and packet loss. This Index provides at-a-glance determination of traffic impairment as well as an indication of the operating margin of a network. By modifying the calculation of the IFRB, the DF may also be used with variable bit rate streaming media transport over packetized networks.

Figure 5:
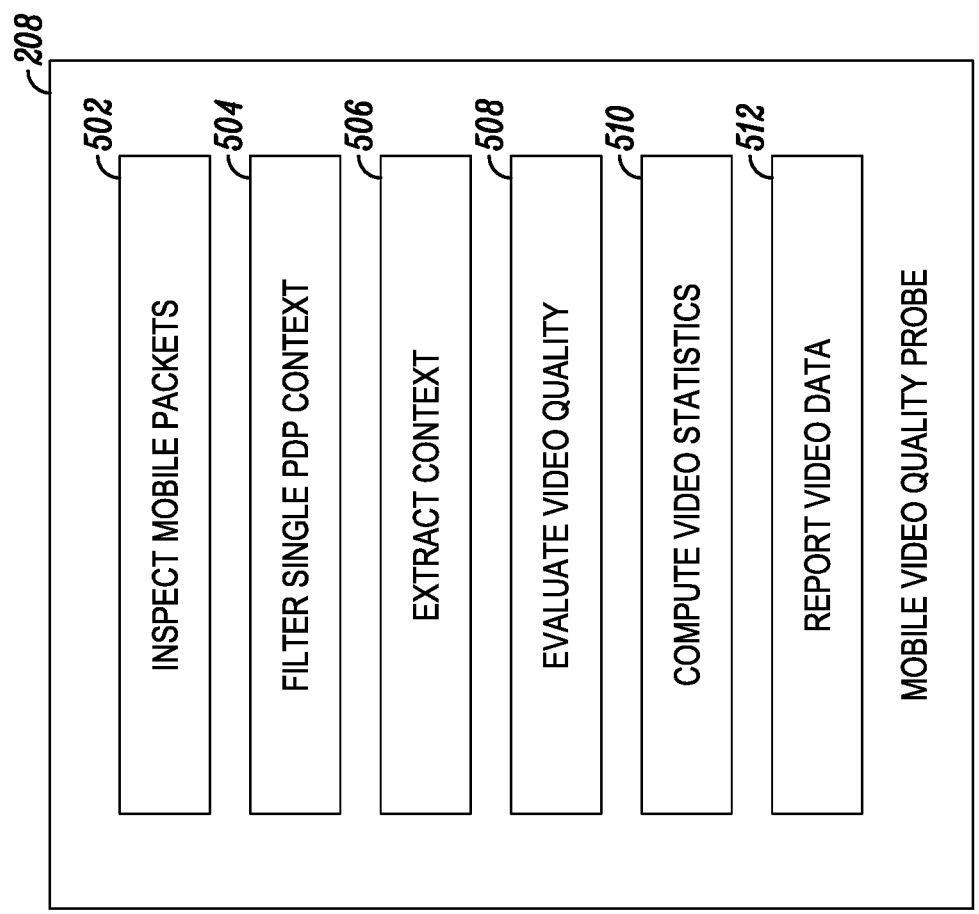
FIG. 5 is a flowchart of the operations of a mobile video quality probe.

Referring to FIG. 5, mobile video quality probes 208 may first inspect each mobile packet (step 502) to distinguish between GTP-U (general packet radio system (GPRS) tunneling protocol—user data packets and GTP-C (general packet radio system (GPRS) tunneling protocol—command and control packets. The GTP-U packets are also known as "GPRS-tunneling protocol 'U'" are used for carrying user data within the GPRS core network and between the access network and the core network. The GTP-C packets are also known as "GPRS—tunneling protocol 'C'" packets and are used within the GPRS core network for signaling between gateway GPRS support nodes (GGSN) and serving GPRS support nodes (SGSN). GTP' nodes have the same structure as GTP-C and GTP-U packets, but have an independent function for carrying charge data in certain applications.

GPRS packets may be examined and context information extracted. Context information may be used to filter packets (step 504) and separate packets into discrete packet streams, each packet stream associated with a single user section or PDP context. Additional context may be extracted (step 508) from a filtered packet stream such as the type of mobile device 118 for which the associated data packets are bound, the individual cell tower 114 or smart cell 128 to transmit the associated data packets, serving gateway 204 information, and the like. The video quality may be evaluated (step 510) and statistics may be computed (step 512) for the video segments such as media delivery index, delay between packets, jitter, total time required to receive all packets need to fully assemble a segment, errors in key frames, and the like. Data regarding the video quality such as delays between segments, buffer overflow or underflow, and the like, may be transmitted to video quality servers (step 514).

Figure 6:
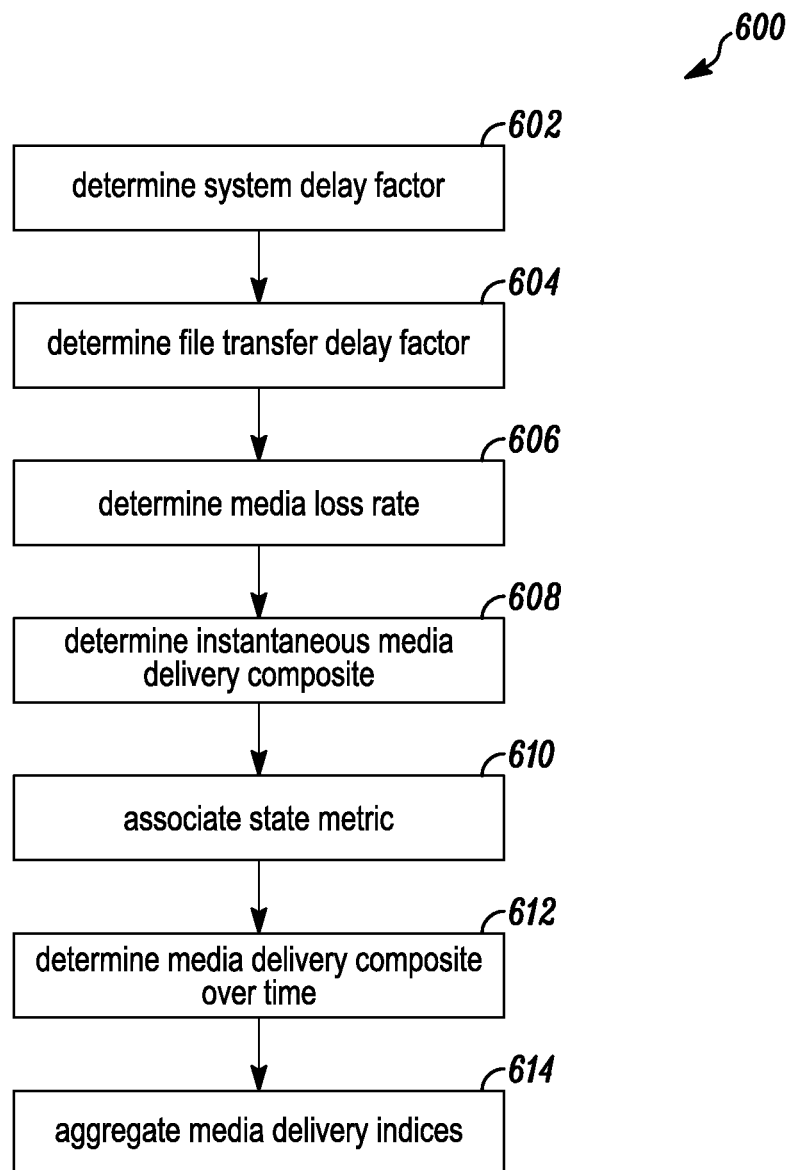
FIG. 6 is a flowchart of the operations of a video quality probe.

With reference to FIG. 6, a method 600 of evaluating video quality or the steps undertaken by a video quality probe 120 or compute engine 310 (FIG. 3A-3C) after receiving a copy of the network traffic, may include the steps of determining a system delay factor (step 602) associated with a segment file of a streaming media product. Then a file transfer delay factor may be determined (step 604) associated with the segment file of the streaming media product. A media delivery composite quality figure may be determined (step 608) for the segment file of the streaming media product based upon, at least in part, the system delay factor associated with the segment file and the file transfer delay factor associated with the segment file.

As generally discussed above, users may consume a streaming media product via a variety of media consumption devices such as televisions, computing devices, mobile devices 118, and the like. The streaming media product may include a piece of streaming media content, such as streaming video or streaming audio content embedded in a web page, internet protocol television, video on demand program, or the like. The streaming media product may be encoded in any suitable format (e.g., MPEG2, MPEG4, H.264, etc., in the case of streaming video). Those having skill in the art will understand various other encoding formats.

Figure 7:
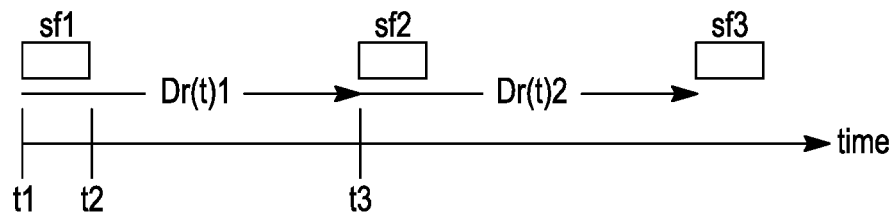
FIGS. 7 through 12 are diagrammatic views of various streaming media system conditions.

The streaming media product may be transmitted as a series of sequential segment files (e.g., segment files sf1, sf2, sf3, shown in FIG. 7). Each segment file may be a file including a time-wise portion of the streaming media content. For example, the segment file sf1 may include the first ten seconds of the streaming media product (i.e., from t=0 s to t=10 s). Similarly, the segment file sf2 may include the next ten seconds of the streaming media product (i.e., from t=10 s to t=20 s), and the segment file sf3 may include the following ten seconds of the streaming media product (i.e., from t=20 s to t=30 s). In one example, the streaming media product may include a streaming video having a 1.0 Mb/s transport stream (i.e., the rate at which the video is displayed). Accordingly, in the case of a constant bit rate video stream, each segment file may include a 10 M bit file (i.e., including 10 s of streaming video encoded at 1.0 Mb/s. While exemplary segment files sf1, sf2, sf3 have been described as being of the same size, this is not considered a limitation of the present disclosure. Similarly, while the exemplary streaming video has been described as having a constant bit rate (and therefore each same-size segment file provides the same video playback duration, or drain time), this is also not intended to be a limitation of the present disclosure, as the bit rate of the streaming media may be variable throughout the duration of the streaming media product.

As discussed above, evaluating video quality (step 510) (alone and or in conjunction with computing video statistics (step 512) and reporting video data (step 514) may comprise determining a system delay factor (step 602) associated with a segment file (e.g., segment file sf1) of a streaming media product. Generally, the system delay factor may include various delays associated with the delivery of segment files (e.g., sf1, sf2, sf3) of the streaming media product to a consumption node (i.e., computing device 310, in the above example). As such, the system delay factor may provide a measure of the entire system's performance, including but not limited to the performance of a consumption client application receiving and/or decoding the streaming media product (e.g., providing an indication of how timely requests for segment files are issued by the viewing device to the server, such as the cache network server 110), performance of the server (e.g., providing an indication of how timely segment file transmissions are initiated), and network performance (e.g., indicating the time taken for segment files to be transfer through the network, including retransmissions necessitated by lost packets and/or incomplete segment file transfers). Accordingly, the system delay factor associated with the segment file may be based upon, at least in part, a request/fulfill time for a subsequent segment file and a transfer time associated with the segment file of the streaming media product.

In the case of adaptive streaming protocols (e.g., Apple Inc.'s HLS, Microsoft Silverlight™, and Real Time Messaging Protocol by Adobe Systems, Inc., for example) the system delay factor associated with a segment file (e.g., sf1) may be updated at beginning of reception of the subsequent segment file (e.g., sf2 in the above example). In such an embodiment, when a segment file (e.g., sf1) is received the drain time (i.e., the drain rate, or rate at which the payload is consumed at the decoding node, multiplied by the payload size) and segment file arrival time may be compared.

For example, and referring also to FIG. 7, segment file sf1 may begin arriving at the decoding node (i.e., at computing device) at time t1. Reception of segment file sf1 may be complete at time t2. Further, segment file sf1 may have a drain time of Dr(t)1, which as discussed above, may be a function of the size of segment file sf1 and the drain rate of the streaming media product during the time frame included in the content contained in segment file sf1. Further the next portion of the streaming media product, contained within segment file sf2, may begin arriving at computing device at time t3.

Continuing with the above-example the video quality probe 120 and the associated evaluation of video quality 510 may reside on a device other than the consumption node (e.g., the video probe may reside on separate hardware or be a virtual probe), evaluation of video quality 510 may receive information regarding the drain time of segment file sf1, the start of reception time of segment file sf1, the completion of reception time of segment file sf1, and the start of reception time of segment file sf2 from video quality probe. However, in other embodiments, the evaluation of video quality may reside on, and be executed by the device upon which the streaming media product may be consumed.

According to one embodiment, system delay factor may be determined according to the formula:

$$DFsys = Dr(t) - [\max(t2, t3) - t1]$$

Wherein:

DFsys is the system delay factor associated with a segment file;

Dr(t) is the drain time for a segment file (as discussed above);

t1 is the start time for reception of the segment file (e.g., sf1);

t2 is the completion time for reception of the segment file (e.g., sf1); and t3 is the start time of reception of the next segment file (e.g., sf2).

Assuming, for the purpose of example, that segment file sf1 begins arriving at a time of zero second (i.e., t1=0 s), and reception of segment file sf1 is complete one second later (i.e., t2=1 s). Further, and continuing with the previous example of segment file sf1 having a 10 M bit media payload, and the relevant portion of the streaming media product having a drain rate of 1.0 Mb/s, the drain time for the media data of segment file sf1 may be 10 s (i.e., 10 M bit payload divided by 1.0 Mb/s drain rate giving Dr(t)1= 10 s). Accordingly, the system delay factor associated with segment file sf1 (in which the maximum of t2 and t3 is t3= 10 s in the example of FIG. 7 in which t3 is greater than t2) would yield:

$$DFsys=10\ s-(10\ s-0\ s)$$

$$DFsys=0\ s$$

The system delay factor of zero may indicate an exactly balanced arrival rate of media data (i.e., data contained within the segment file) and consumption rate of the media data. Accordingly, consumption of the streaming media product at the receiving device may occur without any disruptions in the streaming media, and without any additional media data being buffered by mobile consuming device 118 (e.g., that buffer utilization of consuming the device may remain generally static as long as the arrival rate and consumption rate of media data are remain generally balanced). In these examples, the mobile consuming device may be a mobile phone, smart phone, table computer, and the like. However, as the flow rate of incoming media data and consumed media data is generally balanced, a slight shift to an underflow condition could potentially disrupt consumption of the streaming media product.

Figure 8:
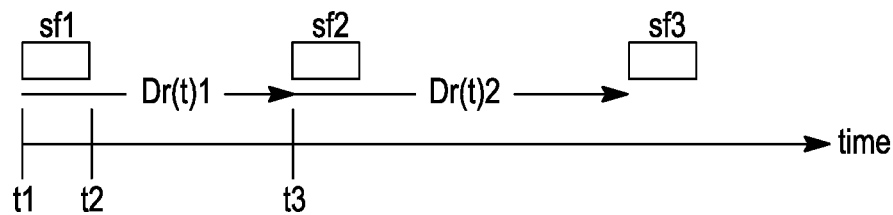

Referring next to FIG. 8, as shown, segment file sf2 may begin arriving before the media data of segment file sf1 has completely played out (i.e., before the entire media payload of sf1 has been consumed by the decoding node). As will be appreciated, in an embodiment utilizing the above DFsys equation, the circumstance depicted in FIG. 8 may give rise to a positive system delay factor (i.e., media data may be arriving at the mobile display device at a faster rate than the media data is being consumed). This may give rise to an overflow condition. In an overflow condition consumption of the streaming media product at the mobile display device may occur without any disruptions in the streaming media, and the resulting overflow media data may be buffered by the mobile display device.

Figure 9:
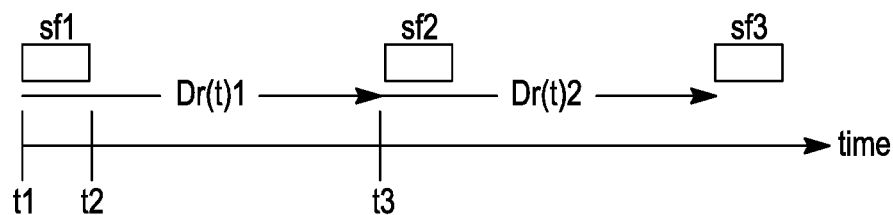

Referring next to FIG. 9, there is shown a situation in which the media data is being consumed at a greater rate than the media data is being received by a display device. Specifically, in the example shown in FIG. 9, segment file sf2 does not begin arriving until sometime after play out of the media data of segment file sf1 (e.g., t3 lies after the expiration of Dr(t)1). The situation depicted in FIG. 9 may result in a negative system delay factor, or underflow condition, in which media data may be consumed at a higher rate than media data is arriving at the consumption node (i.e., a non-mobile display device 309, a mobile device 118, and the like). The underflow condition may result in impaired consumption of the streaming media product at the consumption node (i.e., a stationary display device such as a television, a mobile display device, and the like) such as video freezing, lapses in audio playback, and the like.

While exemplary embodiments of the various system delay factor conditions of balanced, overflow, and underflow, have been shown, it will be appreciated that other situations may similarly give rise to the various system delay factor conditions. For example, a negative system delay factor condition (e.g., an underflow condition) may arise from a late completing of reception of a segment file (e.g., reception of the segment file may not be complete within the drain time of the media data contained within the segment file). As such, the particular embodiments have been presented only to illustrate the various system delay factor conditions, and should not be construed as a limitation on the possible situations that may give rise to such system delay factor conditions.

In addition to determining the system delay factor (step 602), determining the media loss rate (step 606) may include determining a file transfer delay factor (step 604) associated with the segment file of the streaming media product. Generally the file transfer delay factor associated with a segment file may be indicative of the time delays associated with the actual transfer of the segment file through the network (e.g., between a server such as the caching network 110 and the consumption node (i.e., display device, mobile device, and the like). As discussed above, the system delay factor may include all system wide factors which may impact the rate at which media data arrives at a consumption node, including, but not limited to, client, server, and network delays. Evaluation of video quality may determine the file transfer delay factor, which may only account for network characteristics impacting the actual transfer of the segment file from the server to the computing device (e.g., network performance issues, packet retransmissions necessitated by transmission losses, etc.).

The file transfer delay factor associated with the segment file may be based upon, at least in part, a transfer time for the segment file of the streaming media product between server computer such as a cache server 110 and a display device, such as a remote receiver, a stationary display device, a mobile display device, and the like. Additionally/alternatively, a file transfer delay may be determined between server computer such as cache server 110 and an intermediate node such as the mobile core 112, and/or between the intermediate node (e.g., the mobile core 112) and a display device such as a mobile device 118. As such, file transfer delays through various segments of the media distribution system 100 may also be characterized.

According to an embodiment, the file transfer delay factor may be determined based upon the relationship:

$$DFft=Dr(t)-[t2-t1]$$

Wherein:

DFft is the file transfer delay factor;

Dr(t) is the drain time of the media data of the segment file;

t1 is the start time of reception of a segment file (e.g., sf1); and t2 is the completion time of reception of the segment file (e.g., sf1).

Continuing with the above-stated example, and referring to FIGS. 7 through 9, as shown in each case the time difference between completion of reception of the segment file sf1 and the beginning of reception of the segment file sf1 is less than the drain time (i.e., Dr(t)1) of the media data of segment file sf1. As such, in each embodiment depicted in FIGS. 7 through 9, the file transfer delay factor may be positive, indicating that the file transfer of segment file sf1 is less than the drain time of the media data included within segment file sf1. As such, file transfer delays should not impede consumption of the streaming media product.

Figure 10:
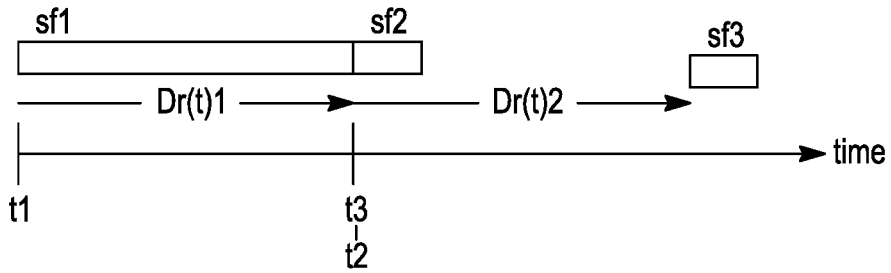

Referring also so FIG. 10, the situation is shown in which the file transfer time of segment file sf1 is generally equal to the drain time (i.e., Dr(t)1) of segment file sf1. As such, the file transfer delay factor may be generally zero, indicating a general balance between the reception of media data and the consumption data. In a generally balanced condition, the file transfer delay factor may not impede consumption of the streaming media product. However, as with a zero system delay factor, an increase in the file transfer delay factor may result in an underflow condition, which may potentially disrupt the consumption of the streaming media product.

Figure 11:
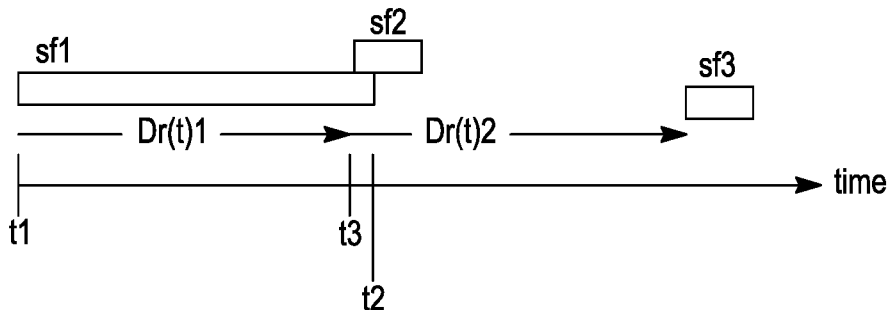
Figure 12:
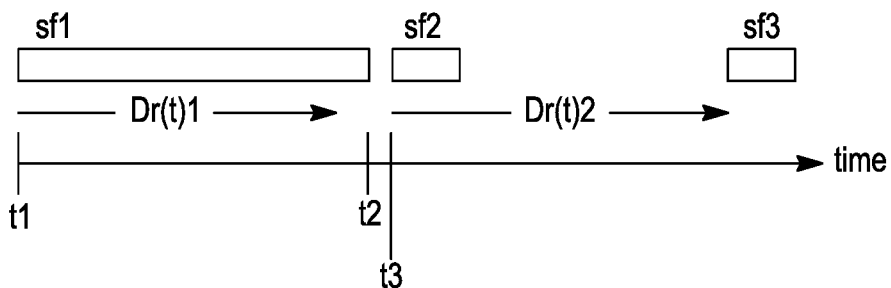

Referring next to FIGS. 11 and 12, in each embodiment the file transfer time for segment file sf1 is greater than the drain time (i.e., Dr(t)1) of the media data included within segment file sf1. As such, it may take longer to complete reception of segment file sf1 than the consumption of the media included within segment file sf1. The situation depicted in FIGS. 11 and 12 may indicate an underflow condition, in which media data may be consumed at a faster rate than media data is arriving at the consumption node (e.g., television, computing device, mobile device 118, and the like).

Similar to the system delay factor, information necessary for determining the file transfer delay factor 604 may be received to evaluate video quality, e.g., from a video quality probe 120 intercepting network traffic on the media distribution system or executing on a computing device or display device acting as part of the network. Reception of information relating to the file transfer delay factor from intermediate node may allow localized network problems that may impede consumption of the streaming media product to be determined. In the case of adaptive streaming protocols, the file transfer delay factor may be updated at the completion of reception of each segment file (e.g., sf1, sf2, sf3).

Each of the system delay factor and the file transfer delay factor may generally provide an indicator of how long a data stream should be buffered at its nominal bit rate to prevent display underruns (i.e., interruptions in consumption of the streaming media product). For example, as discussed above, underflow conditions may impede the consumption of the streaming media product, however typically at least a portion of the streaming media product may be buffered on the consumption node (e.g., stored on storage device associated with display device such as a computer, television or mobile device) prior to beginning consumption of the streaming media product. As such, transient underflows, and/or underflows less than the buffered data, may not impede consumption of the streaming media product. However, building a buffer results in a delay before a user may begin consuming the streaming media product. Accordingly, it may only be desirable to build-up the minimum buffer that is likely to enable consumption of the complete streaming media product without any disruptions in consumption. Determination 602, 604 of the system delay factor and the file transfer delay factor may enable the minimum buffer size to be determined, e.g., based upon, at least in part, underflow, balanced, or overflow conditions associated with segment files of the streaming media product. Additionally, the system delay factor and the file transfer delay factor, alone and/or considered together, may also provide a measure of the network latency that must be inducted from buffering, which is required to accommodate stream jitter and prevent loss. While it is not a requirement of the present disclosure, generally for typical stream rates of between about 0.04 Mb/s and 2 Mb/s, the system delay factor and the file transfer delay factor may be determined 602, 604 with a resolution of tenths of a second.

Evaluate video quality 510 may also comprise determining 606, 608 a media loss rate or media delivery composite for the segment file of the streaming media product. The media delivery composite 608 may be based upon, at least in part, the system delay factor 602 associated with the segment file and the file transfer delay factor 604 associated with the segment file. According to one embodiment, the media delivery composite may be a composite of the system delay factor and the file transfer delay factor. As such, the media delivery composite 608 may, for example, provide an indicator of the condition of a media stream, provide a relative indicator of needed buffer depths at the consumer node due to file delivery time jitter as well as an indication of excessive file delivery times resulting in media underflow, etc. As such, the media delivery composite may allow problems to be identified with a streaming media server and/or client, as well as with the network over which the streaming media product is being consumed. The media delivery composite 608 may, therefore, be utilized to plan allocation of resources for improving the delivery of streaming media (e.g., network improvements, server improvements, etc.).

As mentioned, in one embodiment, the media delivery composite may include a composite of the system delay factor and the file transfer delay factor. For example, evaluate media quality may determine 606, 608 a media loss rate or delivery composite that may include both the sign and magnitude of each of the system delay factor and the file transfer delay factor. For example, the media delivery composite of 0 s, +9 s may indicate a zero system delay factor and a plus nine second file transfer delay factor. In one particular embodiment, evaluate video quality 510 may determine 606, 608 a real time, or instantaneous media loss rate or delivery composite. The instantaneous media delivery composite may, for example provide an indicator of a current state of the streaming media flow.

Evaluate video quality may also comprise determining 606 a media loss rate associated with the segment file of the streaming media product. The media loss rate may be the rate at which media data is not successfully transmitted between a server (e.g., cache server 110) and the consumption node (e.g., a mobile device 118). Media loss rate may be less important (e.g., and may even be zero) for ARQ (Automatic Repeat reQuest) protocols, such as TCP, in which packets not acknowledged as received may be retransmitted until reception of all packets is acknowledged. Evaluate video quality 510 may utilize the media loss rate in determining 606, 608 the media loss rate or an instantaneous delivery composite. For example, a relatively high media loss rate may devalue the media delivery composite, as a relatively high media loss rate may impede the consumption and/or quality of the streaming media product as consumed.

Evaluating video quality may associate 610 the media delivery composite with a state metric. For example, consistent with the general positive, zero, and negative possible conditions for each of the system delay factor and the file transfer delay factor, five general media delivery state metrics may be possible, as shown in Table 1:

TABLE 1

| State | DFsys | DFft | Result |
|---|---|---|---|
| 1 | − | − | Underflow |
| 2 | − | + | Underflow |

TABLE 1-continued

| State | DFsys | DFft | Result |
|---|---|---|---|
| 3 | + | + | Overflow |
| 4 | 0 | 0 | Balance |
| 5 | 0 | + | Balance |

As shown above, state 1 generally indicates a condition in which the system delay factor is in an underflow condition and the file transfer delay factor is also in an underflow condition (e.g., both the system delay factor and the file transfer delay factor are a negative value), which may be a condition as shown in FIGS. 11 and 12. State 2 indicates that the system delay factor is in an underflow condition (e.g., the system delay factor is a negative value), but that the file transfer delay factor is in an overflow condition (e.g., the file transfer delay factor is a positive value), which may be a condition as shown in FIG. 9. State 3 generally indicates that both the system delay factor and the file transfer delay factor are in an overflow condition (e.g., both the system delay factor and the file transfer delay factor have a positive value), as generally shown in FIG. 8. State 4 is a generally balanced state, with both the system delay factor and the file transfer delay factor being in a generally balanced state, as generally shown in FIG. 10. Finally, state 5 generally indicates a condition in which the system delay factor is in a generally balanced condition, and the file transfer delay factor is in an overflow condition (e.g., the file transfer delay factor has a positive value), as generally shown in FIG. 7. It should be appreciated herein that a zero value of the system delay factor and/or the file transfer delay factor may be used to indicate a generally balanced flow between the delivery and consumption of media data. As such, while the balanced condition may be indicated by the value zero, the generally balanced condition indicated thereby need not require a value of zero derived from either of the above system delay factor equation or the file transfer delay factor equation. Rather, a generally balanced condition may be indicated by a +/−margin (e.g., a window) around a zero value. For example, the margin indicating a generally balanced state may be +/−40% of the drain time (e.g., (Dr(t)1), or less. The margin indicating a generally balanced state may vary depending upon implementations, for example, in some embodiments the generally balanced state may be indicated by a margin of +/−20% of the drain time. Other values may similarly be utilized depending upon design criteria and user need.

Figure 13:
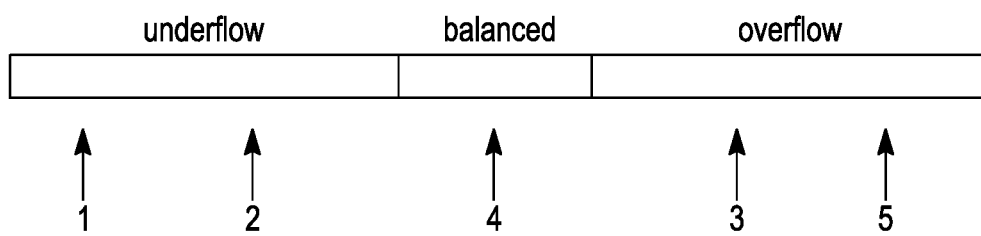
FIG. 13 is a diagrammatic view of a graphical display of various media delivery state metrics.

Referring to FIG. 13, evaluate video quality 510 may associate 610 the media delivery composite with a state metric (described above) by reference to a graphical display. For example, as shown, the five states may be shown graphically to facilitate easy reference and determination of a relative state of a streaming media flow. Consistent with the five state metrics described above, the state 1, in which both the system delay factor and the file transfer delay factor are in an underflow condition may be indicated on the far left of the graphic, indicating a complete underflow condition. State 2, in which the system delay factor indicates an underflow condition but the file transfer delay factor has a positive value, may be indicated to the left of center of the graphic, indicating a system-level underflow condition, but acceptable file transfer delay. State 3, in which both the system delay factor and the file transfer delay factor are in an overflow condition is indicated to the right of center of the graphic, indicating a good status, but that, in some circumstances, excessive server resources may be expended by over-delivering media data (e.g., which resources could, in some situation be used to service other clients) and that excessive client resources may be expended by over-buffering media data (e.g., which may, in some circumstances unduly tax the client resources). State 4, in which both the system delay factor and the file transfer delay factor are in a generally balanced condition is indicated generally in the center of the graphic, indicating that while the streaming media may be consumed without error, a shift of the system delay factor and/or the file transfer delay factor to an underflow condition may result in an impairment of consumption of the streaming media product. State 5, in which the system delay factor is generally at balance and the file transfer delay factor is in an overflow condition (e.g., the file transfer delay factor has a positive value) is indicated on the right of the graphic, indicating that the streaming media product may be consumed without error, and that server and client resources may be appropriately utilized (e.g., the server may not be over-delivering media data, and the client may not be over buffering media data).

Figure 14:
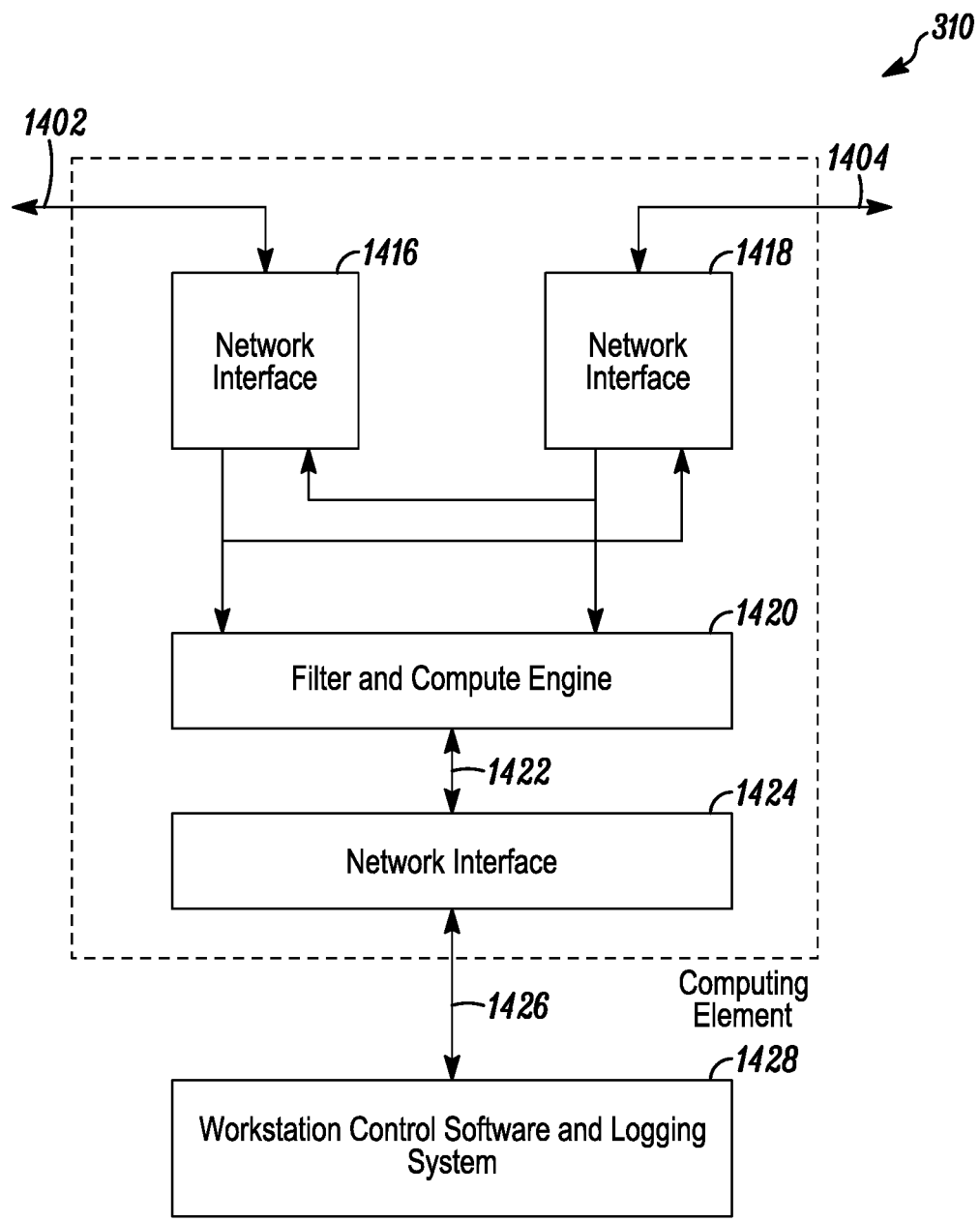
FIG. 14 is a diagrammatic view of an embodiment of the computing element and its interconnection with the control and logging system.

It should be noted that more than one network interface may be used to receive network traffic. For example, FIG. 14 illustrates computing element 310 (as used in FIG. 3C) with two network interfaces 1416 and 1418, wherein computing element 310 is used for analyzing one or more streaming media flows. The two network interfaces 1416 and 1418 interface with the network link to be monitored via network connections 1402 and 1404. As in FIG. 4, network link protocols that support such packet-based transmission include, but are not limited to, 802.3 (Ethernet), 802.4, 802.5, USB, ATM, SONET, 802.11, Fibrechannel, Firewire or 1394, Infiniband, Bluetooth, 802.11, 802.15, 802.16, 802.17, ZigBee, General Packet Radio System Tunneling Protocol (GTP), or DVB-ASI. In operation, data received from network connection 1404 is decoded via network interface 1418 and the resulting data is forwarded to the filter and compute engine 1420 and to the other network interface 1416. Then, network interface 1416 forwards the data to the network connection 1402, thus completing the connection from network interface 1404. Thus, all data received from network interface 1404 is forwarded to network interface 1402 with a minimum of distortion while making all the same data available for analysis by other components of the computing element. Likewise, all data from network connection 1402 is forwarded to network connection 1404 while also being forwarded to the filter and compute engine 1420. The result is a continuous full duplex connection between network connections 1402 and 1404 providing an uninterrupted network traffic flow while simultaneously providing all network data to the filter and compute engine 1420. Alternatively, as per FIG. 3A and FIG. 3B, the computing video quality element 310 may require only a single network interface, but otherwise performs as described above, with network data being forwarded to the filter and compute engine 1420.

The filter and compute engine 1420 is configured via interface 1422 such that it can filter the desired streaming media flows from other network traffic types for further analysis. For example, to analyze MPEG-2 streaming video over UDP/IP protocols, the filter may be configured to accept only layer-2 packets with the IP protocol type and only IP frames with UDP protocol types and only UDP datagrams that encapsulate MPEG-2 transport streams. After performing the appropriate filtering function, the compute engine calculates the components that comprise the Index value for a given streaming media flow. The Index values, and other statistics regarding the flow, are forwarded to the network interface 1424 via interface 1422. Then, network interface 1424 uses network 1426 used to convey the Index values to a data consumer such as an application running, for example, in a workstation consisting of control software and a logging system 1428, collectively referred to as a "management" system. Network Interface 1424 need not be the same type as 1416 or 1418 (i.e., a RS-232 serial port). Its bandwidth via the choice of physical and link layer protocols may be scaled or sized to match the amount of data expected to be handled. It should be noted that network interface 1424, network 1426, and workstation (management system) 1428 may be physically co-located with the computing video quality element 310 and need not be external.

Figure 15:
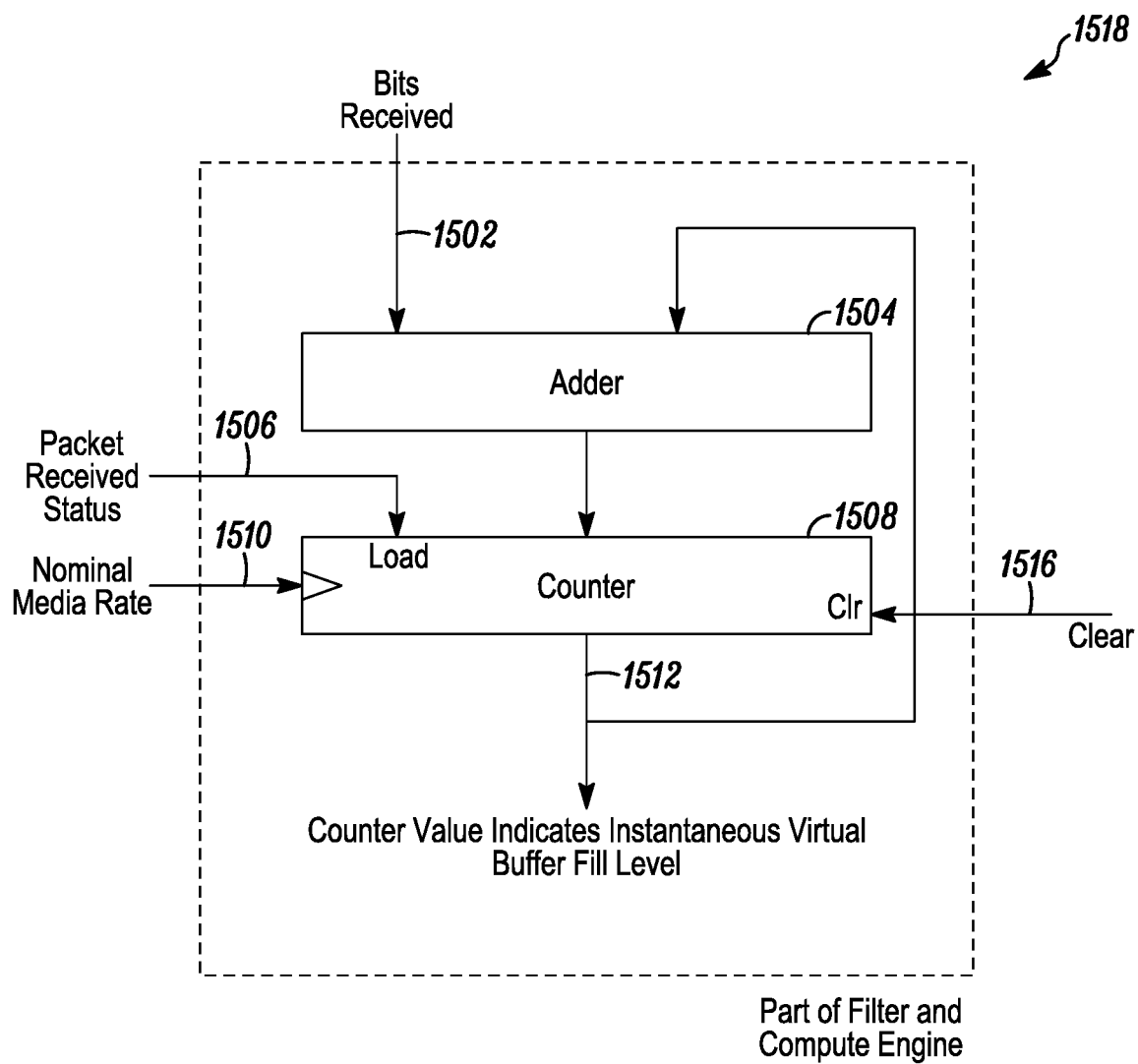
FIG. 15 is a diagrammatic view of an embodiment of an adder and a counter that form part of the compute engine.

In one embodiment, the compute engine comprises at least one finite state machine counter as shown in FIG. 15. The finite state machine counter is used to compute an Instantaneous Flow Rate Balance (IFRB). Counter 1508 is loaded when a packet has been received via 1506. The counter is loaded with the sum of the current count and the number of bits received in this packet 1502 from the adder 1504. Counter 1508 decrements its count at each clock input pulse 1510 whose rate is set to the nominal streaming media rate. Further, counter 1508 is cleared at any time via the 1516 clear signal. The counter output 1512 indicates the number of bits that have been received at the point of test but not yet consumed, assuming that a virtual terminal device which consumes or "uses" the streaming media flow (such as a video decoder for a streaming video media case) drains the data received at a nominal media rate at this network location. Thus, the counter output 1508 represents the size of a buffer that would be needed to prevent data loss and absorb the network jitter growth due to data arriving via a packetized network. It should be noted that counter 1508 may also result in negative numbers during periods between a burst of data thus representing the size of a virtual terminal's buffer needed to be prefilled to avoid underflow. Adder 1504 and counter 1508 may also be combined into a single entity to simply track the net difference between bits received on the packetized network side and the bits out based upon an expected drain rate. The actual quantity being tracked may be bits or any derivative thereof (bytes, words, etc.). It is important to note that the bits counted are only those subject to the drain rate. Typically, this is the payload of the packet (i.e., no headers or overhead.)

For example, in the case of an MPEG-2 transport stream sent via Ethernet IP/UDP, the bits tracked would typically be the MPEG-2 transport stream packets contained within the Ethernet frame, excluding the IP/UDP headers and Ethernet CRC. The present disclosure further extends to using streaming media streams that are variable bit rate in nature. Variations in media bit rate may be accommodated by monitoring and updating the expected drain rate used in IFRB calculation along with the stream. Since this finite state machine is simple, it may operate at common media rate speeds and may be replicated easily and compactly if implemented in hardware such as an FPGA, ASIC, or discrete logic, making possible an array of such machines such that one may be dedicated to each streaming media flow. Furthermore, the filter and compute engine may also be configured to capture and track other streaming media flow parameters of interest such as an MPEG-2 transport steam's continuity counters to detect dropped or corrupted packets, stream identifiers, etc.

It should be noted that computing the Instantaneous Flow Rate Balance (IFRB), and thus DF, requires knowledge of the expected media drain rate either by prior knowledge or by measurement. The expected drain rate, and thus stream bitrate, may also be referred to as the media consumption rate, as this is the rate at which the receiver of the media stream must consume that stream. It is possible that the local estimation of the drain rate may drift or be offset with respect to the actual media streams' bitrate due to frequency drift or offset between the source of the media streams' clock and our local processing clock. This drift or offset causes monotonically increasing or decreasing IFRB and virtual buffer calculations, and may be mitigated by periodically clearing the current state of the IFRB and virtual buffer. Another approach utilizes a well-known method entailing Phase Locked Loops (PLL) or Delay Locked Loops (DLL) to remove the drift or offset.

Returning to the discussion of FIG. 14, streaming media flow parameters as described above may be forwarded via a network Interface 1422, and network connection 1424, and external network 1426, or via any type data interface as they are captured or buffered in a memory in the filter and compute engine for later retrieval by a workstation 1428. In some instances, the streaming media content itself may be presented to the workstation 1428 via the same path for additional analysis. They may be combined with a time stamp at either the filter and compute engine 1420 or the workstation 1428. Long-term logs may be maintained by 1428 for trend analysis, coincident analysis with other network events, the start and end of particular streaming media flows, etc. Alternatively, workstation 1428 may show an instantaneous view of streaming media parameters for human monitoring. High and low watermark values may be set in the computing video quality element 310 or in the workstation 1428 for the Index parameter or any measured parameter, such that if exceeded, will be logged or trigger an alarm; this functionality may be used to warn of possible impending faults such as deviations from nominal in the flow rates that could cause a network or terminal device buffer to overflow or underflow. The Index value indicates the network's instantaneous operating jitter margin. Additionally, the rate of sampling of such parameters may be reduced to decrease the load on external network 1426 during benign network conditions or increased to provide a more detailed analysis of an identified fault. Either the computing element or workstation 1428 may produce long-term analysis as well by performing additional computational operation on the IFRB.

In some instances, workstation 1428 functionality may be integrated with the filter and compute engine for a direct display of information to the user. It should be noted that a pure hardware, a pure software, and a hybrid hardware/software implementation of the filter and compute engine components is envisioned and should not be used to limit the scope of the present disclosure.

It should be noted that various kinds of interfaces may be used for establishing a packet-based communication session between the external networks (1402 or 1404 or 1426) and the computing element, such as (but not limited to) a gigabit Ethernet network controller or a 10/100 Mbit/s Ethernet network interface card. Moreover, one skilled in the art may envision using various current and future interfaces and, hence, the type of packetized network interface used should not be used to limit the scope for the present disclosure.

In one embodiment, bandwidth for the transportation of network parameters via external network 1426 as discussed above is allocated in an "on-demand" fashion, wherein full channel (network conduit) bandwidth is allocated and available to the data consumer. Filter and compute engine 1420 may track nearly any set of parameters or events, such as the last N-packets received or statistics acquired, storing it in a circular buffer. Thus, when a critical event occurs such as streaming media data loss, bandwidth would be allocated "on-demand" to report the tracking information leading up to the critical event to the workstation analysis device 1428 through the network interface 1424 and external network 1426. Having pertinent information about what traffic the network was handling (not only at the time of the critical event but leading up to it as well) presented "on-demand" at the time of the critical event is very powerful. Having this information greatly reduces the "hunting" time required to identify the cause of the critical event. This information could be gathered remotely as well, given a suitable network type for external network 1426. Expanding on the "on-demand" possibilities for parameter reporting, bandwidth may also be allocated "on-demand" on either network interfaces 1416 or 1418 in an in-band reporting fashion, facilitating the monitoring by equipment on the same distribution network as the streaming media.

If the network Interface 1424 is an ASI (Asynchronous Serial Interface, as in DVB-ASI) type and the streaming media content itself is presented to the Interface in such a way as to minimize instrument timing distortions, a conventional streaming media specific analyzer or monitor may be utilized to not only measure the stream's conformance to expected stream standards but also to indicate the influence of network behavior. In this configuration, the computing element may be thought of as a protocol converter as well.

The present disclosure's system may be used in debugging various embedded systems within the streaming media's transport network. Various equipment utilized in the transportation or creation of the streaming media may allow debugging and/or parameter manipulation via the transport network as well as provide its own statistical operational information (i.e., its own system "health"). This makes possible the cross-correlation of the system's overall state/health. The disclosure acquires such control information via a network channel and may use its filter and compute engine capabilities to provide either the raw or processed data to a Workstation Monitor/Logger as described for Index data above.

The present disclosure allows the implementer the ability to scale the amount of in-band or out-of-band measured or sampled data to pass through the system up to the maximum supported by the network conduit and down to nothing. Additionally, the present disclosure provides the ability to scale with improvements in network conduit technology. For example, the faster the network conduit, the more measurements or sampled data can pass. Moreover, as high-speed systems continue to evolve, their network conduit's bandwidth is usually increased proportionately to facilitate the use of the high-speed system itself (i.e., a faster network conduit is part of the main feature-set of the system; bandwidth is thereby increased by necessity). The present disclosure accommodates such increases in bandwidth associated with the network conduit and utilizes such high-speed systems to extract measurements or sampled data at a faster rate.

Figure 16:
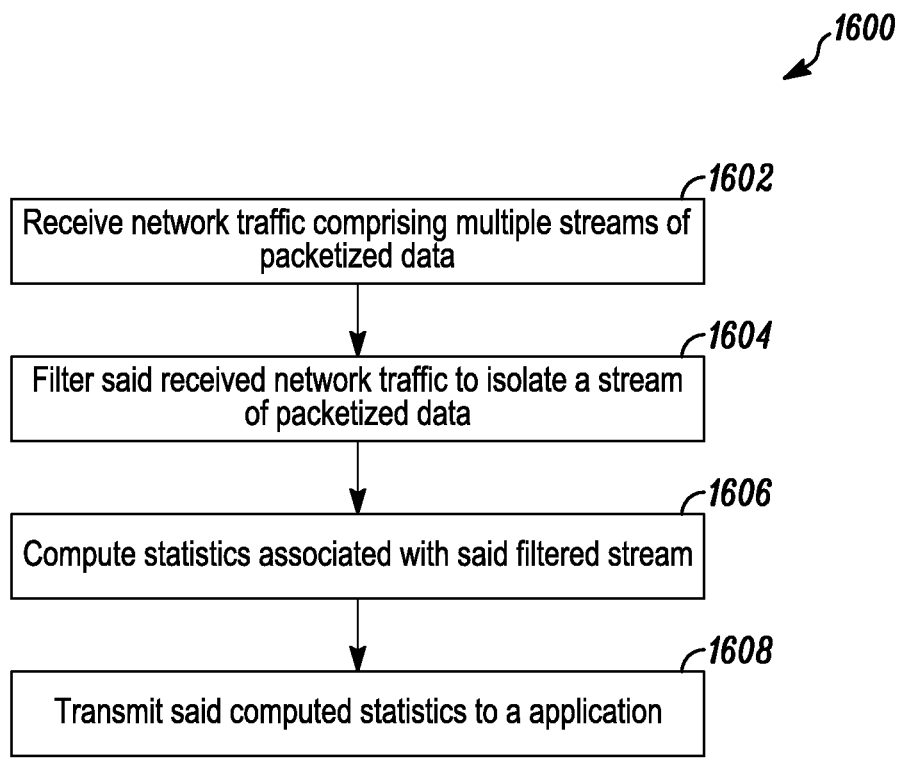
FIG. 16 is a flowchart of filtering network traffic.

FIG. 16 illustrates a method 1600 associated with an embodiment of the present disclosure. In step 1602, network traffic is received by a network interface, wherein the traffic comprises one or more streams of packetized data. Next, in step 1604, the received traffic is filtered to isolate at least one stream of packetized data. In step 1606, an Index is computed for the filtered stream of packetized data. In one preferred embodiment, the Index, known as the Media Delivery Index (MDI), consists of two parts: the Delay Factor (DF) and the Media Loss Rate (MLR). The DF represents the Instantaneous Flow Rate Balance (IFRB) and is derived in the computing element as described earlier. The MLR represents the number of lost or corrupted media packets and is readily derived from tracking the Continuity Counter (CC) for the MPEG-2 transport stream application or from a sequence counter or the like for protocols, such as RTP, which support the same. The MDI (DF:MLR) then represents the two key factors which describe the dynamic behavior of streaming media over packetized networks: packet jitter growth and packet loss. This Index provides at-a-glance determination of traffic impairment as well as an indication of the operating margin of a network. Then, in step 1608, the computed statistics are forwarded to a data consumer, such as one running in a workstation. In one embodiment, a quality of service (QOS) metering scheme is implemented based upon adjusting traffic priority between the forwarded computed network statistics and the streaming network traffic. In addition, or alternatively, the system may itself perform an analysis of the incoming stream. Embodiments of the system may also take steps to remediate any detected errors in the incoming stream, such as by the use of conventional Forward Error Correction techniques.

Embodiments of the disclosure may also capture data associated with user's actions, which may prove useful to the service provider or third party in diagnosing QOS issues and/or to otherwise enhance the customer's experience. For example, the system may capture user commands such as channel changes, application changes, and the like and then compute statistics associated with this captured data. For example, the system may compute and record the time elapsed between when the channel change command is entered, and when the selected channel begins streaming through the user's STB. On mobile devices, the system may compute the time spent on video content streamed from various video sources or using various mobile applications. The system may be able to identify time spent viewing video from different sources and whether the same video content was accessed from a plurality of sources. For example a television episode may be available from both Netflix™ and Amazon Prime. If an end user accesses an episode from one source and then changes applications to watch the same episode with a different source this information may be correlated with measured video Quality of Service.

Figure 17:
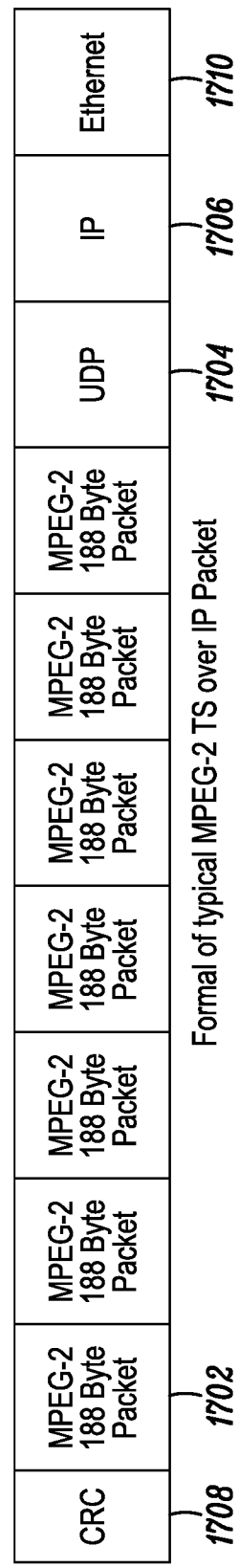
FIG. 17 is a diagrammatic view of a conventional MPEG-2 transport stream over IP packet.

An incoming packet stream of video data may be in nominally any desired format suitable for transmission over a packetized network. In exemplary embodiments, the video stream is in the conventional MPEG-2 TS (Motion Pictures Expert Group-2 Transport Stream) format, such as shown in FIG. 17. As shown, the content may be contained in a series of 188-byte MPEG-2 packets 1702, which are encapsulated in a UDP (User Datagram Protocol) datagram and IP headers 1704 and 1706. The completed IP over Ethernet packet includes provisions for a CRC (Cyclic Redundancy Check) 1708, in the Ethernet protocol 1710. The content may be further encapsulated in GTP for transmission over the cellular network.

Figure 18:
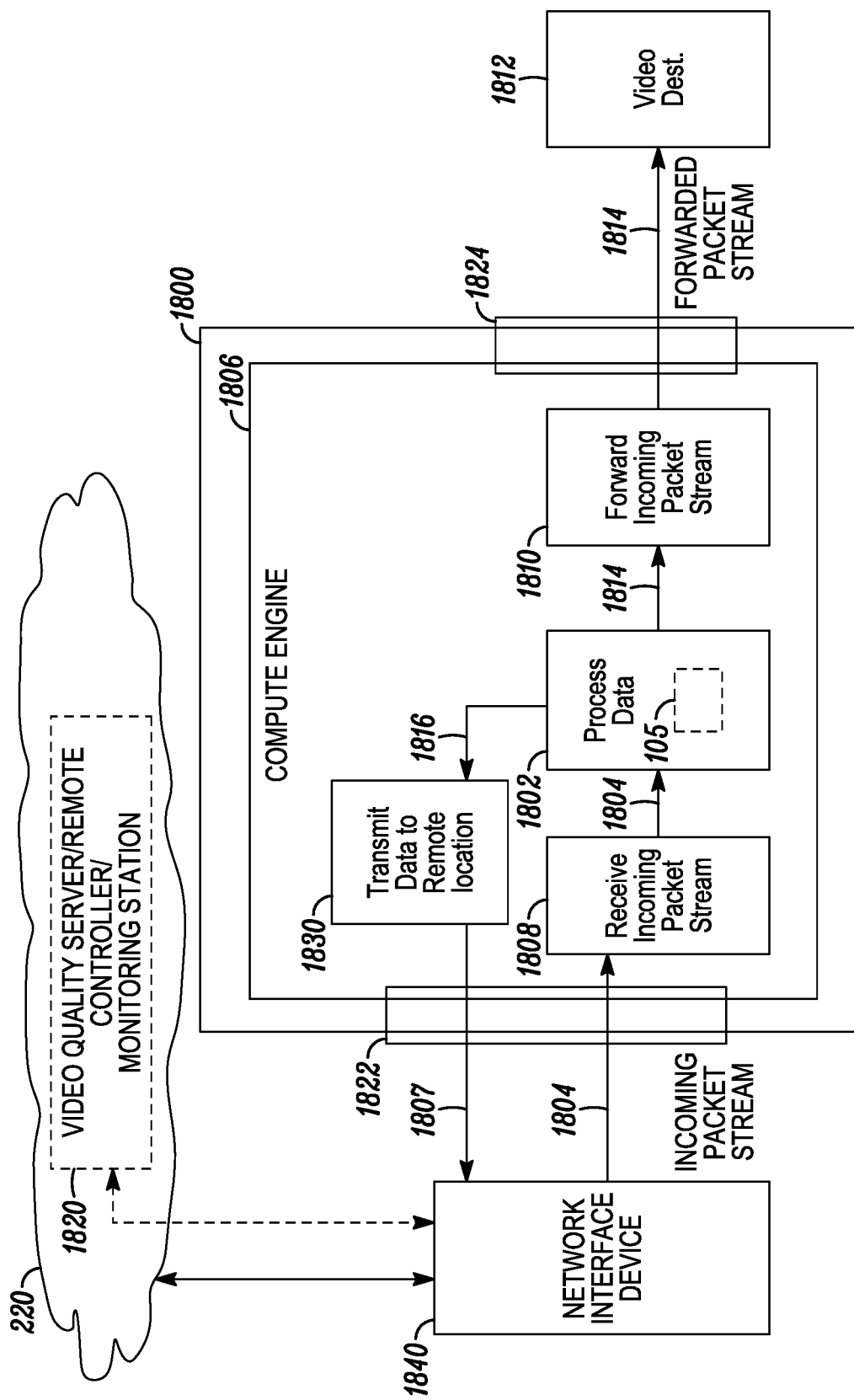
FIG. 18 is a diagrammatic view of an embodiment of the present disclosure.

Referring to FIG. 18, a processing module 1802 may affect any number of operations useful in determining the QOS of incoming packet stream 1804. For example, this processing may include calculating the MDI of incoming packet stream 1804, calculating system delay factor, file transfer delay factor, media loss rate and the like. Alternatively, processing module 1802 may simply make (and optionally store) a copy of incoming packet stream 1804 for later review and analysis. The processed data may be stored within an optional memory or database 1902 (FIG. 19) for later retrieval, such as upon return of evaluated video quality element 510 to the service provider. Alternatively, the processed/captured data may be transmitted (e.g., streamed) to a remote location or to the service provider for analysis, as will be discussed herein with reference to alternate compute video quality element 510'.

Still further, incoming packet streams 1804 that have been identified as suffering impairments may be "repaired", such as by an optional error correction module 1904 associated with processing module 1802. Error correction module 1904 may thus include any of various error correction means, such as conventional Forward Error Correction (FEC) algorithms. Error correction module 1904 may then operate in concert with conventional upstream equipment, which may add repair information (e.g., FEC flows), which may then be used by error correction module 1904 along with the original stream to reconstruct the unimpaired flow. FEC flows thus may be provided by the service provider in a conventional manner, e.g., using some bandwidth that may otherwise be available for other services provided to the user, such as high speed data or voice services. Error correction module 1904 may then use the 1-BC flows to repair any impairments at the user's premises. It is expected that in many applications, repairing the streams 1804 in this manner may be more cost effective than eliminating the source of the impairments, such as by replacing wiring or other facilities at the user's premises.

Embodiments of the disclosure may thus transmit information regarding the quality of the incoming stream to remote (e.g., upstream) locations, while simultaneously repairing the stream. Moreover, the stream repair may be affected dynamically, e.g., when the incoming stream quality drops below a predetermined threshold, as determined by either the processing module 1802, or by the video quality server 122, which may comprise a remote controller and monitoring station 1820. Such dynamic repair may also be used to dynamically control the FEC flow, e.g., to eliminate the FEC flow (and thus free up bandwidth for other services) when the quality of the incoming stream is satisfactory. Thus, by tracking the dynamic performance of a video flow through its Quality of Service parameters, these embodiments may request the additional repair flow dynamically and thus impact the other services only if needed. Processing options will be described in greater detail herein with respect to various optional embodiments.

As a further option, compute engine 1806' may capture 1906 user data 1910 from video destination 1812 (e.g., from the user's mobile device 118). Examples of such user data 1910 include user commands such as selection of video content (i.e., channel changes) along with the delay experienced by the user from the moment he presses the channel change button on his remote to the time the channel starts streaming. User data 1910 may also include the user's use of so-called "trick mode" commands such as rewind, fast forward, pause and stop. Data may include information about the mobile device 118, operating system, application being used, free space on device, a log of user interactions, and the like.

This user data is processed (e.g., captured) by processing module 1802, and may then be stored in optional non-volatile memory or database 1902, such as in the form of a log. In addition, or alternatively, this user data may be forwarded via transmission module 1806 to remote video quality server 122 as discussed hereinabove.

Communication with the video quality server 122 and remote controller/monitoring station may be two-way, or duplex, to permit data transfer to be initiated either by compute engine 1806' or by remote controller and video monitoring station 1820. For example, data transfer may be initiated by compute engine 1806, in which data is forwarded automatically, e.g., at a predetermined interval or upon a triggering event such as receipt of a particular user command at the process data module 1802. Alternatively, or in addition, data transfer may be initiated by remote controller and video monitoring station 1820, such as by polling system compute video quality element 510', 1800'. This polling ability may also be used to effect various other actions, such as reprogramming or rebooting system 1800' remotely.

Figure 19:
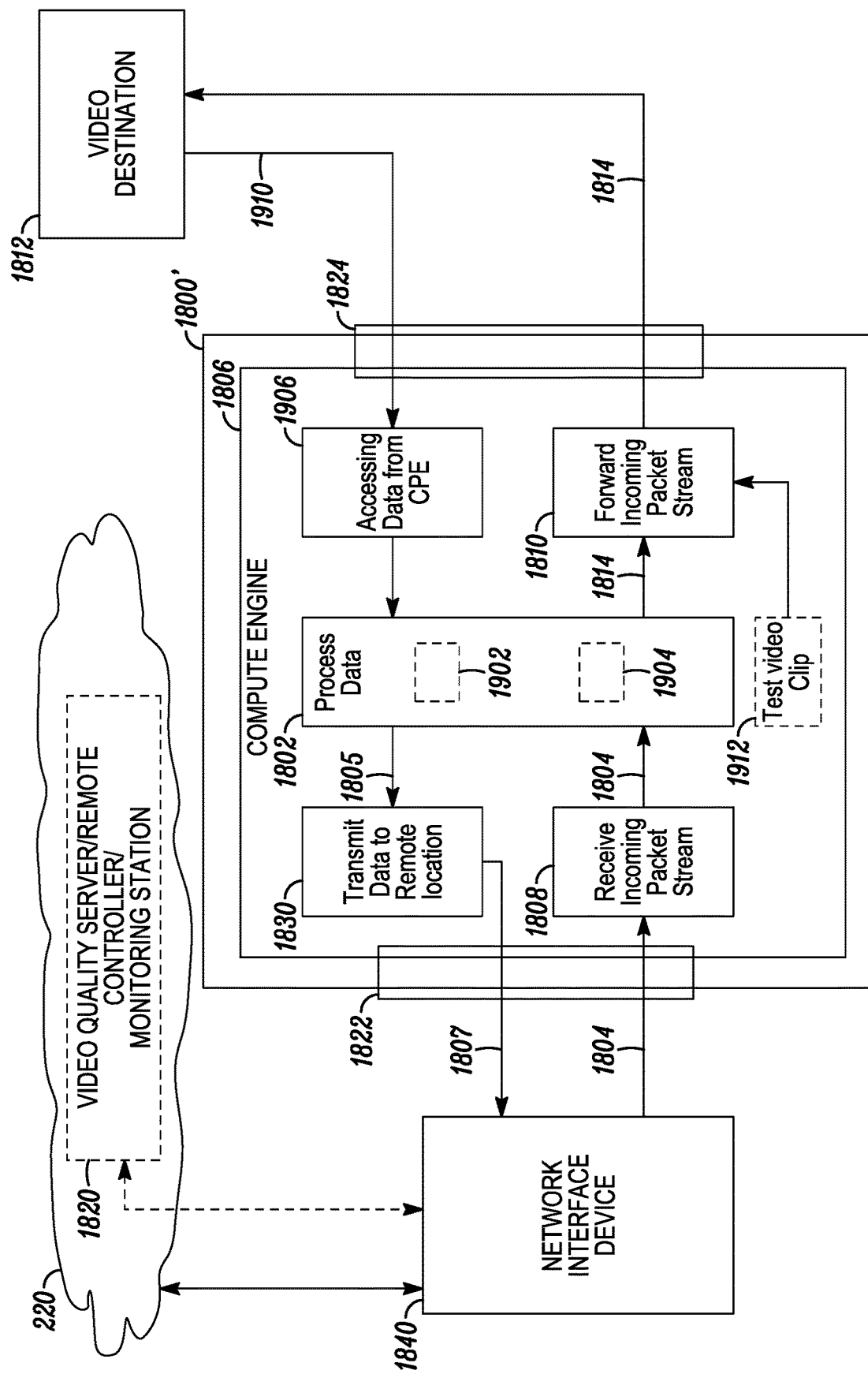
FIG. 19 is a diagrammatic view of an embodiment of the present disclosure.

As a further option, a video test clip 1912 of known quality parameters may be stored within system 1800' for forwarding by transmission module 1914 to another system 1800, 1800', located within the customer's LAN (e.g., at a location closer to video destination 1812) as described in greater detail herein with respect to FIG. 19. The quality of the video clip 1912 may then be monitored by the other system 1800, 1800', to help determine whether QOS problems lie in the CPE disposed between the two systems.

Figure 20:
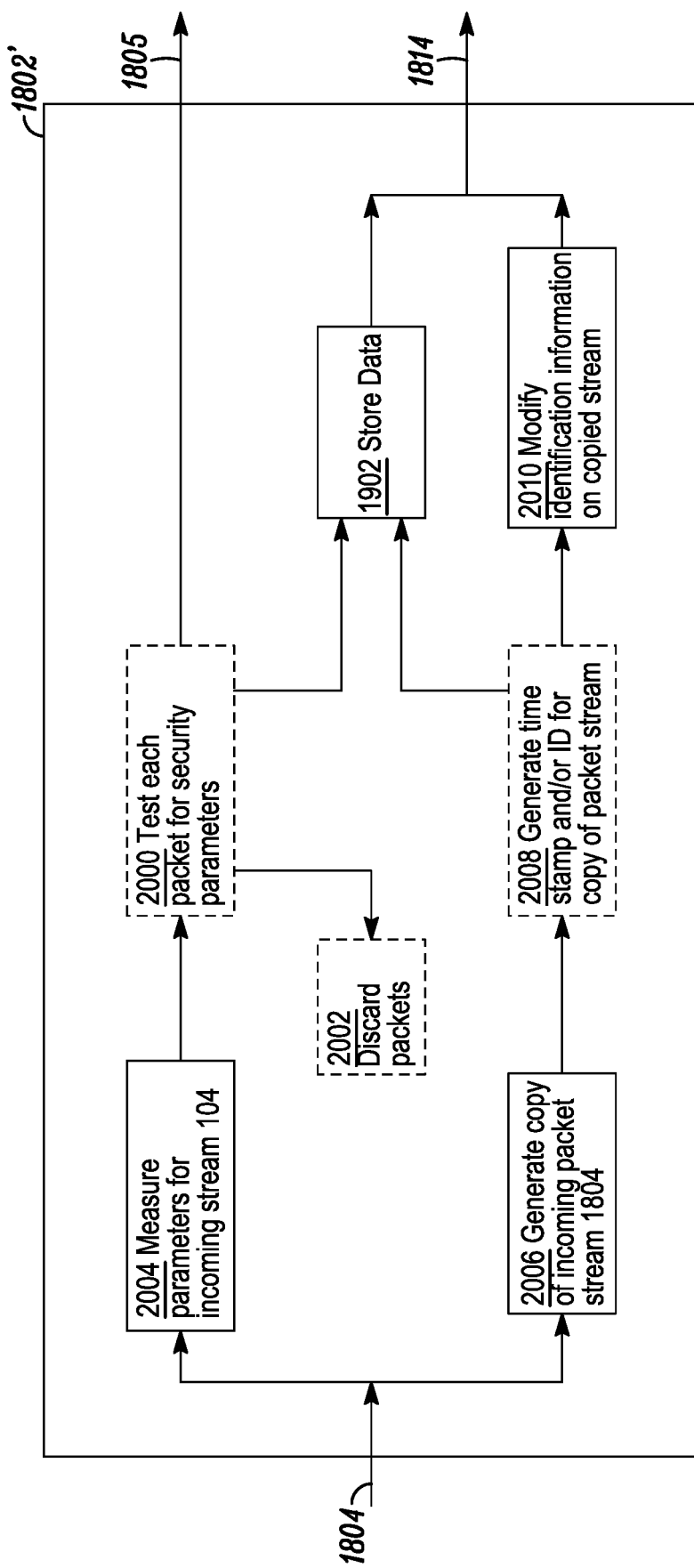
FIG. 20 is a diagrammatic view of an embodiment of the present disclosure.

Turning now to the embodiment of FIG. 20, some of the operations affected by processing module 1802 are shown in detail. Parameters associated with the incoming stream 1804 may be measured/analyzed 2002. The parameters may include any of those parameters disclosed in Technical Report 101 290 by the European Telecommunications Standards Institute (ETSI), including the quality parameters discussed herein with respect to FIG. 21. Some of these parameters are listed in the following Table 2. Parameters listed under Priorities 1 and 2 relate to the packet stream, and parameters under Priority 3 relate to specific applications associated therewith.

TABLE 2

| Priority 1 | Priority 2 | Priority 3 |
|---|---|---|
| TS_sync_loss (Transport Stream sync loss) | Transport_error | NIT_error (Network Information Tables error) |
| Sync_byte_error | CRC_error (Cyclic Redundancy Check error) | NIT_actual_error |
| PAT_error (Program Association Table error) | PCR_error (Program Clock Reference error) | NIT_other_error |
| PAT_error_2 | PCR_repetition_error | SI_repetition_error (Service Information repetition error) |
| Continuity_count_error | PCR_accuracy_error | Buffer_error |
| PMT_error (Program Map Table error) | PTS_error (Presentation Time Stamps Error) | Unreferenced_PID |
| PID_error (Packet Identifier error) | | SDT_error (System Target Decoder error) |
| | | SDT_actual_error |
| | | SDT_other_error |
| | | EIT_error (Event Information Table error) |
| | | EIT_actual_error |
| | | EIT_other_error |
| | | RST_error (Running Status Table error) |
| | | TDT_error (Time and Date Table error) |
| | | NIT_other |
| | | SDT_other |
| | | EIT_P/F_other |
| | | EIT_schedule_other |
| | | EIT_schedule_actual |

Optionally, the packets of video stream data 1804 may be analyzed 2004 for security parameters, with packets that fail to meet predetermined security parameters being discarded 2002. Examples of such security parameters are listed in the following Table 3.

TABLE 3

| Authentication Header (AH): | Encapsulated Security Payload (ESP): |
|---|---|
| Next Header | Security Parameters Index (SPI) |
| Payload Length | Sequence Number, Payload Data |
| Security Parameters Index (SPI) | Padding |
| Sequence Number | Pad Length |
| Authentication Data | Next Header |
| | Authentication Data |

Data on the measured parameters 2004, 2006 may be stored 2008 (e.g., in optional database 1902, FIG. 19) for future access.

Processing module 1802 may also generate 2010 a copy of the incoming stream, as discussed above, optionally stamping 2012 the copied stream, e.g., with a time stamp and/or stream identification, and storing 2014 the copied stream in optional database 1902 (FIG. 19) for future reference. Alternatively, or in addition, the copied stream may itself be streamed to remote controller and video quality monitoring station 1820 by replacing 2016 the destination information in the IP headers of the copied stream's packets with destination information (e.g., an IP address) associated with remote controller and video quality monitoring station 1820. This derived stream, along with information stored in database 1902, may be forwarded 1816 via transmission module 1806 (FIG. 18) as discussed hereinabove.

Figure 21:
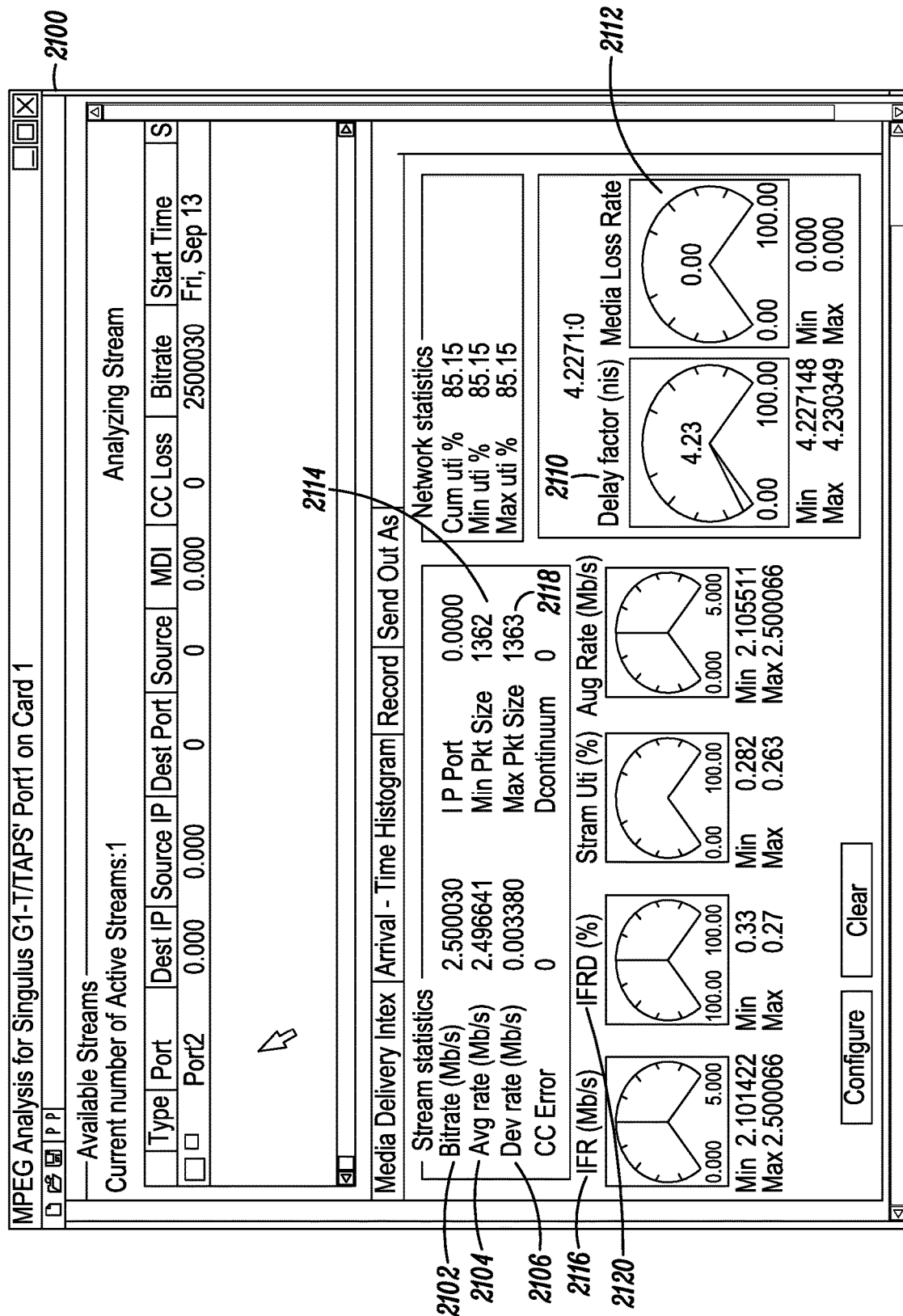
FIG. 21 is a screen display of a Graphical User Interface associated with operation of an embodiment of the present disclosure.

Turning now to FIG. 21, a screen display 2100 generated by a graphical user interface (GUI) associated with embodiments of the disclosure displays some of the possible parameters measured by processing module 1802, 1802'. This screen 2100 may be viewed in remote controller and video monitoring station 1820 on a display 2300 (FIG. 23, discussed below) within system 310, 310', and/or on a local display device such as a PDA or Smart Phone. These parameters may include the MDI value 2108, which includes the Delay Factor (DF) 2110 and the Media Loss Rate (MLR) 2112. This information may prove valuable to a service provider. For example, if the DF 2110 is high and the MLR 2112 is zero, then packets have not been lost even though significant packet jitter is present on the network. If the DF 2110 is low but MLR 2112 indicates packet loss, then the MPEG Transport Stream may be corrupted. If the MLR 2112 indicates packet loss and DF 2110 is high, packets are likely being lost in the network path.

Also displayed in this embodiment are the Bitrate 2102, the Average Rate 2104, and the Deviation 2106 (Dev) from the MPEG encoded bit rate, all in Megabytes per second (Mb/s). The Average Rate 2104 indicates whether the stream conforms to the specified rate over a measure of time. A relatively large Dev 2106 may indicate server configuration problems or stream encoding problems. The measured minimum packet size 2114 (Min Pkt Size) and maximum packet size 2118 (Max Pkt Size) may be checked to confirm that the expected packets and only the expected packets are being received. For example, an MPEG-2 constant bit stream with seven 188 byte Transport Stream packets per Ethernet packet with UDP/IP encapsulation should result in the stream's constant packet size of 1362 bytes. Packets of mixed sizes may indicate the presence of a misaddressed or non-MPEG stream. The Instantaneous Flow Rate (IFR) 2116 and the Instantaneous Flow Rate Deviation (IFRD) 2120 confirm a stream's nominal flow rate. As discussed above, nominally any parameters may be measured and displayed.

Figure 22:
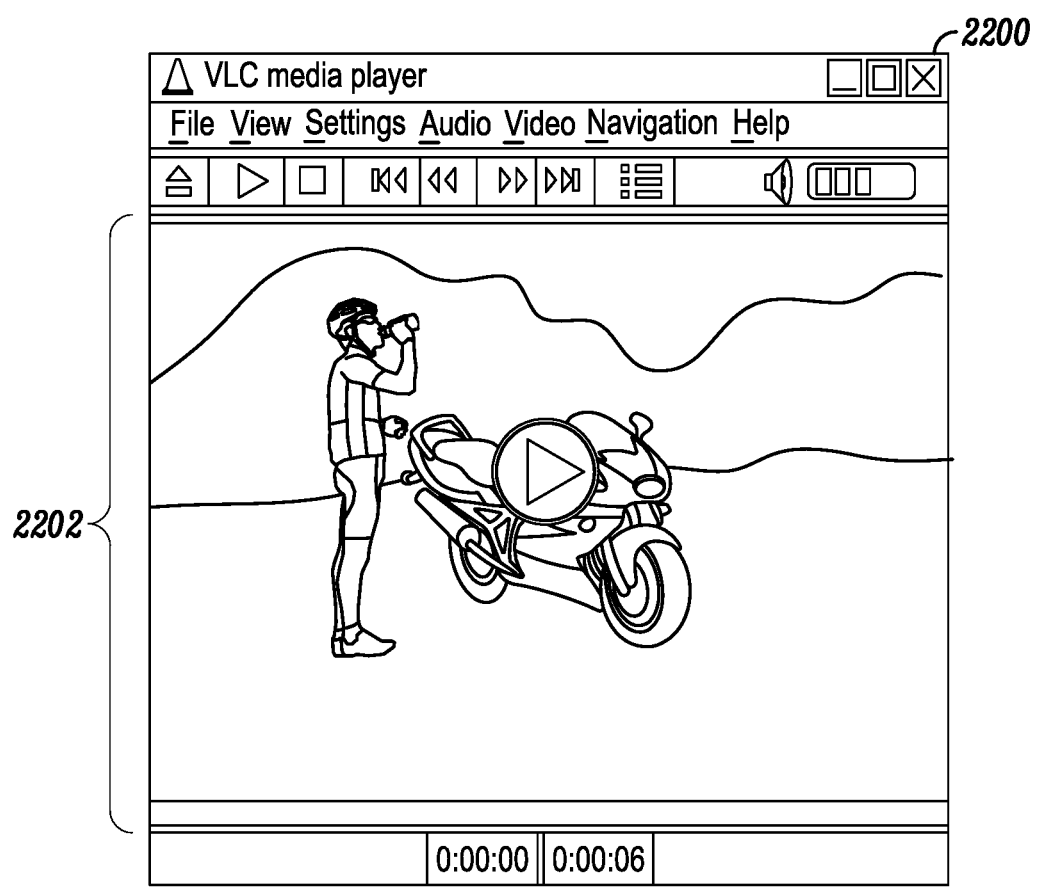
FIG. 22 is another screen display of a Graphical User Interface associated with operation of an embodiment of the present disclosure.

Turning now to FIG. 22, an exemplary GUI screen 2200 displays the derived video stream 2202 at remote controller and video monitoring station 1820, which as described hereinabove, is a copy of nominally identical quality to that passing to video destination 1812.

Figure 23:
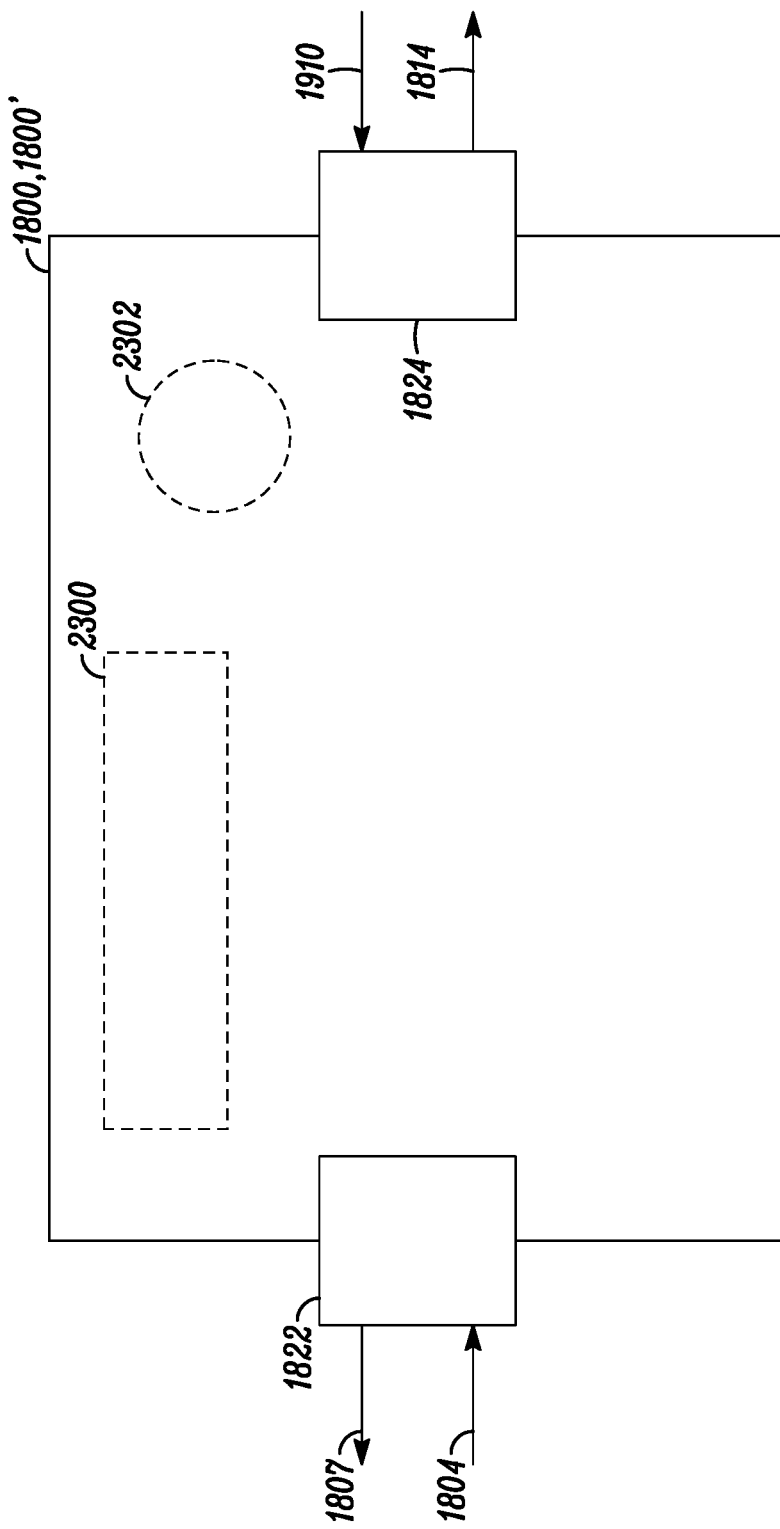
FIG. 23 is a diagrammatic view of an embodiment of the present disclosure.

Referring now to FIG. 23, system 1800, 1800', may be enclosed in a housing having ports 1822, 1824, an optional display or screen 2300, as discussed above, and an optional user actuatable input device such as a button 2302. This button, for example, may be actuated by the user when experiencing problems with the quality of video. The compute engine 1806, 1806' may store as user data, a log of the times and conditions under which the button 2302 was pressed within database 1902 (FIG. 19). Display screen 2300 may display various QOS information such as the measured quality and security parameters, allowing the user direct access to the benefits of system 1800, 1800'. The display screen 2300 may also be helpful in the event the user is speaking over the telephone with a service technician, who may direct the user to read the information on the display screen 2300.

Figure 24:
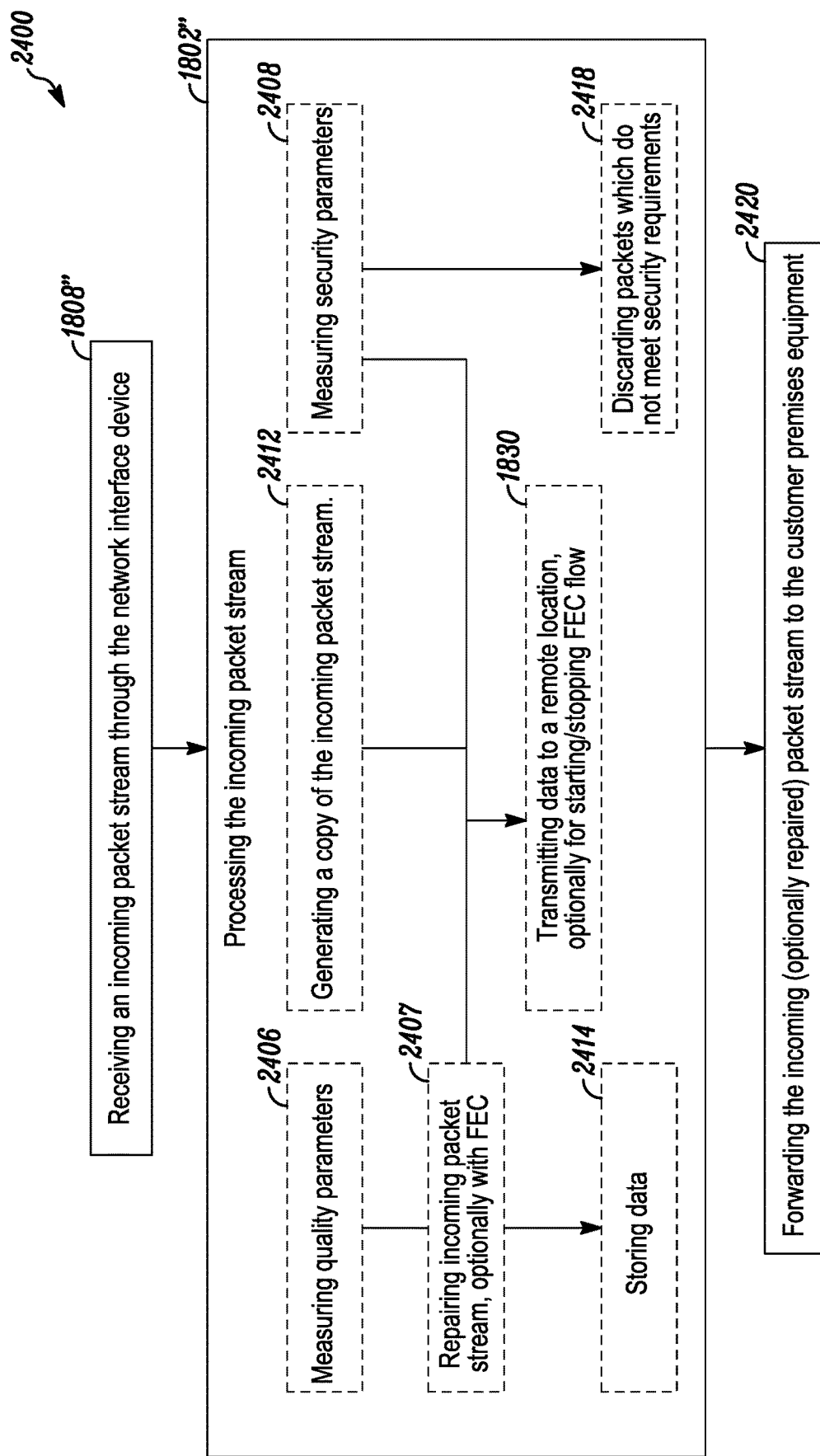
FIG. 24 is a diagrammatic view of an embodiment of the present disclosure.

FIG. 24 illustrates a method of use 2400 associated with an embodiment of the present disclosure. In step 1800", an incoming packet stream is received through an NID. Next, in step 1802", the received packet stream is processed. Step 1802" may include the optional steps of Measuring quality parameters 2406, Repairing the incoming stream 2407, e.g., with FEC, Generating a copy of the incoming packet stream 2412, and Measuring security parameters 2408. Next are the optional steps of Storing data 2414 and Transmitting data to a remote location 1830, such as for dynamically signaling a service provider to start and stop the FEC as desired. The step of Measuring security parameters 2408 may lead to the step of discarding packets which do not meet security requirements 2418. Step 2420 includes forwarding the incoming packet stream to video destination 1812 (FIG. 18).

Figure 25:
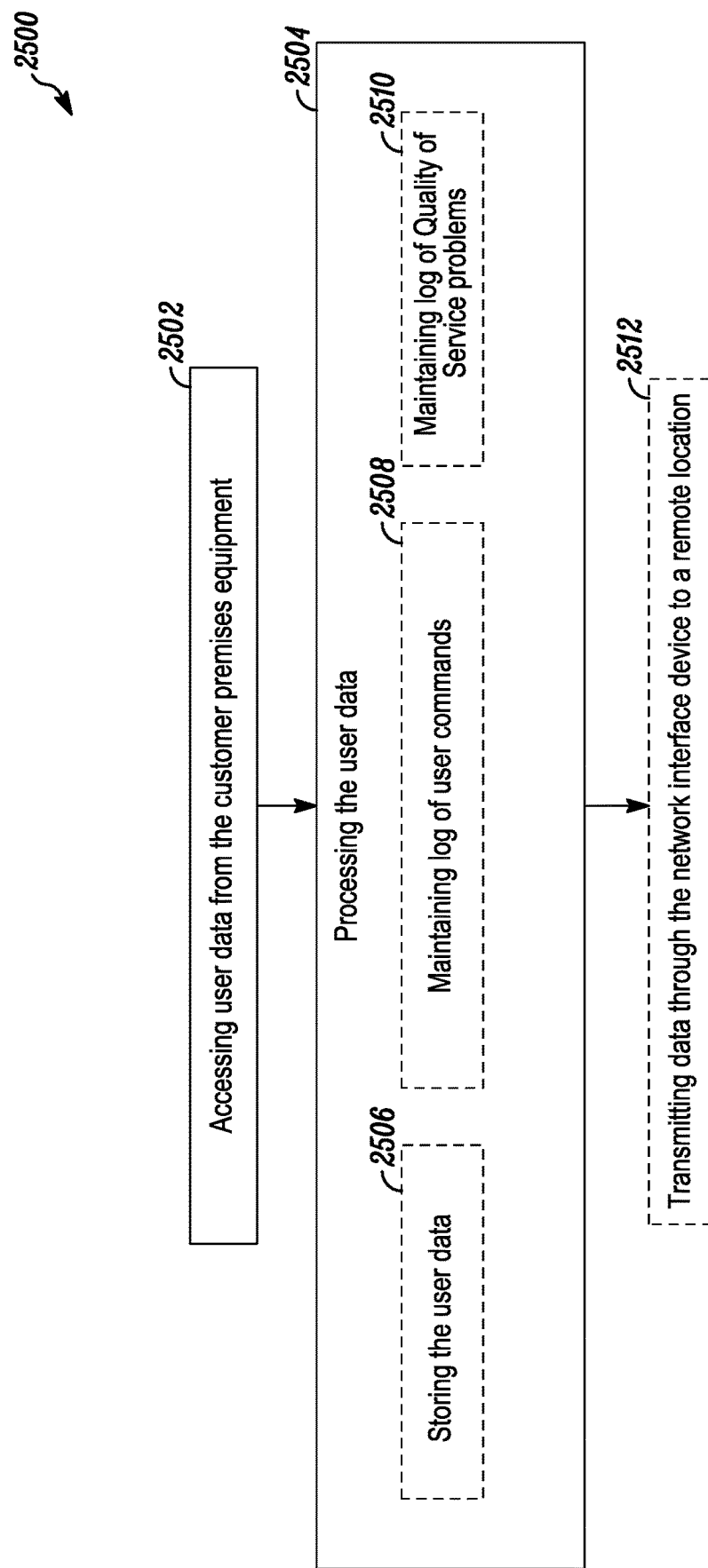
FIG. 25 is a diagrammatic view of an embodiment of the present disclosure.

Turning to FIG. 25, optional method 2500 associated with embodiments of the present disclosure includes capturing 2502, user data from the customer premises equipment. The user data is then processed 2504. Step 2504 may include the optional steps of Storing 2506 the user data, Maintaining 2508 a log of user commands, and Maintaining 2510 a log of QOS Problems. Data may then be transmitted 2512 to a remote location.

Figure 26:
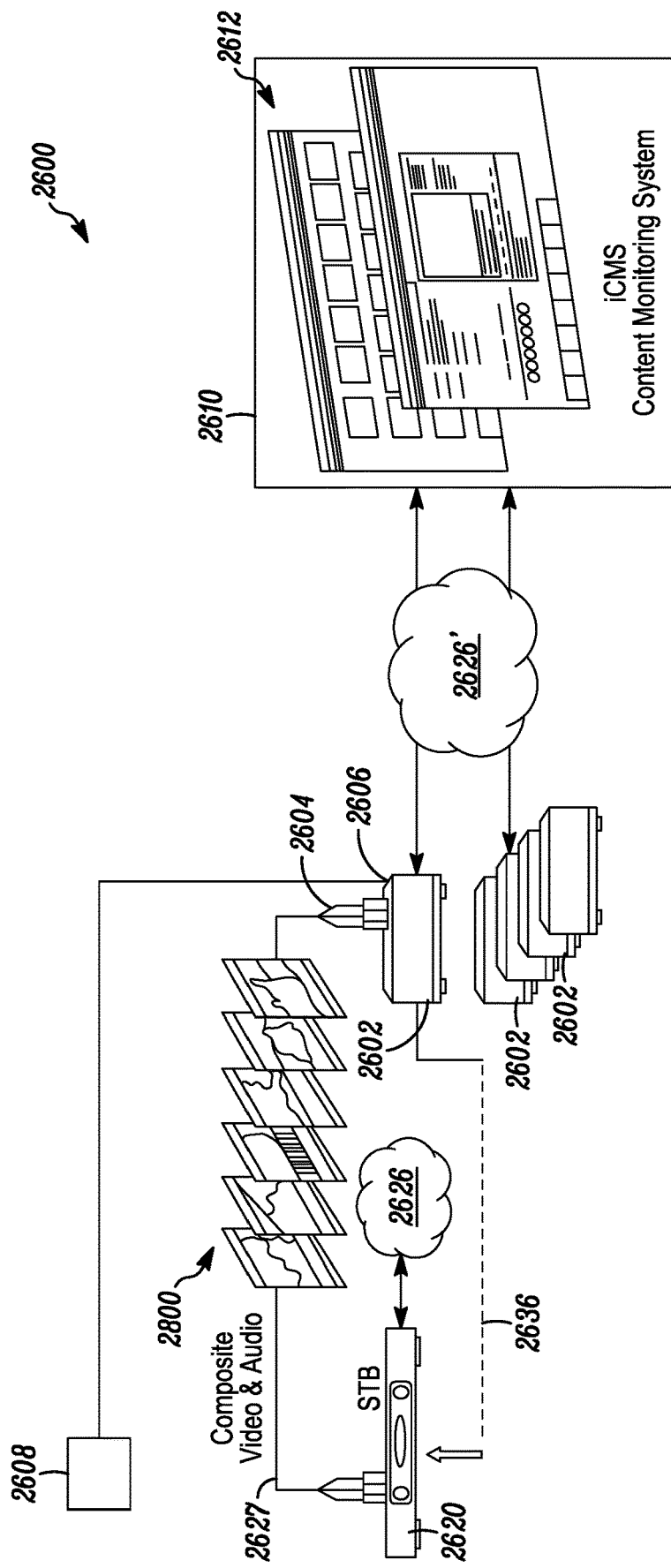
FIG. 26 is a diagrammatic view of an embodiment of the present disclosure.

Turning now to FIG. 26, an embodiment of the present disclosure includes a system 2600 for monitoring user quality-of-experience (QoE) for audio-video (AV) streams transported over a content distribution network 2626. This network 2626 may include Video on Demand (VoD) over the Internet, over a cellular network, and the like. As shown, system 2600 includes one or more AV probes 2602 having an AV input port 2604, and an AV output port 2606, and a network interface port (such as shown at 2702 in FIG. 27). The AV probe 2602 is configured for deployment at a node of the AV network, between an AV tuner 2620 such as a Set Top Box (STB), and AV destination customer premises equipment (CPE) 2608 such as a television. System 2600 also includes at least one processing engine 2610 coupled to the network interface port of the probes 2602 via a communications network 2626'.

It should be recognized that communications network 2626' may be separate and distinct from the aforementioned content distribution network 2626, or alternatively, may be substantially the same network, and/or may share common elements. For example, portions (or substantially all) of both networks 2626, 2626' may include the Internet. Alternatively, networks 2626, 2626' may include a conventional bi-directional CATV network, in which AV content flows to the user in one direction, and user instructions, such as VoD selections and the like, flow on the same network in the opposite direction.

AV probe 2602 may be configured for receiving an incoming AV stream 2627 from AV tuner 2620 through input port 2604 at a native frame rate. As will be discussed in greater detail herein, AV probe 2602 may be configured to capture thumbnails 2628 of the incoming AV stream 2627 at a sampling rate which is less than the native frame rate, to form a thumbnail stream 2800 (FIG. 28), and to apply timestamps to the thumbnails 2628 of the thumbnail stream 2800. AV probe 1202 may also be configured to transmit the captured thumbnail stream 2800 (e.g., through network port 2702, FIG. 27) to monitoring engine 2624 substantially in real-time, via network 2626. Probe 2602 may also be configured to forward the native incoming AV stream 2627 through the AV output port 2606 substantially in real-time, e.g., for use by CPE (e.g., television) 2622.

Monitoring engine 2610 may take the form of computer readable program code disposed on a computer readable medium such as a ROM (Read Only Memory) device incorporated within one or more computers or servers. As shown, this monitoring engine 2610 may be disposed remotely from the one or more probes 2602, being communicably coupled thereto via network 2626'. Monitoring engine 2624 may be configured to receive and process the thumbnail stream 2800 (FIG. 28) to transform thumbnail stream 2800 into a visual representation of AV data 2632, e.g., substantially in real-time. In particular embodiments, the AV data representation 2632 may include video (AV) content verification data, including advertisement insertion data, is discussed in greater detail herein.

In the aforementioned embodiment, AV input port and network interface port are shown and described as separate and distinct elements 2614 and 2618. It should be recognized, however, that in some embodiments, these ports may be effectively combined into a single device. For example, AV input port 2614 may be configured for bi-directional operation, to transmit thumbnail stream 2800 back to AV tuner 2620 where it may then be transmitted via network 2626 to monitoring engine 2610.

Moreover, optionally, probe 2602 may be configured to capture user data and to transmit this captured data to the monitoring engine 2610. For example, probes 2602 deployed in a user's premises as shown, may be configured to receive user input such as channel selection, VoD selection, and/or the amount of time spent viewing such content, via a conventional remote control device. This user input may then be communicated to AV tuner 2620, such as by a conventional IR blaster shown in phantom at 2636, to permit the tuner to operate in a conventional manner, i.e., to tune the user's STB 2620 to the particular channel desired by the user. This approach may thus enable user data, including audience metrics such as the aforementioned channels/content viewed and the amount of time spent viewing such content, etc., to be conveniently captured by the probe 2602 and forwarded, along with the various thumbnail streams 2800, to monitoring engine 2610 for use in visual representation 2704.

System 2600 may thus be used for baseband video and audio fault monitoring (live and/or historical), baseband video auditing and reporting, channel monitoring/scheduling, via distributed management, as well as for advertisement insertion monitoring. For example, various embodiments of the present disclosure may be used for monitoring advertisements in real-time, including start and stop times of advertisements, verifying that avails were present at scheduled times, detecting SCTE-35 advertisement cue signals including pre-rolls and program in/out information, monitoring presence and timing of incoming splice messages, monitoring presence and timing of outgoing splice messages, monitoring splice event IDs, generating AV quality metrics, and combinations thereof, as will be discussed in greater detail herein. Moreover, as will be discussed with respect to FIGS. 29 and 30, these capabilities may be affected using multiple probes 2602, across multiple AV streams/channels which are optionally changed by either the user as discussed above, or centrally upon commands distributed to the probes from monitoring engine 2610.

Figure 27:
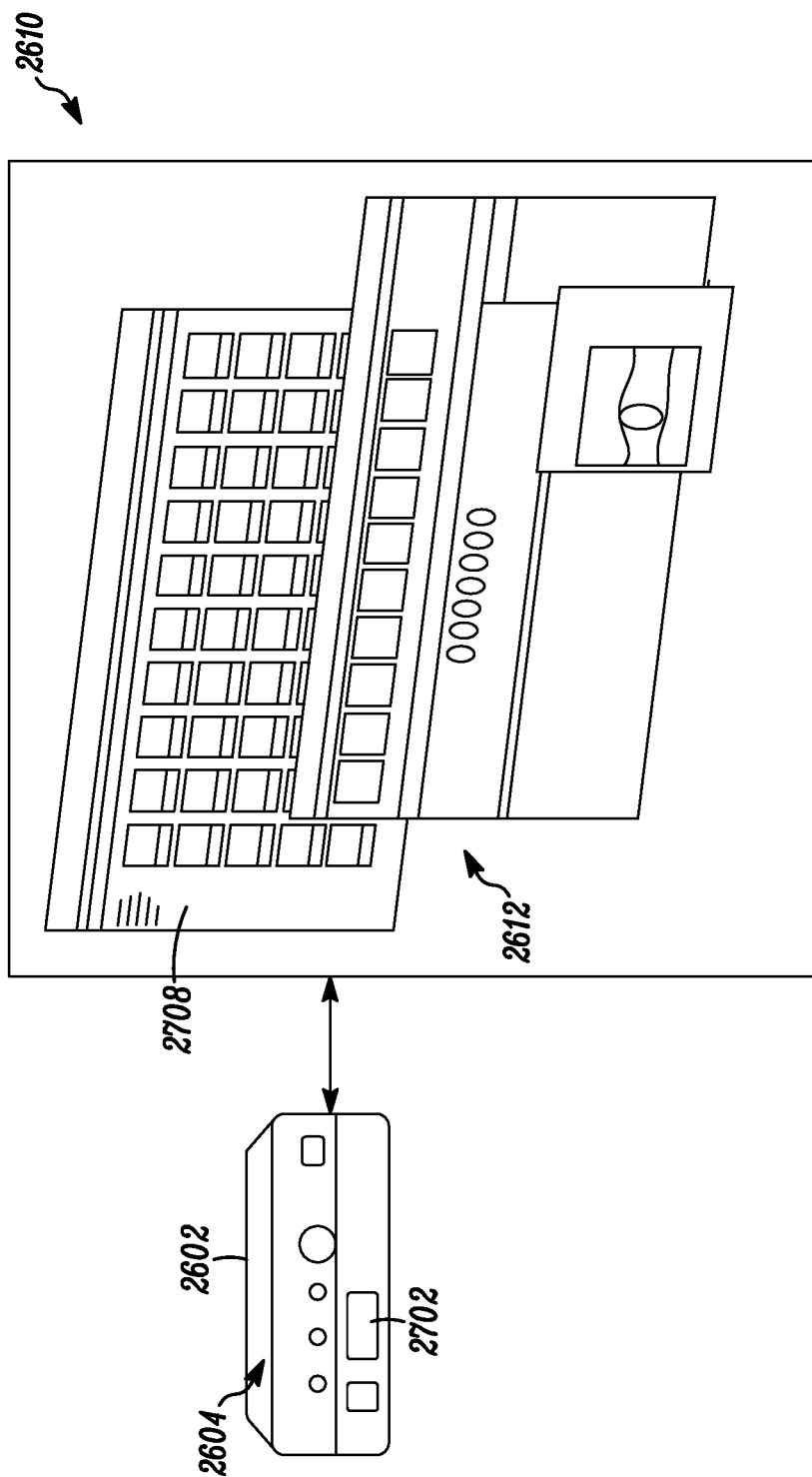
FIG. 27 is a diagrammatic view of an embodiment of the present disclosure.

Turning now to FIG. 27, aspects of system 2600 will be described in greater detail. In particular embodiments, video quality probe 2602 may include AV input port(s) 2604, e.g., in the form of conventional composite or component inputs, and a network interface port 2702, e.g., in the form of a conventional RJXX port. Video quality probe 2602 may also include a data storage device, e.g., in the form of a disk drive, flash drive or other memory device, configured to store and/or archive the various thumbnail streams 2800, for DVTA (Digital Video Thumbnail Archiving). Alternatively, or in addition, video quality probe 2602 may be configured for substantially real-time transmission of thumbnail streams 2800 for DVTA at monitoring engine 2610. Probe 2602 may thus be configured to monitor substantially in real-time, video (AV) streams 2627 (FIG. 26), e.g., by capturing a series of thumbnails 2800 thereof. Probe 2602 may thus be configured for remote baseband video (AV) monitoring in real-time, including black screen and freeze frame detection, audio channel level detection, video intensity level detection, storing the captured thumbnails for auditing, remote real-time visual inspection, and/or historical and offline content inspection (e.g., advertisement insertion verification as discussed below).

In particular representative embodiments, for example, probe 2602 may be capable of capturing video thumbnails at up to 8 thumbnails or more per second, and for storing up to 30 minutes of jpeg thumbnails in the probe, at a capture rate of 1 thumbnail per second for approximately 1800 samples. These captured thumbnails and statistics/measurements may be subsequently uploaded to monitoring engine 2610 as discussed hereinabove. As also mentioned above, probe 2602 may be used, e.g., upon instructions sent from monitoring engine 2610, to control the STB 2620, e.g., via IR Blaster 2636 or similar control means. In this manner, probe 2602 may be used to perform various additional functions, such as scanning channels, changing channels, locking to a particular channel, remotely power cycling STB 2620, and/or capturing various audience metrics based on user selections.

As also shown, monitoring engine 2610 may be configured to generate a visual representation or transformation of captured data that may include, for example, a mosaic view 2708 that shows simultaneous thumbnail views from multiple probes 2602. Alternatively mosaic view 2708 may show sequential thumbnails from a single probe 2602. Visual representation may thus provide a graphical representation of the foregoing data including baseband video and audio levels, metrics/statistics, with alarming at minimum and maximum thresholds, video frame statistics, reports, logs with time stamps and/or marked with comments, and thumbnails such as to verify content. Monitoring engine 2610 may also be optionally configured for integration with an AV management module 3142 (FIG. 31) as is discussed in greater detail herein.

Figure 28:
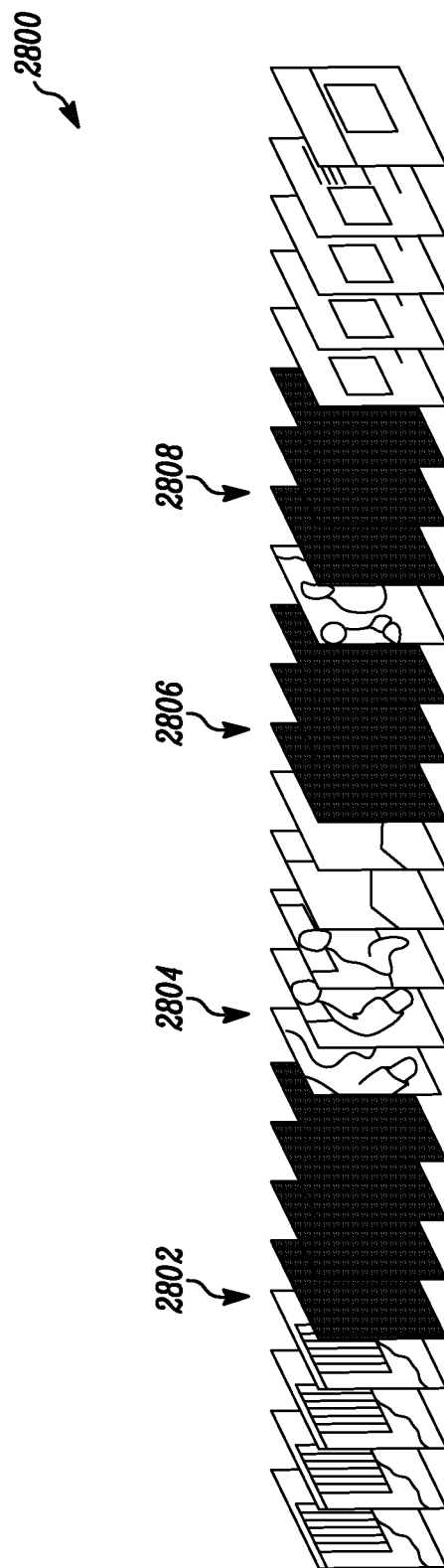
FIG. 28 is a diagrammatic view of an embodiment of the present disclosure.

Referring now to FIG. 28, an exemplary captured thumbnail stream 2800 is shown. Once this stream has been captured, probe 2602 may inspect the stream to generate the various metrics/functions described herein. This inspection may be accomplished using substantially any conventional video detection approach, such as comparing the pixels of adjacent thumbnails to determine the number of pixel changes therebetween. This inspection may also include comparing the thumbnails to the various embedded markers used for insertion of advertisements or other content.

For example, when monitoring advertisement insertion, a probe 2602 may inspect stream 2800 to identify the end of a first advertisement at 2802, and the beginning of a second advertisement at 2804, followed by black screens at 2806 and 2808. This inspection may provide verification that both the first and second advertisements were in fact inserted into the original AV stream 2627 (FIG. 26) from which thumbnail stream 2800 was derived. This inspection may also reveal, for example, that an undesirably high number of black screens occurred between 2802 and 2804, e.g., to indicate a late splice of the second advertisement. As mentioned hereinabove, such late splicing may be undesirable, as it generally means that a portion of the advertisement, and/or subsequent content, was cut off, and consequently, a refund of fees may be due, such as to an advertiser whose advertisement was cut short. This inspection may thus be used to capture a wide range of metrics and to display visual representations thereof, including delivery status, content outages, bit rates, advertisement splice performance including start and end of splice, early or late start or end of splice, black frame performance, including appropriate distribution of black frames pre- and post-splice, freeze frames, and audio levels during the advertisement, for generation of audio level histograms (pre-, during and post-).

As another example, when monitoring baseband video and audio, an inspection of stream 2800 may indicate the presence of good content at 2802, followed by black screens before a program change at 2804, which was followed by additional black screens at 2806 and 2808. This inspection thus may provide for example, verification of the presence of good content, while also indicating an undesirably high number of black screens between 2802 and 2804, and a desirable number of black screens at 2806 and 2808. In this manner, such an inspection may be used to capture metrics that are used to generate visual representations of the baseband AV stream 2627 (FIG. 26) substantially in real-time, for video and audio faults, black screen detection, intensity levels, and freeze frame, etc.

In various embodiments, the incoming AV stream 2627 (FIG. 26) thumbnails are captured (i.e., the stream 2627 is sampled) at a sampling rate that is about half the native frame rate or less. For example, the native frame rate of a conventional AV stream 2627 in the U.S. is 30 frames per second, while the native frame rate in Europe and Asia is generally 25 frames per second. So, for example, if the native frame rate of stream 2627 is 30 frames per second (fps), probe 2602 may capture thumbnails for use in stream 2800, at a sampling rate of 15 fps or less. In particular applications, a sampling rate of about one third the native frame rate or less, may be desired. Stream 2800 may also include a captured audio sample associated with the various thumbnails. The results of each of these inspections may then be transformed into visual representations 2632 (FIG. 27) as described herein.

In addition, the sampling rate may be varied, to permit some content to be sampled at a higher rate that other content. For example, to further conserve resources, the sampling rate may be adjusted to a relatively low rate of 1 fps for a television show, and then adjusted to a higher rate fps for a higher resolution) of 8 fps for advertisements, e.g., upon receipt of an SCTE-35 advertisement cue signal. This capture of thumbnails at a frame rate that is substantially lower than the native frame rate, enables the AV stream 2627 to be accurately monitored using a fraction of the resources that would be required to monitor AV streams in a conventional manner at their native frame rates. This relatively high efficiency may be further enhanced by this adjustment of the sampling rates to emphasize higher resolution when monitoring selected content such as advertisements, which may be particularly sensitive to miscues, black screens, etc., due to their relatively short duration and high cost.

Figure 29:
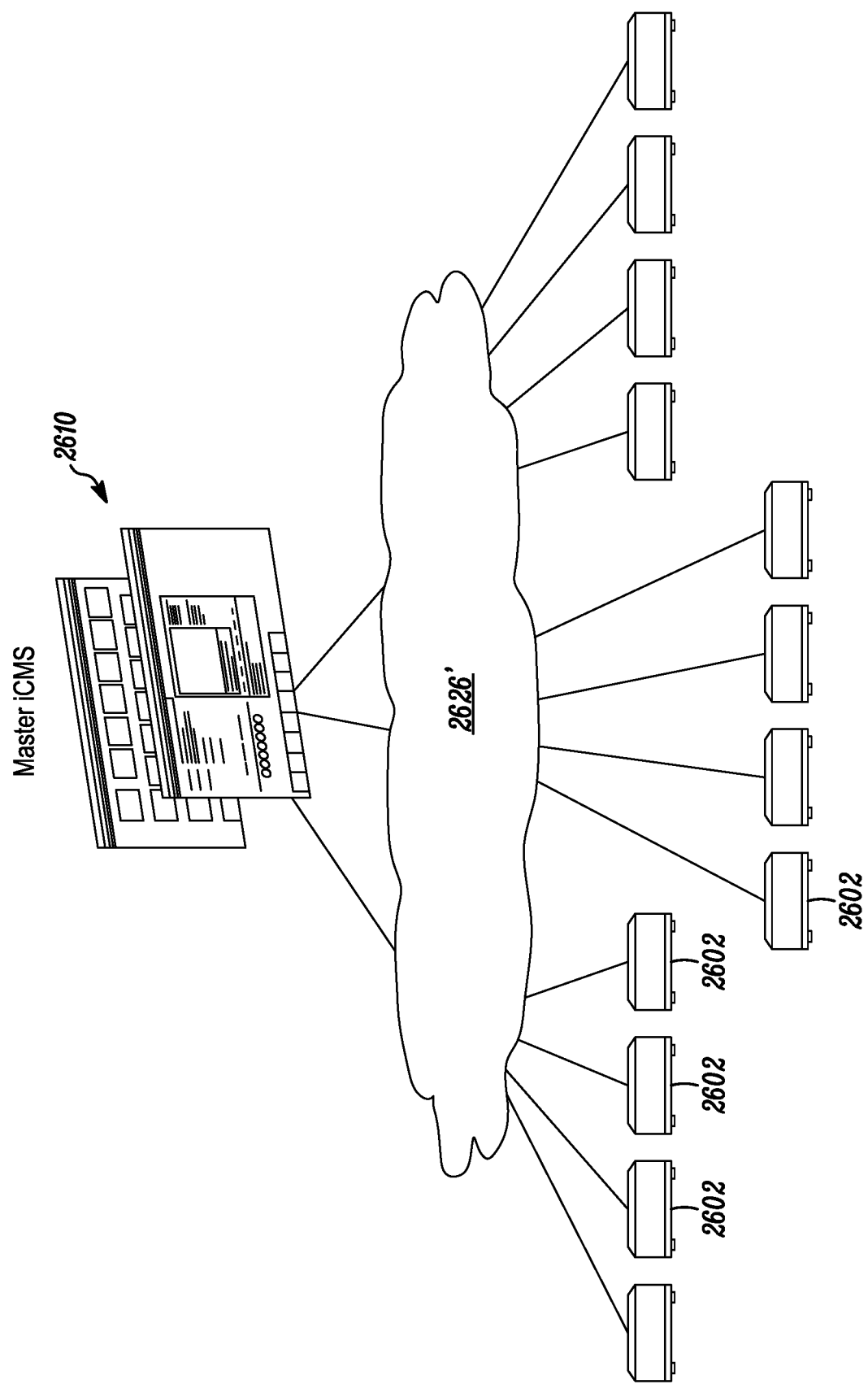
FIG. 29 is a diagrammatic view of an embodiment of the present disclosure.
Figure 30:
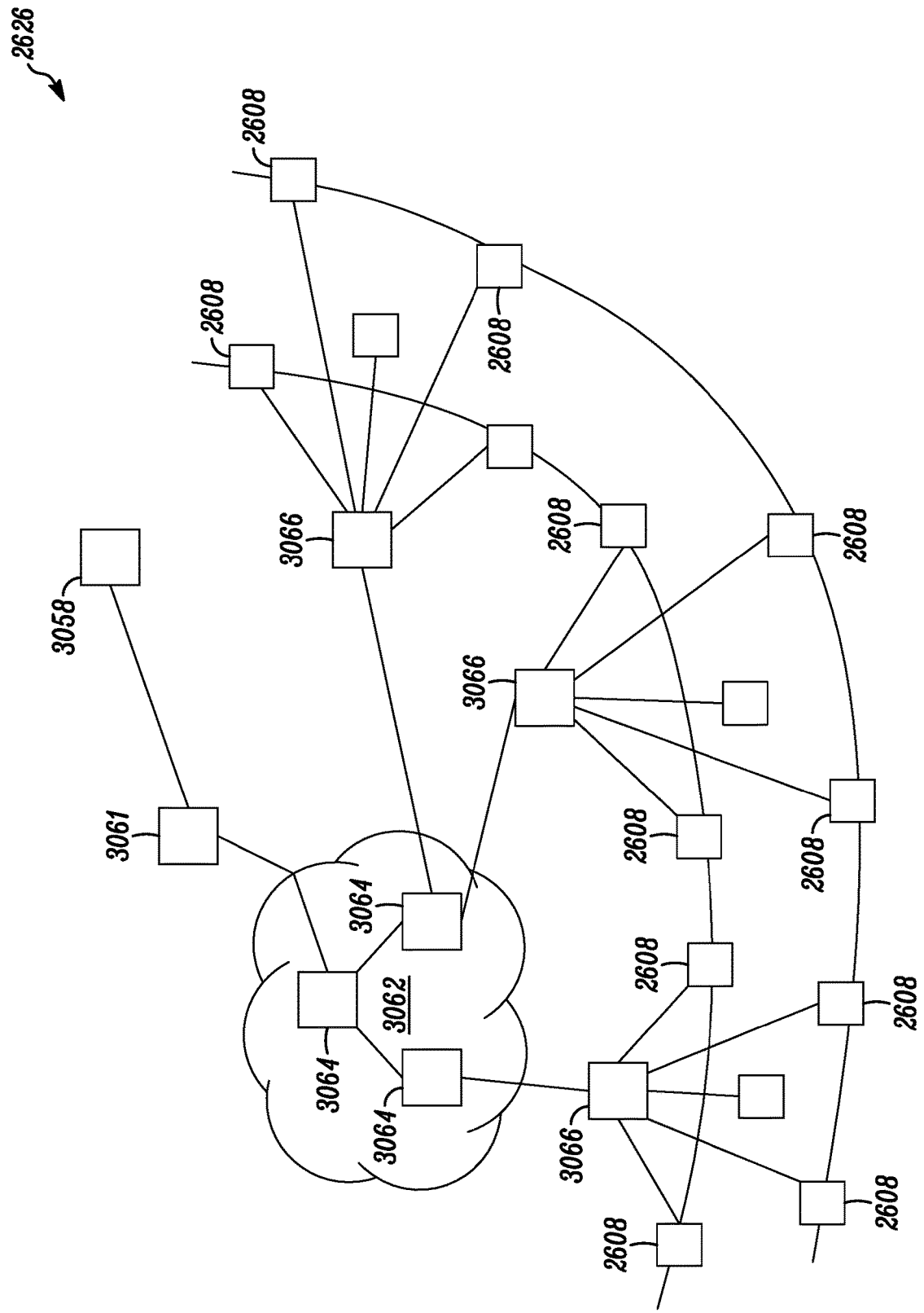
FIG. 30 is a diagrammatic view of an embodiment of the present disclosure.

Turning now to FIGS. 29 and 30, as mentioned above, substantially any number of probes 2602 may be deployed to send thumbnail streams 2800 to monitoring engine 2610, either substantially in real-time or delayed. As shown in FIG. 29, these probes 2602 may be configured to send streams 2800 via communications network 2626'. Moreover, as shown in FIG. 30, these probes 2602 may be placed at any number of locations within content distribution network 2626, which locations may be distributed laterally, e.g., at various end user STBs 2620 (FIG. 26), and hierarchically within network 2626. This use of multiple probes 2602 may provide for distributed data capture, which may then be aggregated at one or more central locations (e.g., at engine 2610) for monitoring. This approach thus provides for a relatively broad and deep view of the performance of network 2626, which facilitates such activities as channel scheduling in which various probes 2602 may monitor specific channels at specific times. This configuration may also be used to monitor and log the load balance within network 2626, by tracking the distribution of users tuning in to particular channels across the network. Still further, the hierarchical placement of probes 2602 may be used to monitor a particular AV stream 2627 at various locations throughout its transport. Monitoring engine 2610 may thus aggregate and compare the streams 2800 received from multiple probes, disposed at various hierarchical levels within network 2626, and tuned to the same channel for the same AV content. This data may then be aggregated to generate metrics associated with the quality of the AV stream 2627 along its transport to an end user.

Figure 31:
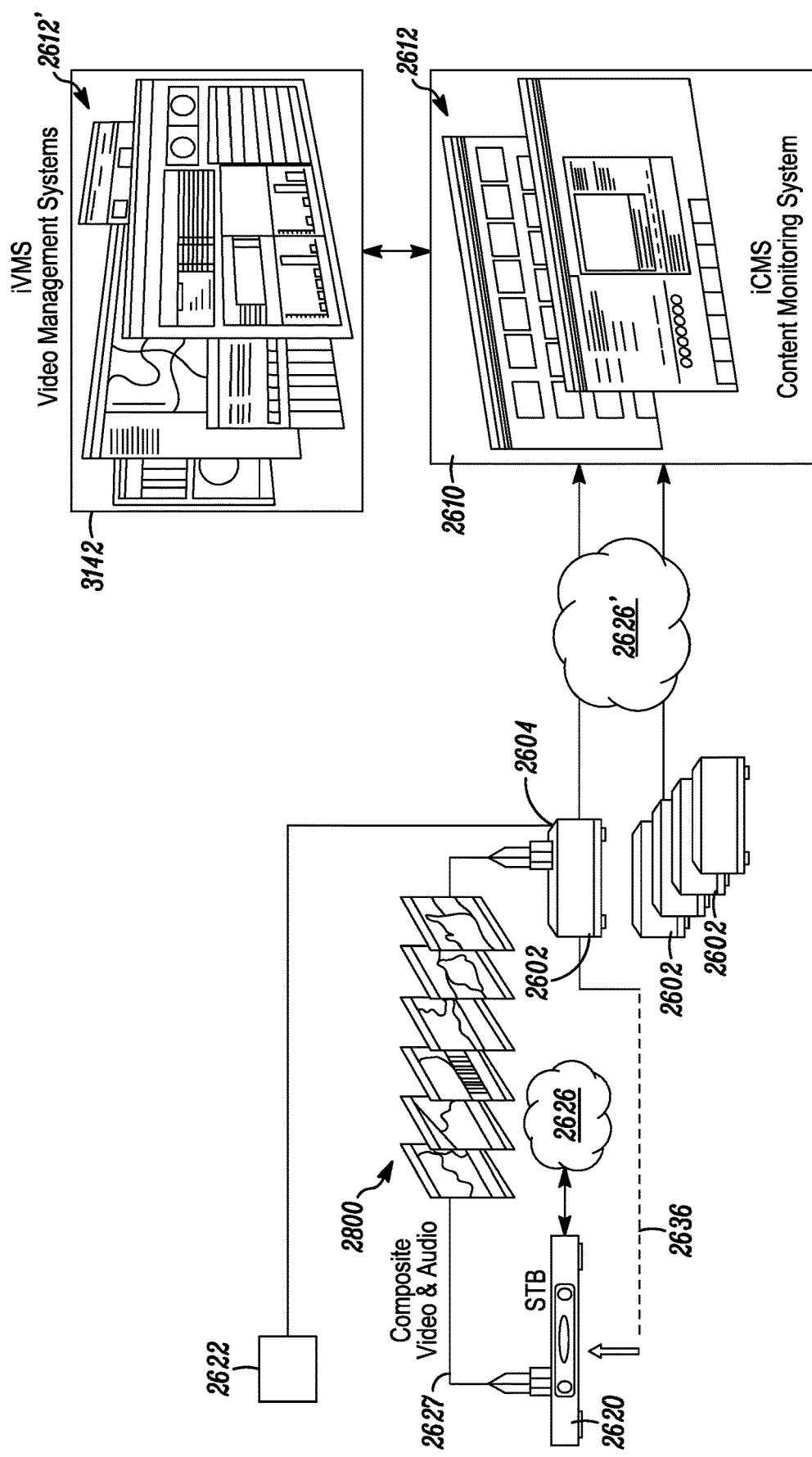
FIG. 31 is a diagrammatic view of an embodiment of the present disclosure.

Alternatively, or in addition, data pertaining to the transport stream itself, including aspects thereof that may be associated with traffic, bottlenecks, etc., within network 2626, may be obtained in a conventional manner. This data may, for example, be obtained by an iVMS™ Video Management System commercially available from IneoQuest Technologies, Inc. (Mansfield, Mass.), such as shown as AV management module 3142 (FIG. 31). This transport stream data may be correlated to the data aggregated by monitoring engine 2610 to produce a composite visual transformation 2632 as discussed herein with reference to FIG. 31.

Such hierarchical placement of probes 2602 within the content distribution network 2626 is shown, for example, in FIG. 30, in which a representative content distribution network 2626 may include a content originator 3058 such as a broadcasting network, which transmits content to a packetized or non-packetized data source (e.g., VoD headend)

3061, such as a cable television (CATV) company or the like. Data source 3061 may be configured to forward a Transport Stream (TS), such as packetized video, via suitable link to a network core 3062, which may include some combination of asynchronous transfer mode (ATM), frame relay, IP (e.g., Internet), and/or conventional MPEG-2 transport stream networks. As shown, the TS may pass through various network elements, such as one or more routers 3064, and/or peripheral elements 3066 such as DSLAMs (Digital Subscriber Line Access Multiplexers), before arriving at an end user's tuner 2620. Those skilled in the art will recognize that a DSLAM may be a network element, usually located at a telephone company central office that demultiplexes signals received via network 2626, and distributes them to end users via Digital Subscriber Line (DSL) connections.

As mentioned hereinabove, the AV stream supplied by content originator 3058 typically includes various markers embedded in the native frame rate that are used by the CATV company or VoD provider, e.g., at head end 3061 or at other nodes within the network 2626, to splice in content such as programming and advertisements targeted towards their local end users. Examples of such markers include those commonly known as 'avails', SCTE-35 advertisement cue signals including pre-rolls and program in/out information, incoming and outgoing splice messages, and splice event IDs, etc.

Probes 2602 (FIG. 29) may be placed nominally anywhere within network 2626, e.g., at substantially any of the aforementioned network nodes, to effect the aforementioned monitoring. In this regard, it should be recognized that the TS may be decoded into a native stream 2627 by an AV tuner deployed at any number of the aforementioned network nodes, such as to facilitate the aforementioned monitoring and/or content insertion functions. For example, content transmitted by a source 3058 such as a television network may be typically received and decoded by a CATV company at head end 3061 for insertion of local advertisements, etc. A probe 2602 may thus be placed at head end 3061 to verify the quality of the content received from source 3058. Alternatively, probes 2602 may be spaced further downstream, such as with or within network elements/nodes 3064 of network core 3062, at peripheral network elements/nodes 3066, and/or at locations therebetween. Probes 2602 may thus be deployed to receive the decoded native stream 2627 at node 3061, or substantially any of the other nodes. In this manner, any number of probes 2602 may be effectively deployed between an AV tuner, e.g., associated with the particular node, and the AV destination customer premises equipment (CPE) 2622.

Moreover, it should be recognized that the various probes deployed throughout network 2626 may be operated remotely, such as to monitor a range of channels. For example, a CATV operator may program various probes 2602 disposed along network 2626 to monitor e.g., any advertisements playing on a particular network (e.g., ABC or CNN). Alternatively, probes 2602 may be placed in scan mode, e.g., either in synchronicity with other probes 2602, or independently of other probes, to monitor a range of channels at various intervals.

In the aforementioned embodiments, probes 2602 have been shown as discrete, stand-alone devices that are separate and distinct from AV tuner 2620 (FIG. 26) and from network elements/nodes 3061, 3064, 3066, 2622, etc., and which may be inserted in series with an existing network link, such as using fiber, copper, or wireless interfaces. It should be recognized, however, that in alternative embodiments, probes 2602 may be incorporated (e.g., co-located), within a network element/node 3061, 3064, 3066, etc., with or without an AV tuner.

Turning now to FIG. 31, as mentioned above, monitoring engine 2610 may include, or be otherwise integrated with an AV management module 3142. This module 3142 may be co-located with, or disposed remotely from monitoring engine 2610. In particular embodiments, as discussed hereinabove, module 3142 may be an iVMS™ Video Management System (IneoQuest) which collects and aggregates data pertaining to one or more transport streams as they are conveyed through content distribution network 2626. In addition, module 3142 may be configured to receive data from a plurality of monitoring engines 2610 and to correlate this data with that of the various transport streams. In this manner, data from multiple probes 2602 which have been aggregated at a particular monitoring engine 2610 may be further aggregated at module 3142 for a relatively comprehensive analysis of content distribution network 2626. For example, data from probes 2602 deployed along substantially the entire length of a typical TS route through network 2626, may be conveniently aggregated with conventional transport stream data to provide a user with a visual transformations 2632' corresponding to AV data/quality along substantially the entire length of the TS route, e.g., from head-end 3061 to users' CPE 2608.

Figure 32A:
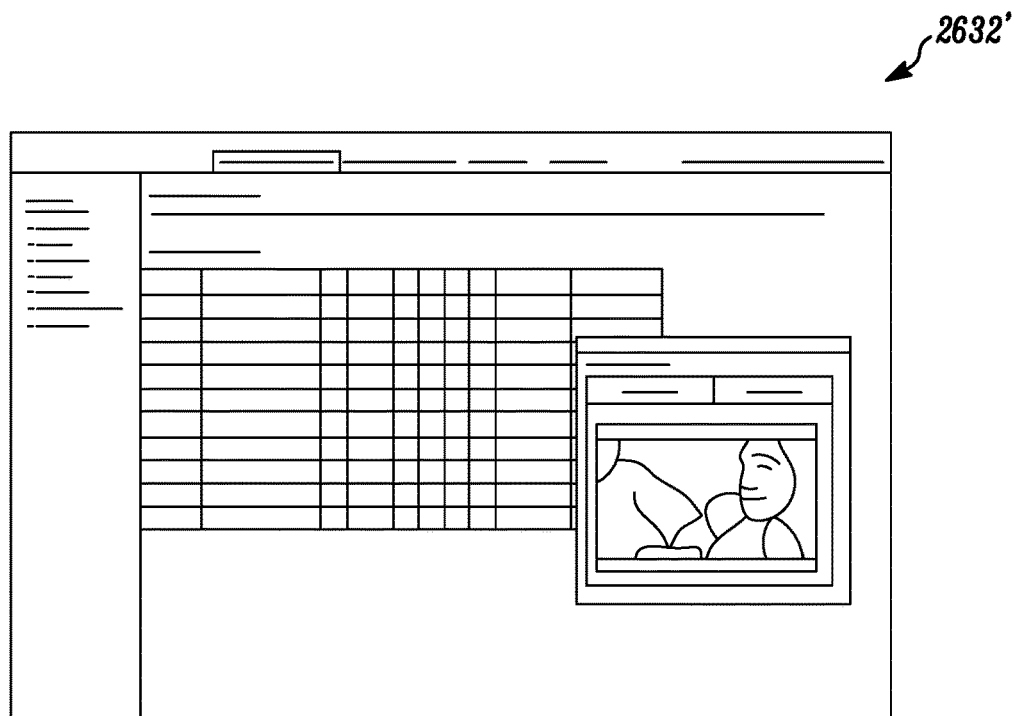
FIGS. 32A and 32B are diagrammatic views of an embodiment of the present disclosure.
Figure 32B:
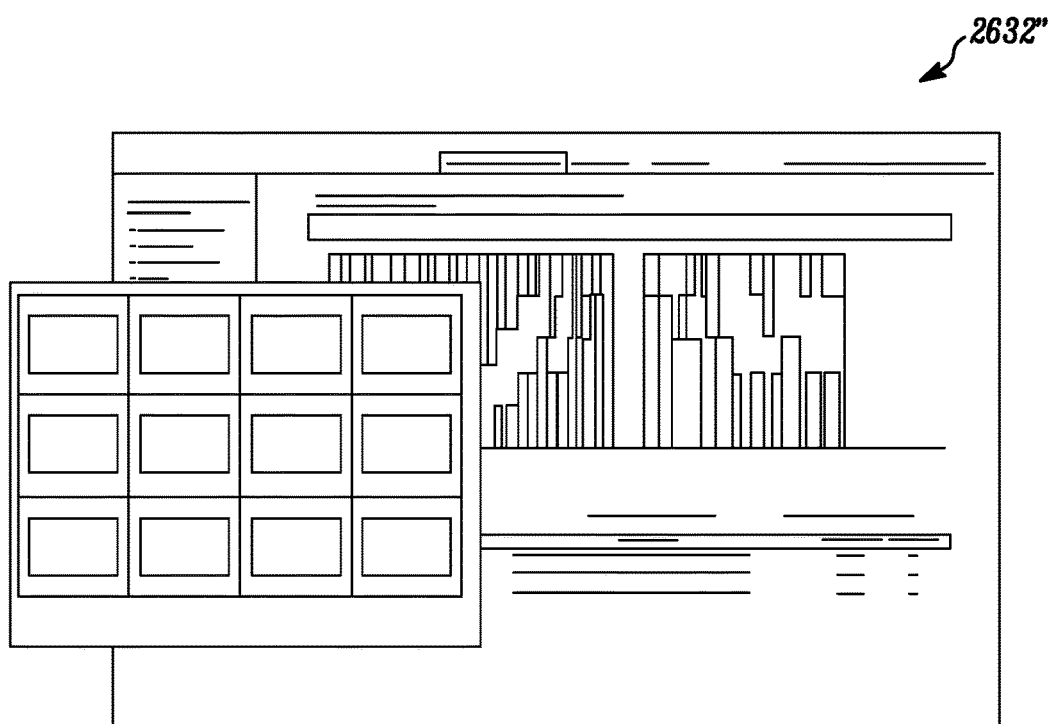

Referring now to FIGS. 32A, 32B, representative examples of the various transformations generated by monitoring engine 2610 and/or management module 3142 are shown and described. For example, visual transformation 2632' may include data in a tabular format with representations of individual thumbnails. Visual transformation 2632" may include a mosaic of various thumbnails associated with one or more captured streams 2800, e.g., associated with a single AV channel or multiple channels. Alternatively, the thumbnail mosaic may include substantially the same thumbnail captured at multiple points within the distribution network 2626. Transformation 2612" may also include reporting capabilities such as histograms or charts which summarize the captured data, e.g., pertaining to audio or visual levels within the captured thumbnails, etc. Moreover, in particular embodiments, transformation 2612" may include metrics associated with particular transport streams, such as provided by management module 3142.

Figure 33:
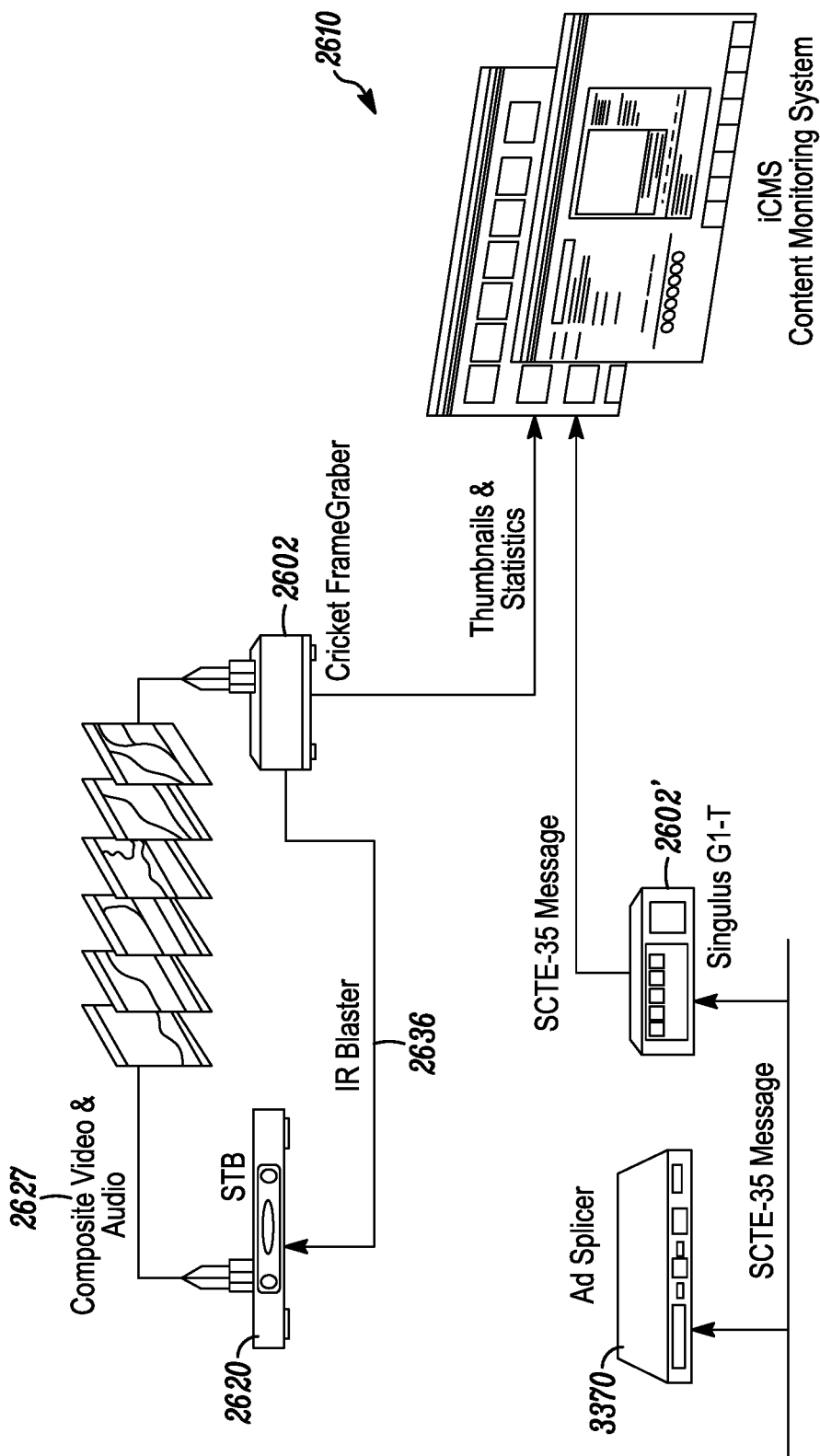
FIG. 33 is a diagrammatic view of an embodiment of the present disclosure.

Turning now to FIG. 33, it should be recognized, in light of the instant disclosure, that any number of devices known to those skilled in the art may be configured to accomplish the aforementioned functions associated with probe 2602. Examples of such devices may include, but are not limited to, the Singulus G10™, Geminus G10™, Geminus G2X™, Singulus G1-T™, Geminus G1-T™, IQMediaMonitor™, and IQDialogue™, devices, all commercially available from IneoQuest. For example, a Singulus G1-T™, shown at 2602' may be used to monitor the insertion of advertisements as effected by a conventional advertisement splicer 3370 that may be deployed, for example, at head end 3061 of content distribution network 2626 (FIG. 30). The data captured by probe 2602', including thumbnail stream 2800 (FIG. 28) generated thereby, may thus be combined with data captured by one or more probes 2602, at monitoring engine 2610.

It should be recognized that various advertisement servers and/or advertisement splicers 3370 may include a lineup of which advertisement is to be inserted where (including which time zone) and when. Monitoring engine 2610 and/or management system 3142 may capture that lineup and then compare it with the thumbnail streams 2800 captured at the particular locations and times, for verification.

In some embodiments, advertisement splicers 3370 may be configured to provide one or more of a customer ad schedule and ad verification files. One or more components of system 2600 (e.g., monitoring engine 2610) may be used to automatically compare, on a periodic basis, some or all of the customer's ad schedule files and ad verification files from ad splicers 3370 to the actual SCTE35 tones that occurred during that time period. Using this information, system 2600 may be configured to generate a result set or Ad Run report configured to indicate whether an advertisement was displayed correctly, and if not, a reason for a display error. This report may indicate to the customer the advertisements that played and which advertisements did not. The Ad Run report may also include specific information regarding the reason for the failure, including, but not limited to, a missed tone, etc.

In some embodiments, system 2600 may be configured to measure an audio level associated with a given AV stream for comparison purposes. For example, audio levels from the output of the STB may be measured and directed through an averaging filter in the AV probe in order to set an alarm, which may be sent to the management server. In some embodiments, the management server may also receive an indication of the loudness. In the server, a comparison may be performed between the dialog normalization (i.e., dialnorm) values that have been decoded from the AV stream with the measured audio levels to identify audio level shifts that may be in error and to identify the video that was playing at that time (the dialnorm value may refer to the control signal or meta data used to create a relatively consistent consumer dialog level between various programs and channels). The data may be compared to an ad schedule similar to those discussed above. In this way, system 2600 may be used to compare actual audio levels with dialnorm values, and to make the threshold user configurable.

Figure 34:
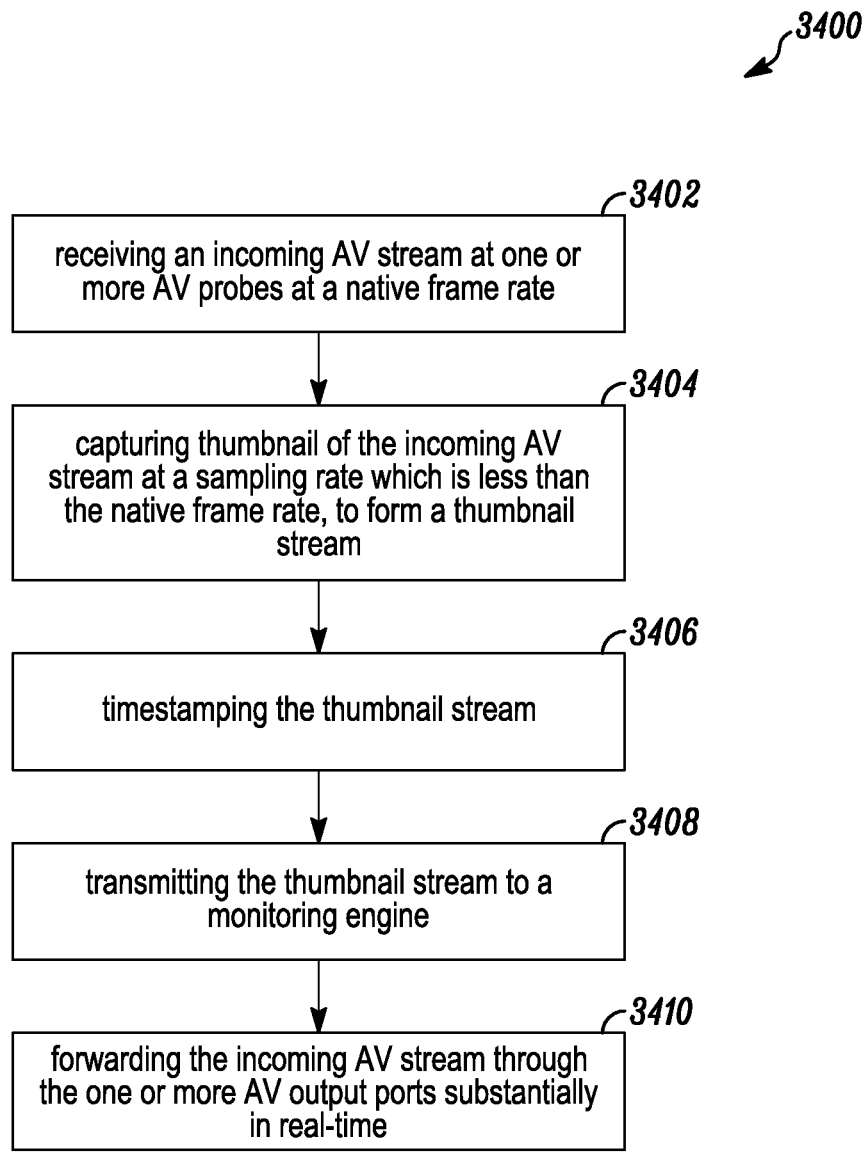
FIG. 34 is a flowchart of processing an incoming AV stream.

Referring now to FIG. 34, an exemplary method 3400 for monitoring at least one audio-video (AV) stream transported over a network in accordance with the present disclosure is provided. Method 3400 may include receiving an incoming AV stream at one or more AV probes at a native frame rate (3402) and capturing thumbnails of the incoming AV stream at a sampling rate which is less than the native frame rate, to form a thumbnail stream (3404). Method 3400 may further include timestamping the thumbnail stream (3406), transmitting the thumbnail stream to a monitoring engine (3408), and forwarding the incoming AV stream through the one or more AV output ports substantially in real-time (3410). Numerous other operations are also within the scope of the present disclosure.

Figure 35:
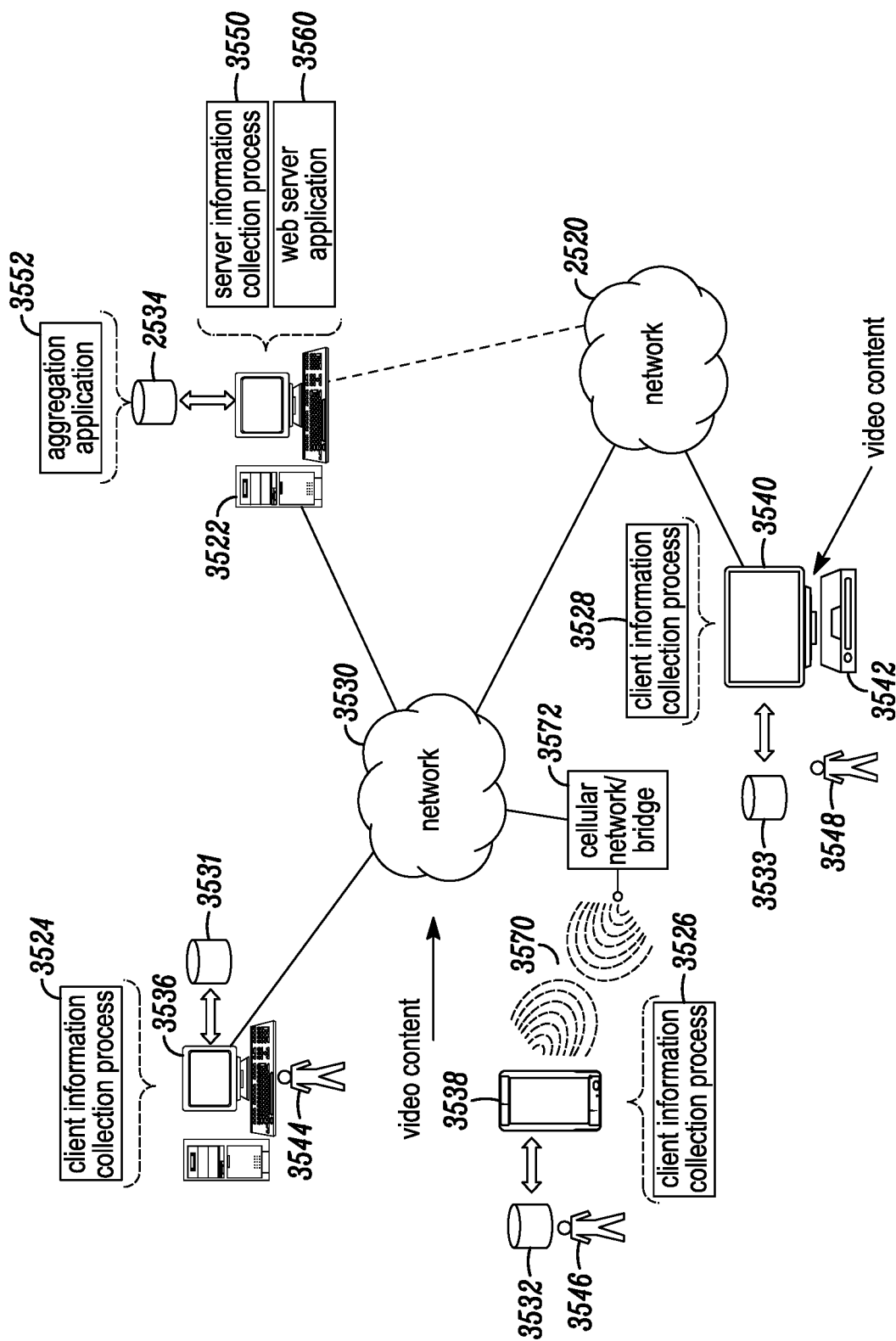
FIG. 35 is a diagrammatic view of an embodiment of the present disclosure.

Referring to FIG. 35, there is shown server information sharing process 3550 that may reside on and may be executed by server computer 3522, which may be connected to network 3530 (e.g., the Internet or a local area network). Examples of server computer 3522 may include, but are not limited to: a personal computer, a server computer, a series of server computers, a mini computer, and a mainframe computer. Server computer 3522 may be a web server (or a series of servers) running a network operating system, examples of which may include but are not limited to: Microsoft®, Windows®, XP Server®, Novell®, NetWare®, Red Hat® and Linux®, for example. Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.

As will be discussed below in greater detail, server information sharing process 3550 may receive, by a computing device, video content information associated with video content. Server information sharing process 3550 may also receive, by the computing device, end destination information associated with a reception instance of the video content. Server information sharing process 3550 may selectively aggregate at least a portion of the video content information and at least a portion of the end destination information to generate aggregated information.

The instruction sets and subroutines of server information sharing process 3550, which may include one or more software modules, and which may be stored on storage device 2534 coupled to server computer 3522, may be executed by one or more processors (not shown) and one or more memory modules (not shown) incorporated into server computer 3522. Storage device 2534 may include but is not limited to: a hard disk drive; a solid state drive, a tape drive; an optical drive; a RAID array; a random access memory (RAM); and a read-only memory (ROM).

Server computer 3522 may execute web server application 3560, examples of which may include but are not limited to: Microsoft IIS, Novell Webserver™, or Apache®, Webserver™, that allows for HTTP (i.e., HyperText Transfer Protocol) access to server computer 3522 via network 3530 (Webserver is a trademark of Novell Corporation in the United States, other countries, or both; and Apache is a registered trademark of Apache Software Foundation in the United States, other countries, or both), hosting of one or more web pages and/or web sites, and the like. Network 3530 may be connected to one or more secondary networks (e.g., network 3520), examples of which may include but are not limited to: a local area network; a wide area network; or an intranet, for example.

Server information collection process 3550 (alone, or in combination with one or more of web server application 3560 and aggregation application 3552) may receive video content information messages and/or end destination information messages from one or more client information collection processes (e.g., client information collection processes 3524, 3526, 3528 such as those running video quality probes 120, virtual video quality probe 210, mobile video quality probes and the like. Aggregation application 3552 may include a data storage and management application, for example, but not limited to, a database application such as SQL Server™, MySQL™, and Oracle™ database applications. Additionally, server information collection process 3550 (alone, or in combination with one or more of web server application 3560 and aggregation application 3552) may provide information based upon, at least in part, the video content information and/or the end destination information, e.g., via a web page or collection of web pages. Server information collection process 3550 may be a standalone application. Additionally/alternatively, server information collection process 3550 may interact with web server application 3560 and/or may be incorporated into web server application 3560 as a module or component of web server application.

The instruction sets and subroutines of client information collection processes 3524, 3526, 3528, (which may include one or more software modules) which may be stored on storage devices 3531, 3532, 3533 (respectively) coupled to computing devices 3536, 3538, 3540/3542 (respectively), may be executed by one or more processors (not shown) and one or more memory modules (not shown) incorporated into computing devices 3536, 3538, 3540/3542 (respectively). Storage devices 3531, 3532, 3533 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Computing devices 3536, 3538, 3540/3542 may include, be associated with, and/or incorporated into one or more video delivery devices. Examples of computing devices 3536, 3538, 3540/3542 may include, but are not limited to, personal computer 3536, mobile media device 3538 (which may include, but is not limited to, a portable media player, smart phone, tablet computer, a portable video game device, and the like), and television 3540 and/or television set-top box 3542. Computing devices 3536, 3538, 3540/3542 may be capable of being connected to a data network (e.g., network 3530, network 3520).

Using computing devices 3536, 3538, 3540/3542 (and/or a video delivery device associated with computing devices 3536, 3538, 3540/3542) users 3544, 3546, 3548 consume video content. For example, using personal computer 3536, user 3544 may consume video content in the form of video included on a web page (e.g., embedded streaming video, webcasts, podcasts, and the like), video content stored on storage device 3531, internet protocol television, internet based video on demand (e.g., Hulu™), or the like. Similarly, using mobile media device 3538, user 3546 may consume video content included on a web page, video content stored on storage device 3531, internet based video on demand, or the like. User 3548, via television 3540 and/or television set-top box 3542, may consume television broadcast video content (e.g., airwave broadcast delivery, cable based delivery, satellite based delivery, or the like), video on demand video content, and the like. It will be appreciated that various additional/alternative video content may be consumed via the exemplary devices and/or via other video delivery devices that will be appreciated by those having skill in the art.

The various computing devices may be capable of being directly or indirectly coupled to network 3520 (or network 3530). For example, personal computer 3536 is shown directly coupled to network 3530 via a hardwired network connection. Similarly, a personal computer (such as a laptop computer) may be wirelessly coupled to network 3530 (or network 3520) via a wireless communication channel established between the laptop computer and a wireless access point (i.e., WAP), which may be coupled to network 3530. The WAP may be, for example, an IEEE 802.11a, 802.11b, 802.11g, Wi-Fi, and/or Bluetooth device that is capable of establishing the wireless communication channel between the laptop computer and the WAP. Mobile media device 3538 is shown wirelessly coupled to network 3530 via wireless communication channel 3550 established between mobile media device 3538 and cellular network/bridge 3552, which is shown directly coupled to network 3530.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection. As is known in the art, GPRS Tunneling Protocol (GTP) is a set of Internet based protocols used to carry general packet radio service (GPRS) within mobile networks that allows for communication between gateway and serving GPRS support nodes that facilitate activation of user session, adjusting quality of service parameters and the like.

Computing devices 3536, 3538, 3540/3542 may each execute an operating system, examples of which may include but are not limited to Microsoft Windows, Microsoft Windows CE®, Red Hat Linux, etc., or a custom operating system (Windows CE is a registered trademark of Microsoft Corporation in the United States, other countries, or both).

Figure 36:
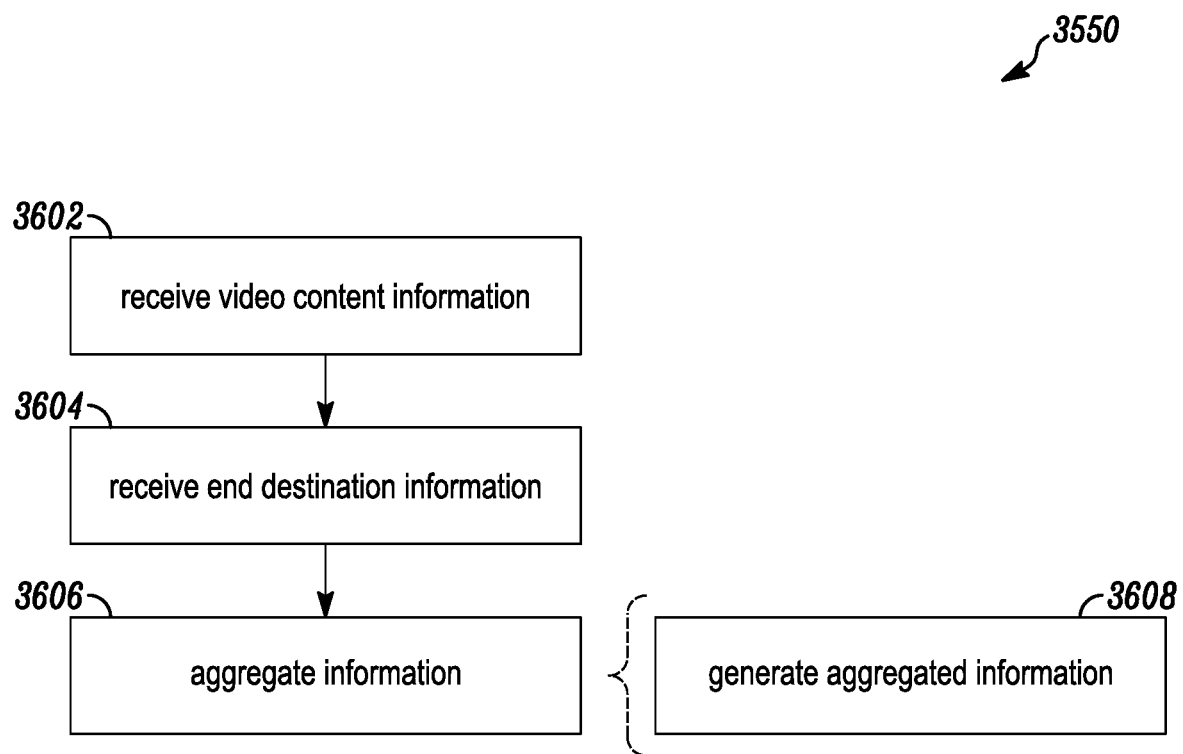
FIG. 36 is a flowchart of aggregating information.
Figure 37:
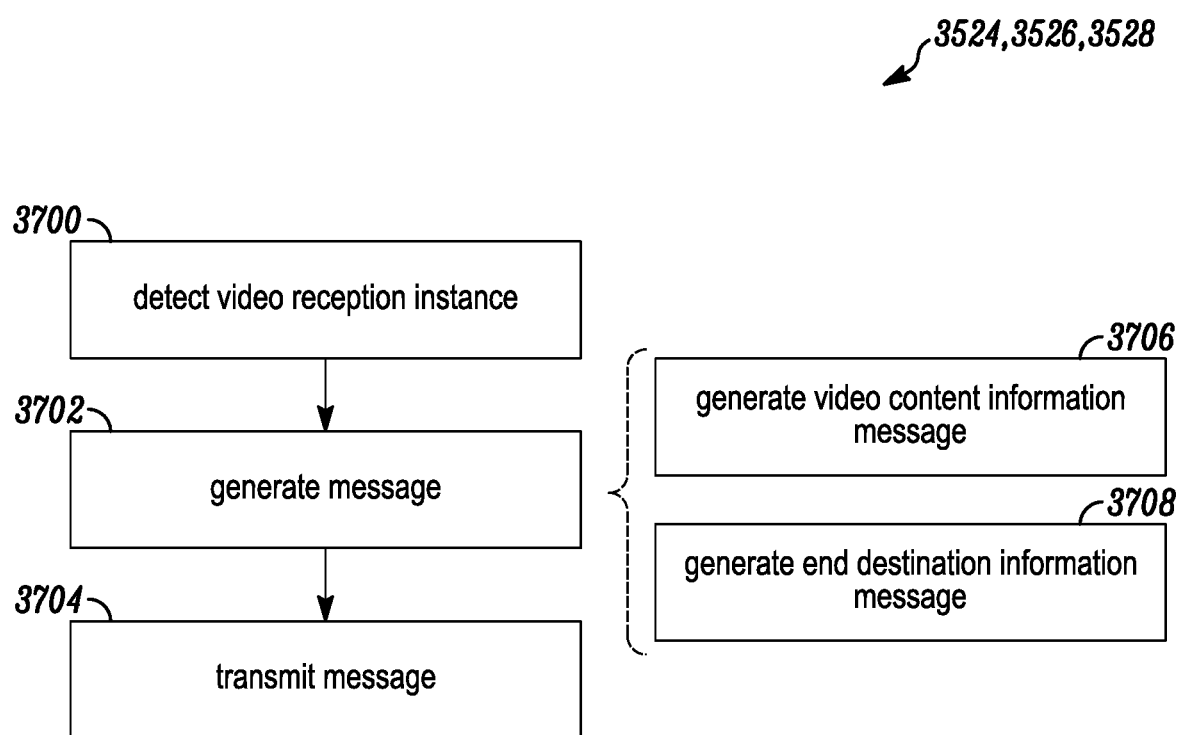
FIG. 37 is a flowchart of generating messages.

Referring also to FIGS. 36 and 37, server information collection process 3550 may generally receive video content information associated with video content. Additionally server information collection process 3550 may receive end destination information associated with a reception instance of the video content. Further, server information collection process 3550 may selectively aggregate 3552 at least a portion of the video content information, at least a portion of the end destination information, and at least a portion of the user behavior information.

For example, user 3548 may consume video content by watch a television broadcast program (e.g., an episode of a specific television program "30 Rock") via television 3540 and/or set-top box 3542. The television broadcast program may be provided to television 3540/set-top box 3542 via a cable transmission provided by specific cable television provider (e.g. Comcast Corporation). The television broadcast program may be provided directly to television 3540 and/or to television 3540 via set-top box 3542, thereby allowing user 3548 to watch the episode of the specific television program (e.g. "30 Rock"). When user 3548 selects the specific television program ("30 Rock"), (e.g., by selecting the television channel currently airing the specific program), client information collection process 3528 may detect a video reception instance.

The video reception instance may include, for example, user 3548 selecting and actively viewing (e.g., displaying on television 3540) the specific television program (e.g. the desired episode of "30 Rock"). However, according to system and/or user preferences (e.g., which may be determined by client information collection process 3528 and/or set by user 3548, e.g., via graphical user interface displayed via television 3540) a reception instance may also include, for example, reception of the video content via the cable broadcast transmission and recording to the video content, e.g., by a digital video recorder incorporated into set-top box 3542, and/or associated with television 3540, without user 3548 actively viewing (e.g., displaying on television 3540) the video content. Accordingly, the video reception instance may generally include the reception of the video content (e.g., the specific episode of "30 Rock) by a particular video delivery device (e.g., by television 3540/set-top box 3542).

Further, assume that user 3548 views a live broadcast of the specific episode of "30 Rock" while simultaneously recording the same episode of "30 Rock" (e.g., via a digital video recorder, or the like) being viewed via the live broadcast. User 3548's viewing of the live broadcast of the episode of "30 Rock" may be a first reception instance. User 3548 may, e.g., at a later time, view the recording of the episode of "30 Rock" (e.g., via the digital video recorder). The subsequent viewing of the recording of the episode of "30 Rock" may be a second reception instance. Similarly, user 3548 may view a live broadcast of a re-run of the same episode of "30 rock." The viewing of the re-run of the episode of "30 Rock" may be a third reception instance.

While the video content of the foregoing example may include a television program (e.g., and episode of "30 Rock") delivered via a cable broadcast network (e.g., provided by a specific cable television provider such as Comcast Corporation), as discussed previously other video content is also contemplated. For example, the video content may include, but is not limited to, a television broad cast, video on a web page, video on demand products (e.g., provided by a cable service provider, and internet video on demand service, or the like), a video conference, or other video content.

The user may be watching the television program (e.g. an episode of "30 Rock") on a mobile device using a Video on Demand application such as Netflix™ or Amazon Prime. Depending on the video Quality of Service perceived by the user, the user may choose to stop watching or switch between applications for watching a given television program. This user behavior information may be correlated with the video Quality of Service associated with the different viewing instances.

Upon client information collection process 3528 detecting 3700 a reception instance of video content, client information collection process 3528 may generate 3702 one or more messages. Client information collection process 3528 may generate 3702 the one or more messages automatically upon detection 3700 of the reception instance. Additionally/alternatively, upon detecting 3700 the video reception instance, client information collection process 3528 may generate 3702 the one or more messages in response to a user input. For example, a remote control device associated with television 3540 and/or set-top box 3542 may include a button (e.g., a "send information" button) for generating the one or more messages. Upon user 3548 pressing the button, client information collection process 3528 may receive a signal (e.g., via television 3540 and/or set-top box 3542) causing client information collection process 3528 to generate 3702 the one or more messages.

Figure 38:
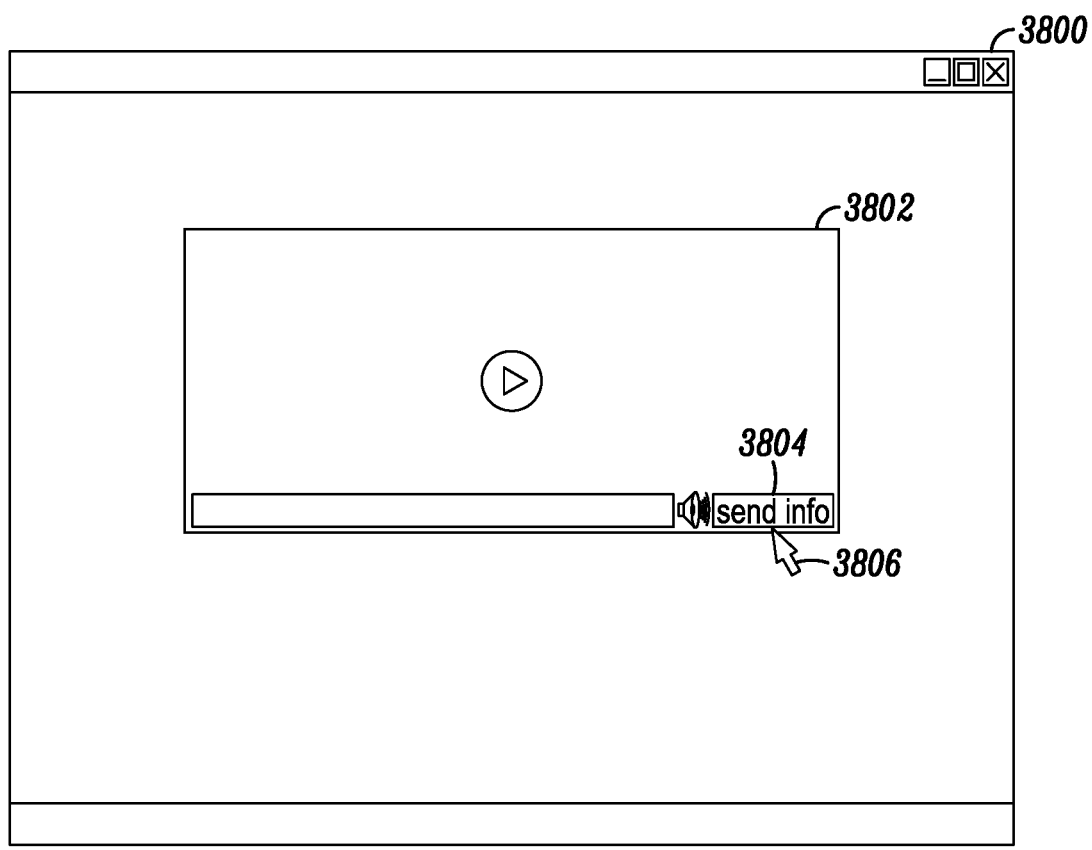
FIG. 38 is a diagrammatic view of a web page including video content.

In various other embodiments, the user may similarly provide an input causing the client information collection process to generate 3702 one or more messages. For example, and referring to FIG. 38, user 3544 may view a video on a web page (e.g., web page 3800). A graphical user interface associated with video display 3802 may include "send info" button 3804. User 3544 may select, via onscreen pointer 3806 (which may be controlled by a pointing device such as a mouse; not shown), send info button 3804. Selecting send info button 3894 may result in client information process 3524 generating 3792 one or more messages.

Generating 3702 the one or more messages may include generating 3706 one or more video content messages, including video content information. Further, generating 3702 the one or more messages may include generating 3708 one or more end destination messages including end destination information associated with a reception instance. While the foregoing describes generating one or more video content messages including video content information and generating one or more end destination messages including end destination information associated with a reception instance, it should be appreciated that generating 3702 the one or more messages may include generating a single message including both video content information and end destination information associated with a reception instance.

Generally, video content information may include information that may be intrinsic to the particular piece of video content. As such, video content information may include, for example, the identification of the video content, a service provider identifier associated with the particular transmission of the particular piece of video content. Continuing with the above stated example, assume that user 3548 is watching the specific video program (e.g. the second episode of the fourth season of "30 Rock")," which is airing on Oct. 22, 2014, on channel 7, broadcast by a company in a specific location (e.g. Comcast in Massachusetts). Accordingly, generating 3708 one or more video content information messages may include generating a message including one or more of an identifier of the particular piece of video content (e.g., the second episode of the fourth season of "30 Rock" as aired on Oct. 22, 2014) and a service provider identifier (e.g., channel 7, broadcast by Comcast in Massachusetts). Additional/alternative information about the particular piece of content may also be included. In the case of, e.g., video one a web site, video content information may include, for example, a video identifier, the web site from which the video is viewed, an identity of the internet service provider through which the web page including the video content is accessed, etc.

Generally, end destination information associated with the reception instance may include information that may depend upon the consumption of the video content. For example, end destination information associated with the reception instance may include a geographic location of the video delivery device (e.g., which may include and/or be associated with the computing device executing the client information collection process). The geographic location of the video delivery device may be determined based upon, at least in part, one or more of: a user input (e.g., an initial set-up of the client information collection process may request and receive a user input of a location such as an address), a detected location (e.g., based upon an associated GPS receiver, cellular telephone broadcast tower triangulation, Wi-Fi access point location, or the like), and IP address of a network connection (e.g., via which the computing device may be coupled to network 3530 or network 3520), or the like. Additionally, the end destination information associated with the reception instance may include a start time and a stop time of the reception instance (e.g., start and stop time of viewing of the video content and/or recording of the video content), a time at which the client information collection process generates 3702 the message, and indicator of whether the video content is viewed at a time of broadcast or is viewed at a later time (e.g., a recording of the broadcast if viewed), and the like. Additionally, the end destination information associated with the reception instance may include detailed information regarding the type of viewing device, operating system, available space, viewing application, and the like.

Additionally, the end destination information associated with the reception instance may include experience information. Experience information may include information regarding a quality of the reception instance of the video content (e.g., poor/high quality video, disruptions due to latency and lost packets, etc.) and/or information including user created comments relating to the video content and/or the reception instance of the video content. Information regarding the quality of the reception instance of the video content may be generated by the client information collection process based upon detected lost packets, detected latency, and the like. Additionally/alternatively, the client information collection process may allow, and/or prompt, a user to enter a subjective evaluation of the reception instance of the video content.

Additionally, the end destination information associated with the reception instance may include user behavior information such as start and stop viewing times in relation to other reception instances, changing of applications of devices used for viewing, user-communicated video quality, user selected early session termination, and user selected trick modes such as fast forward and rewind, and the like. In an illustrative example, a user may be viewing a television episode on a mobile device 3528 receiving the episode from Netflix™ over the cellular network and then switch to watching that episode on a computing device connected by a LAN.

Additionally/alternatively the client information collection process may allow a user to generate comments relating to the video content itself and/or relating to the reception instance of the video content.

Figure 39:
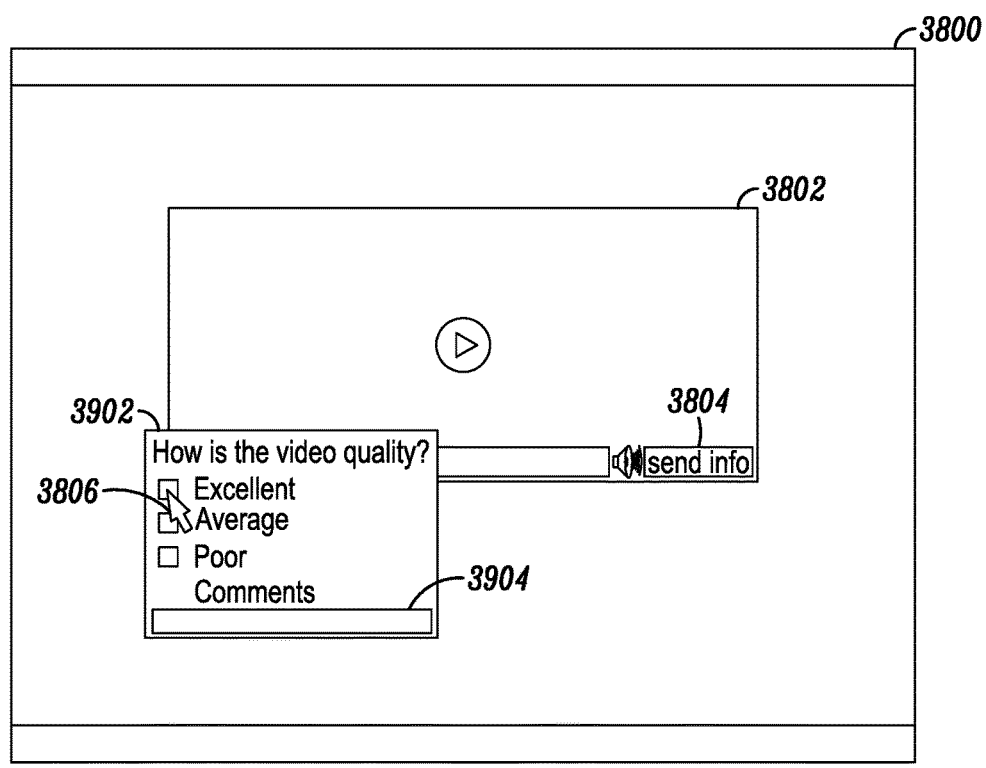
FIG. 39 is a diagrammatic view of a web page including video content.

For example, and referring also to FIG. 39, client information collection process 3524 may (alone or in combination with another application, such as a web browser) generate information dialog box 3902. While information dialog box 3902 is shown including three options (namely, "Excellent," "Average," and "Poor") which may be selected by user 3544 (e.g., using on screen pointer 3806 controlled by a pointing device) to indicate user 3544's subjective opinion of the quality of the reception instance of the video content, this should not be construed as a limitation of the present disclosure, and the number and nature of options may vary according to design criteria and user need. Additionally, information dialog box 3902 may include comment block 3904. User 3544 may input comments (e.g., using a keyboard or other input device, not shown) in comment block 3904, relating to the video content (e.g., "this video is hysterical") and/or the reception instance of the video content (e.g., "the video and sound are really out of sync"). Client information collection process 3524 may include at least a portion of the experience information (e.g., user 3544's video quality selection and user 3544's comments) in the one or more generated 3702 messages.

Continuing with the above-stated example, user 3548 may be viewing a live broadcast of the second episode of the fourth season of "30 Rock" at 9:30 pm on Thursday, Oct. 22, 2014 via television 3540 and/or set-top box 3542. Client information collection process 3528 may generate 3702 one or more end destination information messages associated with the reception instance. The generated 3708 end destination message may include the geographic location of television 3540 and/or set-top box 3542 (e.g., 13 Storybook Ln., Boston, Mass., based upon an address input), a start time of the video content (e.g., 9:30 pm EST, on Thursday, Oct. 22, 2014). Additionally, the end destination information associated with the reception instance may include experience information. For example, client information collection process 3528 may allow (e.g., via an onscreen display) user 3548 to input information concerning the video quality of the reception (e.g., using a remote control device associated with television 3540 and/or set-top box 3542 and/or an onscreen graphical user interface). For example, assume that while watching the episode of "30 Rock" user 3548 notices that the video is not properly synchronized with the audio at several points in the episode. Via an onscreen graphical user interface and using the remote control, user 3548 may provide an input (e.g., by selecting from a menu provided via the graphical user interface) indicating that there were some problems with the quality of the video content. Further, user 3548 may provide the comment (e.g., again via an onscreen graphical user interface and using the remote control) that the episode is "the funniest episode yet." The generated 3708 end destination message may include the experience information input by user 3548.

Upon generating 3702 the one or more messages, client information collection process 3528 may transmit 3704 the one or more messages, e.g., to server information collection process 3550. Video content information and end destination information may be transmitted 3704 as a single message and/or may include one or more discrete messages (e.g., one or more messages for video content information and one or more messages for end destination information, or separate messages for each component, etc.).

The one or more generated 3702 messages may be transmitted to server information collection process 3550 and/or to web server application 3560. The one or more generated messages may include, for example, and HTTP message, e.g., which may be received by web server application 3560 and/or server information collection process 3550. Various addition and/or alternative message types and/or message formats may be suitably utilized.

As discussed above, and with particular reference to FIG. 36, server information collection process 3550 may generally receive 3602 video content information associated with video content. Additionally server information collection process 3550 may receive 3604 end destination information associated with a reception instance of the video content. Further, server information collection process 3550 may selectively aggregate 3606 at least a portion of the video content information and at least a portion of the end destination information.

Receiving the video content information and receiving the end destination information may include receiving one or more of the video content information and the end destination information from a computing device associated with the reception instance of the video content. As discussed above, a computing device (e.g., which may be included in, and/or associated with, a video delivery device such as personal computer 3536, mobile media device 3538, television 3540 and/or television set-top box 3542) may execute a client information collection process (e.g., client information collection process 3524, 3526, 3528), which may transmit 3704 one or more messages including video content information and/or end destination information associated with a reception instance, either automatically and/or in response to a user input.

The video content information may include one or more of an identity of the video content and a service provider identifier associated with a transmission of the video content. Continuing with the above-example, server information collection process 3550 (alone and/or in conjunction with web server application 3560) may receive 3602 video content information including video content identification (e.g., the second episode of the fourth season of "30 Rock" that aired at 9:30 pm on Thursday, Oct. 22, 2014). Additionally server information collection process 3550 may receive 3602 video content information including a service provider identifier associated with a transmission of the video content (e.g., Comcast in Massachusetts). Additional video content information may also be included, such as the channel on which the video content aired (e.g., channel 7), and the like. Additionally, at least a portion of the video content information may be determined by server information collection process 3550 (alone and/or in combination with one or more additional applications, e.g., web server application 3560). For example, if the episode number was not included in the received 3602 video content information, server information collection process 3550 may determine the episode number, e.g., based upon a television schedule look-up, or the like.

The end destination information received 3604 by server information collection process 3550 may include one or more of a location of an end destination associated with the reception instance of the video content, a time associated with the reception instance of the video content, and experience information associated with the reception instance of the video content. For example, and still continuing with the above example, server information collection process 3550 may receive end destination information including and end destination for consumption of the video content, namely the geographic location of television 3540 and/or set-top box 3542 (i.e., 13 Storybook Ln., Boston, Mass.). Additionally, server information collection process 3550 may receive a time of 9:30 pm EST associated with the reception instance of user 3548 viewing the live airing of the episode of "30 Rock."

Server information collection process 3550 may also receive 3604 experience information associated with the reception instance of the video content. The experience information may include information relating to a quality of the reception instance of the video content. For example, in the above-example, user 3548 found that at several point the video and audio were poorly synchronized. Accordingly, user 3548 provided an input indicating that there were some problems with the quality of the video content. Server information collection process 3550 may receive 3604 experience information associated with the reception instance of the episode of "30 Rock" indicating that there were some problems with the quality of the video.

The experience information received by server information collection process 3550 may include a user created comment relating to one or more of the video content and the reception instance of the video content. Still continuing with the above stated example, server information collection process 3550 may receive 3604 end destination information including the comment "the funniest episode yet."

Server information collection process 3550 (alone, and/or in conjunction with one or more of web server application 3560 and aggregation application 3552) may also selectively aggregate 3606 at least a portion of the video content information and at least a portion of the end destination information to generate 3608 aggregated information. Selectively aggregating 3606 at least a portion of the video content information and at least a portion of the end destination information may include storing at least a portion of the video content information and at least a portion of the end destination information in a database (e.g., which may include parsing the information into predetermined fields). Information received 3602, 3604 from many users (e.g., users 3544, 3546, 3548) may be commonly aggregated relative to a single video content and/or relative to a plurality of video content.

Accordingly, information collection process may provide real-time, near real-time, and/or historical reporting of video issues on channels, programs, service providers and the like in geographic regions, as well as registering key view experiences based on one or more of location, channel, program, service provider or the like.

The aforementioned embodiments may use conventional standards for digital program/advertisement insertion, to provide advertisement auditing and reporting, including visual advertisement splice performance, quality, and service assurance. These embodiments enable the captured data to be filtered for particular content/advertisement events, while correlating advertisement splice messages, video content metrics, and captured thumbnails. Reports may thus be generated for advertisers and program content providers which include the aforementioned metrics, including advertisement times, geographic zones, channels, and audience metrics, etc.

The system described herein, allows for the tracking of video quality, as experienced by the end user, from the video source throughout the network, including the mobile core, at an individual video session level of awareness. In addition to the video quality for the individual session, additional information about the subscriber, type of subscriber, video content, user device, application, provider level of service, geography, demographics of viewer, content type and source, subscription and cellular services, network routing, cell towers, cell nodes, and the like may be tracked on an individual video session level of awareness or merged with video quality data from other data sources. Video quality related to individual sessions may then be aggregated based on additional information to track video quality with respect to a given attribute such as video quality within the mobile core such as by cell node, cell tower and the like, rather than simply tracking the general transmission speed of that part of the network over the mobile infrastructure as is currently done.

The ability to track video quality on an individual video session level of awareness at multiple points within the media distribution system 100 and across a plurality of distinct networks, such as the internet and the mobile core, may facilitate the identification of sources of video quality degradation such as network traffic shaping policies (i.e. video flows limited to 3G), bandwidth limitations between various locations within the media distribution network 100, video quality problems with particular device types, capacity at cache servers at particular hours, and the like. In a non-limiting example, a traffic policy that limits the flow of video data to a certain throughput, such as 56K, may result in video quality degradations such as buffer underflows and the like where the underflows are a result of explicit traffic shaping policies rather than actual bandwidth limitations in the network.

In a non-limiting example, information identifying video quality degradation resulting from band width limitations between a cache server and a mobile core may be used to inform decisions regarding the construction and location of new cache distribution servers closer to the points in the network with the greatest load. Cache distribution servers may be moved downstream based on analysis of video traffic patterns such as within the mobile core, at smart cells, at cell towers, and the like.

In a non-limiting example, the integration of user behavior and video quality may be used to assess business performance and planning. Mobile customers experiencing poor video quality of service, QoS, and quality of experience, QoE, may drop one or more of the providers such as content providers, mobile service providers, and the like. A subsequent analysis of lost customers may facilitate in the identification of one or more contributory causes to the customer loss. If a customer drops the services of the mobile provider, the analysis may facilitate the mobile provider in identifying whether a contributory source was poor incoming video data or poor internal infrastructure. If a customer drops a content provider such as Netflix™, the analysis may facilitate the content provider in identifying whether a contributory source was at the head end, at particular cache servers, in the mobile delivery network, and the like. This information may facilitate the company in identifying improved customer retention policies, capital upgrade initiatives, negotiations with other members of the media distribution network, and the like. Additionally, insight into customers' selections of media content and source may facilitate the identification of new services, pricing, and the like.

In another non-limiting example, it may be possible to combine temporal information with information on viewed content, such as advertisements, and customer location and movement based on cell tower access, and transitions between cells. This information may be used for targeting advertisements, planning infrastructure upgrades and the like. If there is high video usage along certain geographic pathways, cache servers could be linked to the mobile core in such a way as to support a high quality video experience for mobile device users. In a non-limiting example, it may be possible to combine temporal information with information on viewed content for future network planning. If a given cache server is predictably overloaded at certain times of the week it may be desirable to access material from other cache servers during this time frame.

In some embodiments, a virtual video quality probe 210 may operate on the end user device such as a mobile device 118. The virtual video quality probe 210 may monitor and aggregate TCP/HTTP level statistics of the mobile device 118. The virtual video quality probe 210 may sit in line between the applications and the TCP/HTTP stack on the mobile device 118 and monitor the requests. Because of the monitoring at this level the virtual video quality probe 210 may be able to detect a stale or corrupt manifest.

In a non-limiting example, the combination of information from a cache server and information derived from a user device such as a mobile device 118 may provide additional insight. A large amount of information about the video quality may be captured at the cache server as well as some information about the session such as user account, application, device and the like. However, if requests for video data stop coming into the cache, additional information from the device is needed to determine the cause. The device may provide information regarding such as whether the video requests stopped because the user paused the operation of because the application crashed, and the like.

It should be understood that any of the features described with respect to one of the embodiments described herein may be similarly applied to any of the other embodiments described herein without departing from the scope of the present disclosure.

The flowchart and block diagrams in the figures illustrate the architecture, functionality, and operation of possible implementations of systems, methods and computer program products according to various embodiments of aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a computer, which may be a dedicated computing device, specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A method for monitoring video quality transmitted over a mobile video delivery network facility, comprising:
    tapping, by a video quality probe, into a mobile network traffic stream transmitted over the mobile video delivery network facility, wherein the mobile network traffic stream includes General Packet Radio System Tunneling Protocol (GTP) header information;
    filtering, by the video quality probe, the tapped mobile network traffic stream to identify an individual video session, wherein the identified individual video session is associated with a unique user and at least one of a unique device and a unique mobile account;
    determining, by the video quality probe, a video quality parameter corresponding to the identified individual video session, wherein the video quality parameter is at least one of packet jitter growth, packet loss, instantaneous flow rate balance (IFRB), delay between packets, a jitter statistic, a total time required to receive all packets needed to fully assemble a segment, a statistic of errors in key frames, a measure of HTTP transport quality, and a measure of DNS resolution performance;

aggregating context information for the identified individual video session, wherein the context information includes at least one of a cell tower, a smart node, a serving gateway node, a user, a subscriber level, a device type, an application, and a content provider; and transmitting, by the video quality probe, the aggregated context information and the determined video quality parameter to a video quality server.

2. A method for monitoring video quality transmitted over a mobile video delivery network facility, comprising:

tapping, by a corresponding video quality probe, into a mobile video delivery network facility traffic stream in at least two locations, wherein at least one of the locations is on a mobile viewing device;

filtering, by the corresponding video quality probe, the tapped mobile video delivery network facility traffic stream to identify at least one individual common video session at each of the at least two locations;

determining, by the corresponding video quality probe, a video quality parameter associated with each of the at least two locations for the at least one individual common video session, wherein the video quality parameters are each at least one of packet jitter growth, packet loss, instantaneous flow rate balance (IFRB), delay between packets, a jitter statistic, a total time required to receive all packets needed to fully assemble a segment, a statistic of errors in key frames, a measure of HTTP transport quality, and a measure of DNS resolution performance;

aggregating context information for the at least one individual common video session, wherein the context information includes at least one of a cell tower, a smart node, a serving gateway node, a user, a subscriber level, a device type, an application, and a content provider; and transmitting, by the video quality probes, the aggregated context information and the video quality parameters to a video quality server.

3. The method of claim 2, wherein at least one of the locations is in an LTE mobile core between an S5/S8 interface and an S11 interface or in the LTE mobile core between an S1 interface and the S5/S8 interface.

4. The method of claim 3, wherein at least one of the locations is outside of the LTE mobile core.

5. The method of claim 3, wherein the video quality probe in the LTE mobile core is a virtual probe.

6. A method for monitoring video quality transmitted over a mobile video delivery network facility, comprising:

tapping into a mobile video delivery network traffic stream in two locations, wherein at least one of the locations is on a mobile viewing device and wherein a passive monitor is used at one of the two locations and an active monitor is used at the other of the two locations;

filtering the tapped mobile video delivery network traffic stream to identify an individual common video session at each location;

determining a corresponding video quality parameter associated with each location for the individual common video session, wherein each video quality parameter is at least one of packet jitter growth, packet loss, instantaneous flow rate balance (IFRB), delay between packets, a jitter statistic, a total time required to receive all packets needed to fully assemble a segment, a statistic of errors in key frames, a measure of HTTP transport quality, and a measure of DNS resolution performance;

aggregating context information for the individual video session, wherein the context information includes at least one of a cell tower, a smart node, a serving gateway node, a user, a subscriber level, a device type, an application, and a content provider; and transmitting the aggregated context information and the video quality parameters to a video quality server.

7. The method of claim 6, wherein one of the locations includes a virtual probe in an LTE mobile core.

8. A method for monitoring video quality transmitted over a mobile video delivery network facility, comprising:

tapping, by a corresponding video quality probe, into a mobile video delivery network traffic stream in at least two locations, wherein at least one of the locations is on a mobile viewing device using an SDK;

filtering, by the corresponding video quality probe, the tapped mobile video delivery network traffic stream to identify at least one individual common video session at each of the at least two locations;

determining, by the corresponding video quality probe, a video quality parameter associated with each of the at least two locations for the at least one individual common video session, wherein the video quality parameters are each at least one of packet jitter growth, packet loss, instantaneous flow rate balance (IFRB), delay between packets, a jitter statistic, a total time required to receive all packets needed to fully assemble a segment, a statistic of errors in key frames, a measure of HTTP transport quality, and a measure of DNS resolution performance;

aggregating context information for the at least one individual common video session, wherein the context information includes at least one of a cell tower, a smart node, a serving gateway node, a user, a subscriber level, a device type, an application, and a content provider; and transmitting, by the video quality probe, at least one location, the aggregated context information, and a video quality parameter to a video quality server.

9. The method of claim 8, wherein the video quality server is a physical server or a virtual server.

10. A method for monitoring video quality transmitted over a mobile video delivery network, comprising:

tapping, by a video quality probe, into a mobile video delivery network traffic stream in at least two locations, wherein at least one of the locations is on a mobile viewing device;

filtering, by a corresponding video quality probe, the tapped mobile video delivery network traffic stream to identify at least one individual common video session at each of the at least two locations;

determining, by the corresponding video quality probe, a video quality parameter associated with each of the at least two locations for the at least one individual common video session, wherein the video quality parameters are each at least one of packet jitter growth, media delivery quality, packet loss, instantaneous flow rate balance (IFRB), delay between packets, a jitter statistic, a total time required to receive all packets needed to fully assemble a segment, a statistic of errors in key frames, a measure of HTTP transport quality and a measure of DNS resolution performance;

aggregating user information parameters for the at least one individual common video session, wherein the user information parameters include location of user, subscriber level, device type, application, user interactions with application, or user interactions with device and content provider; and transmitting, by the corresponding video quality probes, at least one video quality parameter and one user information parameter to a video quality server.

11. A method for monitoring quality of a video session that uses video traffic transmitted over a mobile video delivery network facility, comprising:

monitoring a first mobile video delivery network facility that handles at least a portion of the video traffic for the video session for information about the video traffic, wherein the first mobile video delivery network facility is located in an LTE mobile core;

monitoring a second mobile video delivery network facility that handles at least a portion of the video traffic for the video session for information about the video traffic, wherein the second mobile video delivery network facility is located external to an LTE mobile core, and wherein the second mobile video delivery network facility includes a viewing device, wherein the viewing device is at least one of a mobile phone, a laptop computer, a tablet, and a television;

filtering the information collected from the two mobile video delivery network facilities about the video traffic to identify a common video session; and determining a video quality parameter relating to the quality of the common video session based on the information collected from the two mobile video delivery network facilities about the video traffic.

12. The method of claim 11, wherein the LTE mobile core consists of a packet data network gateway, a serving node gateway, a base station, and at least one of a control plane and a user/data plane, and wherein a location of the LTE mobile core is at least one of an S5/S8 interface, an S11 interface, and an S1 interface.

13. The method of claim 11, wherein the second mobile video delivery network facility includes a stream ingestion location, a cache distribution network, an edge distribution location, or Adaptive Bit Rate Sources (ABR).

14. A method for monitoring quality of a video session that uses traffic transmitted over a core mobile video delivery network facility, comprising:

tapping into at least one device within the core mobile video delivery network facility, wherein the at least one device is a small cell hardware device, using a virtual probe that is disposed within the at least one device, wherein the probe performs at least one of active video stream monitoring and passive video stream monitoring, and wherein the virtual probe reports, with respect to an individual video stream to the at least one device, at least one of information about operation of the device and performance of the core mobile video delivery network facility to a host system that collects information about the performance of the core mobile video delivery network facility, wherein reporting the performance of the delivery network includes reporting on at least one of quality of the video stream through the device and quality of the network traffic through the device.

* * * * *

UNITED STATES PATENT AND TRADEMARK OFFICE
CERTIFICATE OF CORRECTION

PATENT NO. : 10,681,574 B2
APPLICATION NO. : 16/185366
DATED : June 9, 2020
INVENTOR(S) : Gino Louis Dion et al.

It is certified that error appears in the above-identified patent and that said Letters Patent is hereby corrected as shown below:

On the Title Page

On the Page 3, in Column 1, item (56) under "Other Publications", Line 3, delete "Sep. 2003, Sep. 2003," and insert -- Sep. 2003, --, therefor.

On the Page 3, in Column 1, item (56) under "Other Publications", Line 11, delete "Oct. 2003, Oct. 2003," and insert -- Oct. 2003, --, therefor.

In the Drawings

On sheet 29 of 35, in Figure 33, reference numeral 2602, delete "FrameGraber" and insert -- Frame Grabber --, therefor.

In the Specification

In Column 18, Line 52, delete "user data packets" and insert -- user data packets) --, therefor.

In Column 18, Line 54, delete "and control packets." and insert -- and control packets). --, therefor.

In Column 18, Line 61, delete "GTP'" and insert -- GTP --, therefor.

In Column 19, Line 16, delete "(FIG." and insert -- (FIGS. --, therefor.

In Column 19, Line 66, delete "and or" and insert -- and/or --, therefor.

In Column 19, Line 66, delete "statistics" and insert -- statistics) --, therefor.

In Column 21, Line 31, delete "are remain" and insert -- are --, therefor.

In Column 22, Line 25, delete "like)." and insert -- like)). --, therefor.

Signed and Sealed this
Eighth Day of December, 2020

Andrei Iancu
*Director of the United States Patent and Trademark Office*

In Column 24, Line 45, delete "(e.g.," and insert -- ( --, therefor.

In Column 26, Line 32, delete "Fibrechannel," and insert -- Fibre Channel, --, therefor.

In Column 41, Line 7, delete "SCTE35" and insert -- SCTE-35 --, therefor.